United States Patent
Hatta et al.

(10) Patent No.: US 10,665,841 B2
(45) Date of Patent: *May 26, 2020

(54) BATTERY, SEPARATOR, ELECTRODE, COATING MATERIAL, BATTERY PACK, ELECTRONIC APPARATUS, ELECTRICALLY DRIVEN VEHICLE, ELECTRICAL STORAGE DEVICE, AND ELECTRIC POWER SYSTEM

(71) Applicant: MURATA MANUFACTURING CO., LTD., Kyoto (JP)

(72) Inventors: Kazuhito Hatta, Fukushima (JP); Keiichi Kagami, Fukushima (JP); Nobuaki Shimosaka, Fukushima (JP); Keizo Koga, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/030,839

(22) PCT Filed: Aug. 28, 2014

(86) PCT No.: PCT/JP2014/004416
§ 371 (c)(1),
(2) Date: Apr. 20, 2016

(87) PCT Pub. No.: WO2015/068325
PCT Pub. Date: May 14, 2015

(65) Prior Publication Data
US 2016/0254511 A1    Sep. 1, 2016

(30) Foreign Application Priority Data
Nov. 5, 2013    (JP) .................................. 2013-229673

(51) Int. Cl.
*H01M 2/16*    (2006.01)
*H01M 4/13*    (2010.01)
(Continued)

(52) U.S. Cl.
CPC ............. *H01M 2/166* (2013.01); *B60L 50/61* (2019.02); *B60L 58/12* (2019.02);
(Continued)

(58) Field of Classification Search
CPC .... B60L 11/00; B60L 11/123; B60L 11/1861; B60R 16/00; B60R 16/03;
(Continued)

(56) References Cited

U.S. PATENT DOCUMENTS

2009/0030100 A1*    1/2009    Nagamatsu ............. C01B 25/32
                                                                521/142
2012/0275148 A1    11/2012    Yeh et al.
(Continued)

FOREIGN PATENT DOCUMENTS

DE    19959430 A1    1/2001
EP    2978047 A1    1/2016
(Continued)

OTHER PUBLICATIONS

Office Action for CN Patent Application No. 201480059277.X, dated Nov. 5, 2018, 05 pages of Office Action and 08 pages of English Translation.
(Continued)

*Primary Examiner* — Lincoln D Donovan
*Assistant Examiner* — Dave Mattison
(74) *Attorney, Agent, or Firm* — Chip Law Group

(57) ABSTRACT

Provided is a battery including a positive electrode, a negative electrode, an electrolytic solution, and a particle-containing resin layer that contains particles and a resin. A shape of the particles includes a plane, a plane rate of the (Continued)

A particles is greater than 40% and equal to or less than 100%, and a refractive index of the particles is equal to or greater than 1.3 and less than 2.4.

20 Claims, 13 Drawing Sheets

(51) Int. Cl.
  *H01M 4/36* (2006.01)
  *B60L 50/61* (2019.01)
  *B60L 58/12* (2019.01)
  *H01M 10/058* (2010.01)
  *H01M 10/0525* (2010.01)

(52) U.S. Cl.
  CPC ........... *H01M 2/1686* (2013.01); *H01M 4/13* (2013.01); *H01M 4/366* (2013.01); *H01M 10/0525* (2013.01); *H01M 10/058* (2013.01); *Y02E 60/122* (2013.01); *Y02T 10/7011* (2013.01); *Y10S 903/907* (2013.01)

(58) Field of Classification Search
  CPC ... B60R 16/0315; B60R 21/00; B60R 21/017; H01M 2/00; H01M 2/166; H01M 2/1686; H01M 4/00; H01M 4/13; H01M 4/366; H01M 10/00; H01M 10/0525; H01M 10/058; H02J 7/00; H02J 7/1438; Y02E 60/00; Y02E 60/122; Y02T 10/00; Y02T 10/7005; Y02T 10/7011
  USPC ........................................................ 307/10.1
  See application file for complete search history.

(56) References Cited

U.S. PATENT DOCUMENTS

| | | | | |
|---|---|---|---|---|
| 2012/0316716 | A1* | 12/2012 | Odani | H01M 10/0567 701/22 |
| 2013/0054061 | A1 | 2/2013 | Nishimoto | |
| 2013/0168610 | A1* | 7/2013 | Nanba | H01M 4/133 252/502 |
| 2014/0315091 | A1* | 10/2014 | Yamazaki | H01M 4/621 429/231.8 |

FOREIGN PATENT DOCUMENTS

| | | |
|---|---|---|
| EP | 3067981 A1 | 9/2016 |
| JP | 01-123844 A | 5/1989 |
| JP | 11-100498 A | 4/1999 |
| JP | 2005-259928 A | 9/2005 |
| JP | 2008-066094 A | 3/2008 |
| JP | 2010-092881 A | 4/2010 |
| JP | 2010-108753 A | 5/2010 |
| JP | 2010-198757 A | 9/2010 |
| JP | 2011-054519 A | 3/2011 |
| JP | 2011-210433 A | 10/2011 |
| JP | 2011-210433 A | 11/2011 |
| JP | 4986009 B | 7/2012 |
| JP | 2012-221713 A | 11/2012 |
| JP | 2013-114764 A | 6/2013 |
| JP | 2013-134861 A | 7/2013 |
| JP | 2013-137984 A | 7/2013 |
| KR | 10-2011-0079744 A | 7/2011 |
| WO | 2012/057324 A1 | 5/2012 |
| WO | 2013/108510 A1 | 7/2013 |
| WO | 2014/148036 A1 | 3/2014 |
| WO | 2014/148036 A1 | 9/2014 |

OTHER PUBLICATIONS

Office Action for JP Patent Application No. 2015-546278, dated May 23, 2018, 03 pages of Office Action and 03 pages of English Translation.
Office Action for JP Patent Application No. 2015-546278, dated Mar. 30, 2018, 04 pages of Office Action and 03 pages of English Translation.
Kisuma, Kyowa chemical Industry Co., Ltd., WEB, (http://kyowa-chem.jp/products/ind_materia1102.html) Feb. 14, 2019.
Inorganic Material Business, Katakura & Co-op Agri Corporation, Web, (http://katakuraco-op.com/business/inorganic.html) Feb. 14, 2019.
Web, (http://www.toshi.info/sozai/filler/index.html) Feb. 14, 2019.
Notice of Opposition for JP Patent Application No. 2015-0546278, dated Feb. 15, 2019, 52 pages.
Extended European Search Report of EP Patent Application No. 14860019.0, dated Jun. 6, 2017, 11 pages.
Office Action for EP Patent Application No. 14860019.0, dated Aug. 16, 2019, 07 pages of Office Action.
Office Action for KR Patent Application No. 10-2016-7010781, dated Jan. 30, 2020, 07 pages of Office Action and 06 pages of English Translation.

* cited by examiner

FIG. 2
A
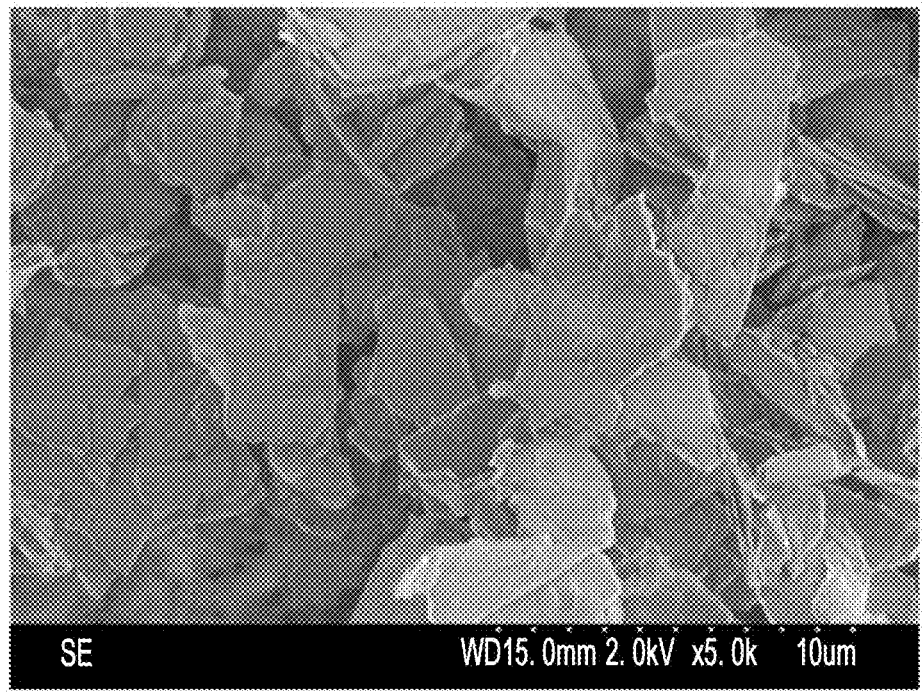
B
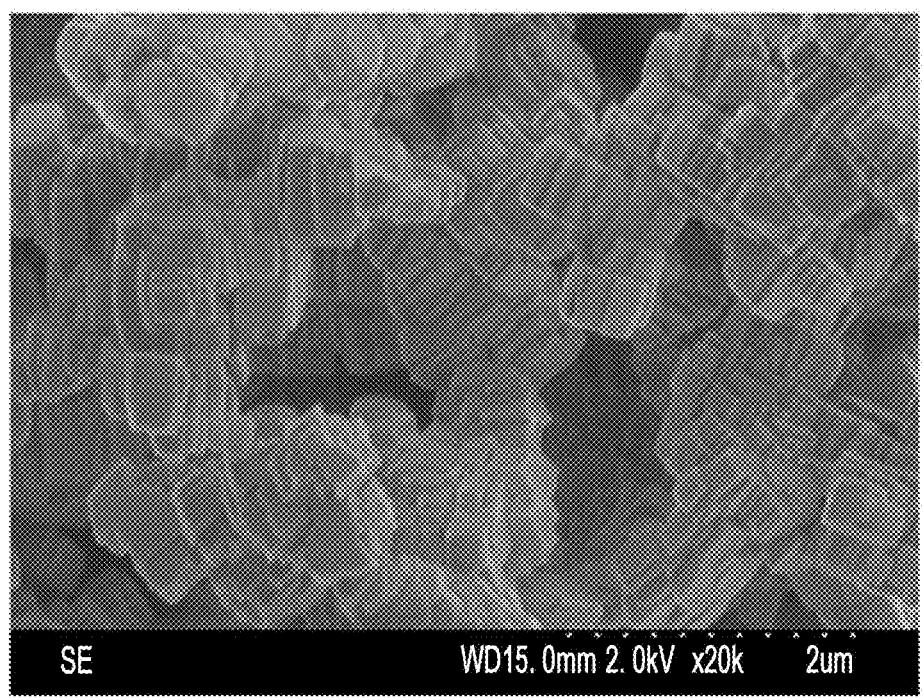

FIG. 11
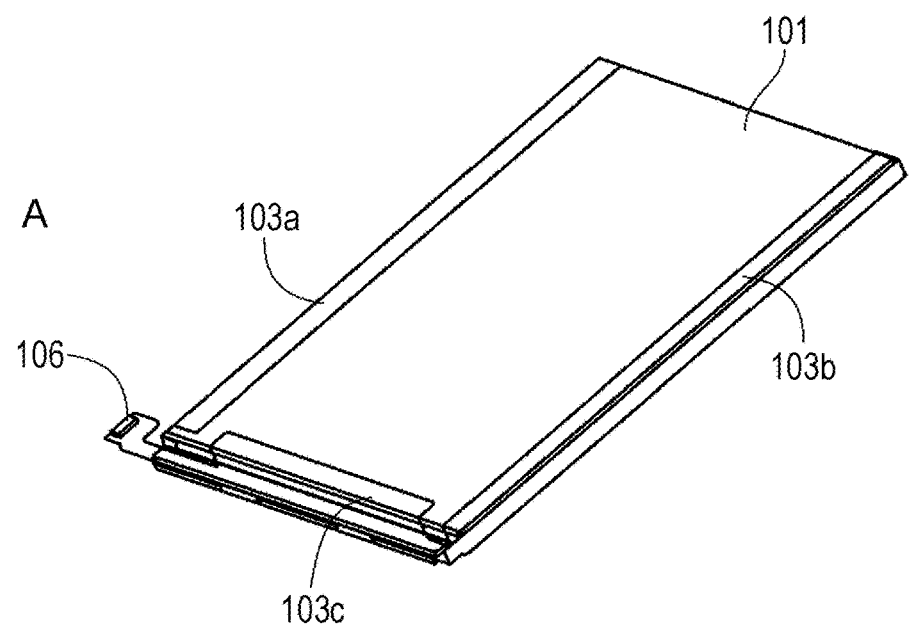
A
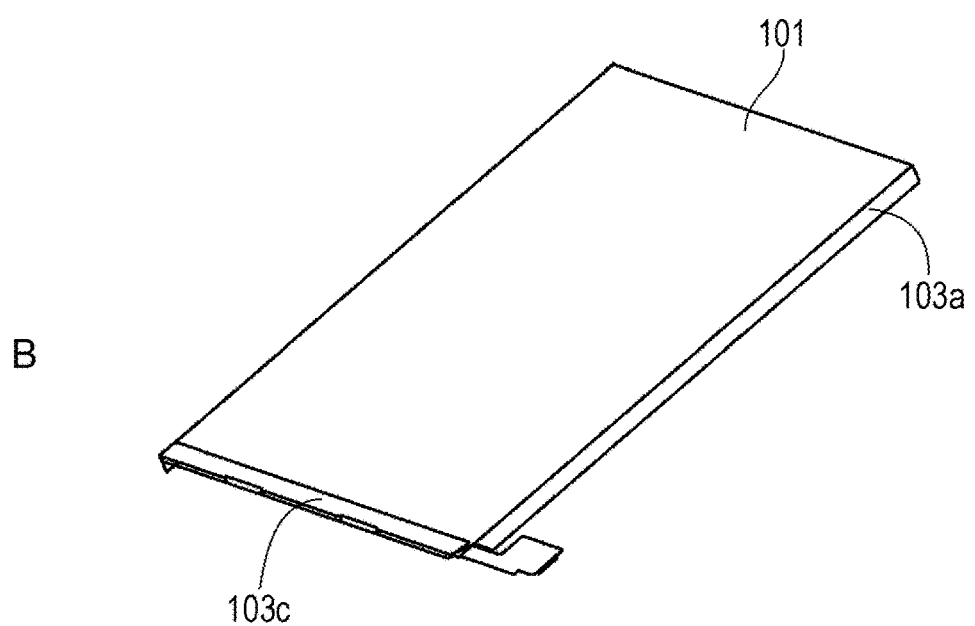
B

BATTERY, SEPARATOR, ELECTRODE, COATING MATERIAL, BATTERY PACK, ELECTRONIC APPARATUS, ELECTRICALLY DRIVEN VEHICLE, ELECTRICAL STORAGE DEVICE, AND ELECTRIC POWER SYSTEM

CROSS REFERENCE TO RELATED APPLICATIONS

This application is a U.S. National Phase of International Patent Application No. PCT/JP2014/004416 filed on Aug. 28, 2014, which claims priority benefit of Japanese Patent Application No. JP 2013-229673 filed in the Japan Patent Office on Nov. 5, 2013. Each of the above-referenced applications is hereby incorporated herein by reference in its entirety.

TECHNICAL FIELD

The present disclosure relates to a battery, a separator, an electrode, a coating material, a battery pack, an electronic apparatus, an electrically driven vehicle, an electrical storage device, and an electric power system.

BACKGROUND ART

A lithium ion secondary battery is excellent in an energy density and has been spreading for a portable apparatus and the like. As the lithium ion secondary battery, batteries, in which a laminated film is used for an exterior packaging member, have been put into practical use because the energy density of the batteries is high at a light weight and the batteries can be manufactured in a very thin shape.

In batteries such as the lithium ion secondary battery in which the laminated film is used as the exterior packaging member, an electrolytic solution and a polymer compound are used as an electrolyte so as to obtain liquid leakage resistance and the like, and the batteries are known as polymer batteries. Among these batteries, a gel electrolyte battery, in which an electrolytic solution is retained by a polymer compound and has a so-called gel shape, is widely spread.

As a technology related to the gel electrolyte battery, Patent Document 1 suggests a configuration in which a resin is applied to a surface of a separator. Patent Document 2 suggests a configuration in which alumina particles and the like are mixed in the gel electrolyte to improve the strength of the gel electrolyte.

CITATION LIST

Patent Document

Patent Document 1: Japanese Patent No. 4986009
Patent Document 2: Japanese Patent Application Laid-Open No. 2010-198757

SUMMARY OF THE INVENTION

Problems to be Solved by the Invention

In a battery including a particle-containing resin layer such as a particle-containing gel electrolyte, it is difficult to manage the thickness of the particle-containing resin layer with high accuracy due to occurrence of white turbidity and the like in the coating material for forming the resin layer.

Accordingly, an object of the present disclosure is to provide a battery in which the thickness of a particle-containing resin layer is capable of being managed with high accuracy, a separator, an electrode, a coating material, and a battery pack, an electronic apparatus, an electrically driven vehicle, an electrical storage device, and an electric power system which use the battery, the separator, the electrode, and the coating material.

Solutions to Problems

To solve the above-described problem, according to the present disclosure, there is provided a battery including a positive electrode, a negative electrode, a separator, an electrolytic solution, and a particle-containing resin layer that contains particles and a resin. A shape of the particles includes a plane, a plane rate of the particles is greater than 40% and equal to or less than 100%, and a refractive index of the particles is equal to or greater than 1.3 and less than 2.4.

According to the present disclosure, there is provided a separator including a separator base material, and a particle-containing resin layer which is provided on at least one main surface of the separator base material and contains particles and a resin. A shape of the particles includes a plane, a plane rate of the particles is greater than 40% and equal to or less than 100%, and a refractive index of the particles is equal to or greater than 1.3 and less than 2.4.

According to the present disclosure, there is provided a particle-containing resin layer attached electrode including an electrode, and a particle-containing resin layer which is provided on at least one main surface of the electrode and contains particles and a resin. A shape of the particles includes a plane, a plane rate of the particles is greater than 40% and equal to or less than 100%, and a refractive index of the particles is equal to or greater than 1.3 and less than 2.4.

According to the present disclosure, there is provided a coating material containing particles, a resin, and a solvent.
A shape of the particles includes a plane, a plane rate of the particles is greater than 40% and equal to or less than 100%, and a refractive index of the particles is equal to or greater than 1.3 and less than 2.4.

In addition, a battery pack, an electronic apparatus, an electrically driven vehicle, an electrical storage device, and an electric power system include the above-described battery.

Effects of the Invention

According to the present disclosure, it is possible to manage the thickness of the particle-containing resin layer with high accuracy.

BRIEF DESCRIPTION OF DRAWINGS

FIG. 2A is a SEM photograph of talc particles.
FIG. 2B is a SEM photograph of boehmite particles.

FIG. 11A is a schematic perspective view illustrating external appearance of the simple type battery pack. FIG. 11B is a schematic perspective view illustrating external appearance of the simple type battery pack.

Figure 1:
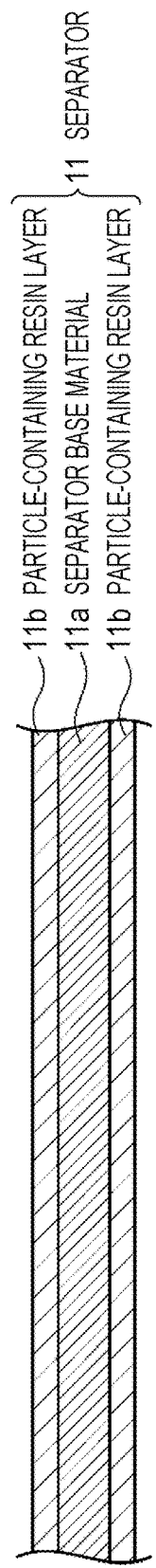
FIG. 1 is a schematic cross-sectional view of a separator according to an embodiment of the present disclosure.

MODE FOR CARRYING OUT THE INVENTION (Technical Background)

First, description will be given of the technical background of the present disclosure for easy understanding of the present disclosure. Recently, there is an attempt to use a battery after charging the battery at a high voltage for a high capacity. However, in a part of constituent materials of the battery, deterioration progresses at a high voltage. Particularly, deterioration due to oxidation of the separator is a representative example.

With regard to the deterioration of the separator due to oxidation, for example, in Patent Document 1 (Japanese Patent No. 4986009) in [BACKGROUND ART], there is an attempt for a technology in which a resin such as a polyvinylidene fluoride and polytetrafluoroethylene is applied to a surface of the separator to form a resin layer on the surface of the separator.

The resin layer, which is formed on the surface of the separator, is interposed between the separator and an electrode to prevent the deterioration due to direct contact between the separator and the electrode from progressing. It is also effective to form the resin layer on an electrode surface side through application.

In addition, along with a recent demand for a high capacity, an exterior pack of a laminated film type polymer battery becomes simple. Therefore, in a case where a deformation is great when a strong pressure is applied due to improper use, short-circuiting occurs at the inside of the battery, and thus the battery may not function as a battery.

In contrast, for example, Patent Document 2 (Japanese Patent Application Laid-Open No. 2010-198757) suggests that alumina particles and the like are mixed in a gel electrolyte to improve the strength of the gel electrolyte.

When manufacturing a battery described in Patent Document 2, for example, the following method is typically employed. An electrolytic solution, a matrix resin, and particles are mixed in advance, and a solvent is added to the resultant mixture to obtain a sol-like mixture. The sol-like mixture is formed on an electrode, and the solvent is evaporated for solidification, thereby forming a gel-like electrolyte layer. Then, the electrode, on which the gel-like electrolyte layer is formed, is laminated or laminated and wound in combination of a separator, thereby obtaining a power generation element.

However, in the method, when forming the gel-like electrolyte layer, there is a problem that a component in which volatility from an electrolytic solution component is high, or a component having a boiling point, which is equal to or lower than a drying temperature, is leaked.

Here, the following method (post injection method) is attempted to solve the problem. Alumina particles and the like are dispersed in advance in the matrix resin layer that is provided on the separator or the electrode, and the separator and the electrode are wound or laminated to obtain an element. Then, when the element is sealed with an aluminum laminated exterior package, the electrolytic solution is injected into the exterior package that accommodates the element to impregnate the matrix resin layer with the electrolytic solution, thereby forming a gel electrolyte layer.

However, a particle-containing resin solution in which the alumina particles and the like are mixed enters a state in which the degree of transparency is bad. Accordingly, when forming the resin layer that contains the alumina particles and the like on a surface of the separator and/or the electrode, it is difficult to measure an application thickness with accuracy in real time by using an optical film thickness measuring device such as a laser simultaneously with the application of the particle-containing resin solution. Therefore, during a process of applying the particle-containing resin solution, it is difficult to manage the application thickness with accuracy in real time.

Accordingly, for example, in the case of employing the method (post injection method) of forming the above-described gel electrolyte layer, typically, after the particle-containing resin solution is applied and dried, the separator or the electrode is wound to form an element. Then, determination of whether or not the thickness is regarded as "passing" is made to manage the application thickness of the particle-containing resin solution. However, in management of the application thickness, a lot of time is taken for adjustment of the application thickness, or a material loss occurs.

In the present disclosure, the degree of transparency of the particle-containing resin solution that contains particles is improved. Accordingly, it is possible to measure and adjust the thickness of the particle-containing resin solution layer that is formed on a surface of at least any one of the electrode and the separator with accuracy in real time during a process of applying the particle-containing resin solution. According to this, it is possible to manage the thickness of the particle-containing resin layer that is formed with high accuracy by removing a solvent from the particle-containing resin solution. As a result, it is possible to provide a battery including the particle-containing resin layer of which a thickness is managed with high accuracy. In this battery, function deterioration of the particle-containing resin layer due to excess or deficiency in the thickness of the particle-containing resin layer is suppressed, and thus it is possible to maintain high stability.

Hereinafter, embodiments of the present disclosure will be described with the accompanying drawings. Furthermore, description will be made in the following order.

1. First Embodiment (Example of Separator)
2. Second Embodiment (Example of Particle-Containing Resin Layer Attached Electrode)
3. Third Embodiment (Example of Laminated Film Type Battery)
4. Fourth Embodiment (Example of Laminated Film Type Battery)
5. Fifth Embodiment (Example of Cylindrical Battery)
6. Sixth Embodiment (Example of Cylindrical Battery)
7. Seventh Embodiment (Example of Battery Pack of Laminated Film Type Battery)
8. Eighth Embodiment (Example of Battery Pack)
9. Ninth Embodiment (Example of Electrical Storage System and the like).
10. Other Embodiments (Modification Examples)

On the other hand, the following embodiments and the like are preferred specific examples of the present technology, and the content of the present technology is not limited by the embodiments or the like. In addition, effects described in this specification are illustrative only, and there is no limitation thereto. In addition, it is not intended to deny existence of other effects different from effects which are exemplified.

1. First Embodiment (1-1) Configuration of Separator

Description will be given of a separator according to a first embodiment of the present disclosure. FIG. 1 is a schematic cross-sectional view illustrating a configuration example of the separator according to the first embodiment of the present disclosure. As illustrated in FIG. 1, a separator 11 according to the first embodiment of the present disclosure includes a separator base material 11a, and a particle-containing resin layer 11b that is formed on a main surface of at least one of the separator base material 11a.

[Separator Base Material]

The separator base material 11a is a porous film that is constituted by an insulating film in which ion permeability is large and which has a predetermined mechanical strength. A nonaqueous electrolytic solution is retained in a vacancy of the separator base material 11a.

As a resin material that constitutes the separator base material 11a, it is preferable to use, for example, a polyolefin resin such as polypropylene and polyethylene, an acrylic resin, a styrene resin, a polyester resin, a nylon resin, and the like. Particularly, polyethylene such as low-density polyethylene, high-density polyethylene, and linear polyethylene, low-molecular-weight wax thereof, or a polyolefin resin such as polypropylene has an appropriate melting temperature and is easily available, and thus can be preferably used. In addition, it is possible to employ a structure in which two or more kinds of porous films are laminated, or a porous film that is formed by melting and kneading two or more kinds of resin materials. When including the porous film composed of the polyolefin resin, isolation between the positive electrode and the negative electrode becomes excellent, and it is possible to further reduce a decrease in internal short-circuit.

[Particle-Containing Resin Layer]

The particle-containing resin layer 11b contains particles as filler, and a resin, and has a porous structure in which, for example, a plurality of minute vacancies are formed. When including the particle-containing resin layer 11b, characteristics of the separator such as heat resistance and oxidation resistance can be improved. Although details will be described later, the particle-containing resin layer 11b is formed by removing a dilution solvent from a particle-containing resin solution layer, which is formed on the separator base material 11a and is composed of a resin solution (also referred to as a coating material) including particles, a resin, and the dilution solvent, through drying and the like.

The particle-containing resin layer 11b may contain an electrolytic solution. For example, in a state in which the separator 11 is provided to a battery, the particle-containing resin layer 11b is impregnated with the electrolytic solution, and thus the particle-containing resin layer 11b contains the electrolytic solution. In this case, the particle-containing resin layer 11b containing the electrolytic solution enters a first state or a second state in accordance with electrolytic solution absorbability of the resin that is contained in the particle-containing resin layer 11b, and the like.

Furthermore, the electrolytic solution absorbability of the resin may be changed by adjusting the kind of resins, the degree of polymerization, a molecular weight, and the like. In this specification, a resin, which allows the particle-containing resin layer 11b that contains the electrolytic solution to enter the first state, is referred to as a binder polymer compound, and a resin, which allows the particle-containing resin layer 11b that contains the electrolytic solution to enter the second state, is referred to as a matrix polymer compound.

(First State)

In the first state, the electrolytic solution enters a state of being contained in the particle-containing resin layer 11b in a state of existing in micropores (vacancies) formed in at least any one of the binder polymer compound and the particles. In this case, the particle-containing resin layer 11b has a function as a separator. That is, for example, the particle-containing resin layer 11b is interposed between the positive electrode and the negative electrode in combination with the separator base material 11a, and prevents active materials of both electrodes from coming into contact with each other and retains the electrolytic solution in the micropores similar to the separator base material 11a to form an interelectrode ion conduction path.

(Second State)

In the second state, the electrolytic solution enters a state of being contained in the particle-containing resin layer 11b in a state of being absorbed to the matrix polymer compound. Furthermore, in this state, the matrix polymer compound absorbs the electrolytic solution, swells, and enters a so-called gel state. The electrolytic solution and particles are retained by the matrix polymer compound. A porous structure of the particle-containing resin layer 11b may disappear in combination with the swelling of the matrix polymer compound. In this case, the particle-containing resin layer 11b has a function as an electrolyte. That is, in the particle-containing resin layer 11b, the matrix polymer compound, which absorbs the electrolytic solution, becomes an electrolyte that functions as an ionic conductor.

(Resin)

With regard to the resin, a resin, which is compatible with a solvent, can be used as the matrix polymer compound and the binder polymer compound. Examples of the resin include a fluorine-containing resin such as polyvinylidene fluoride and polytetrafluoroethylene, a fluorine-containing rubber such as a vinylidene fluoride-tetrafluoroethylene copolymer, and an ethylene-tetrafluoroethylene copolymer, rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate, a cellulose derivative such as ethyl cellulose, methyl cellulose, hydroxyethyl cellulose, and carboxymethyl cellulose, a resin such as polyphenylene ether, polysulfone, polyether sulfone, polyphenylene sulfide, polyetherimide, polyimide, polyamide (particularly, aramide), polyamideimide, polyacrylonitrile, polyvinyl alcohol, polyether, acrylic acid resin, and polyester in which at least one of a melting point and a glass transition temperature is 180° C. or higher, polyethylene glycol, and the like.

For example, the resin may be fibrillated, and may have a three-dimensional network structure in which fibrils are continuously connected to each other. The filler (particles) may be carried by the resin having the three-dimensional network structure, and may maintain a dispersed state without being connected to each other. In addition, the resin may bind the surface of the separator base material 11a and the particles to each other without being fibrillated. In this case, it is possible to obtain further higher binding properties.

(Filler)

As the filler that is contained in the particle-containing resin layer 11b, particles, which have a shape including a plane, have a predetermined plate rate, and have a predetermined refractive index, are used from the viewpoint of reducing optical scattering and securing transparency of the particle-containing resin solution layer that is a precursor of the particle-containing resin layer 11b. For example, a powder of a white inorganic material such as alumina particles is constituted by colorless transparent particles, but become white due to an optical scattering phenomenon. In the present disclosure, it is preferable to use particles, which have a shape including a plane, have a predetermined plane rate, and have a predetermined refractive index, as the filler to suppress the optical scattering that is a main cause for the whitening, and to improve transparency of the particle-containing resin solution layer that is a precursor of the particle-containing resin layer 11b.

Examples of the plane of the particles include at least one of a crystal plane that occurs through grain growth, a broken plane, and a cleavage plane, and the like. For example, the broken plane is formed through natural breakage during mixing of particles, a resin, and a dilution solvent when preparing a coating material that forms a particle-containing resin solution layer, or through intentional dividing for particle size control during preparation of the particles. For example, the cleavage plane is formed through intentional division or natural breakage in a specific atomic arrangement plane in a single crystal. For example, the particles may be a single crystal, a polycrystal, or an assembly of the single crystal and the polycrystal.

(SEM Photograph)

FIG. 2A illustrates a SEM photograph of talc particles having a shape including a plane which is observed with a scanning electron microscope (SEM) so as to illustrate external appearance in a typical example of the particles having a shape including a plane. FIG. 2B illustrates a SEM photograph of boehmite particles having a shape including a plane which is observed with the SEM. In the SEM photograph illustrated in FIG. 2A, a particle surface centering around a cleavage of the talc particles is observed. In the SEM photograph illustrated in FIG. 2B, a particle surface surrounded by a crystal plane that is formed through grain growth during hydrothermal synthesis of boehmite is observed.

(Plane Rate)

It is preferable that the plate rate of the particles is greater than 40% and equal to or less than 100% from the viewpoint of securing transparency of the particle-containing resin solution layer, more preferably 45% to 100% from the viewpoint of further improving the transparency, and still more preferably 60% to 100%. Furthermore, for example, the plane rate can be obtained as follows.

(Method of Measuring Plane Rate)

The particle-containing resin layer 11b is observed with a scanning electron microscope (SEM) in a direction perpendicular to a main surface of the particle-containing resin layer 11b, and a picture of 10 particles, which have a typical shape in a size approximately equal to a 50% average particle size (D50) on a volume basis, is taken. Furthermore, the average particle size (D50) is a value that is measured by putting a powder, which is obtained by removing a resin component and the like from the particle-containing resin layer 11b, into a laser diffraction particle size analyzer. Next, with respect to respective particles, a projection area of a plane (in a case where a plurality of the planes exist, a total area thereof) equivalent to the crystal plane, the broken plane, or the cleavage plane in a projection area is obtained to calculate the percentage of the projection area of the plane with respect to a projection area of all of the particles, and then an average value of the calculated percentages of the respective particles is set as the plane rate.

(Method of Producing Particle Having Shape Including Plane)

Examples of producing the particles having a shape including a plane include a growth method of growing a single crystal to form a flat crystal plane, a method of dividing crystal particles through pulverization, and the like. As the method of growing the single crystal, a flux method in which growing occurs in a liquid, a hydrothermal growth method, a coprecipitation method, and the like are preferable.

In the case of pulverization, a method of using a material having Mohs hardness of 5 or less, a method of cleaving a specific lattice plane, and the like can be exemplified. In this case, in a process of dispersing a material in a coating material, dispersion of the material and pulverization of the material can be simultaneously performed by using a dispersion type such as a despa mill and a bead mill.

(Refractive Index of Particles)

The refractive index of particles is equal to or greater than 1.3 and less than 2.4 from the viewpoint of securing transparency of the particle-containing resin solution layer, and preferably 1.3 to 2.1. The reason for this is that a decrease in transparency due to scattering through optical refraction, which is caused by a difference (a difference between a high refractive index of a solid and a low refractive index of a liquid) in a refractive index between the resin solution and the particles, is suppressed. Among solid particles, particles, in which a refractive index on a low refractive index side is in a range of equal to or greater than 1.3 and less than 2.4, and preferably in a range of 1.3 to 2.1, are used so as to make a refractive index of the solid particles be close to that of the resin solution that is a liquid.

As the particles, specifically, for example, at least one kind of inorganic particles and organic particles, and the like can be used. Examples of the inorganic particles which can be used include particles of a metal oxide, a sulfate compound, a carbonate compound, a metal hydroxide, a metal carbide, a metal nitride, a metal fluoride, a phosphate compound, a mineral, and the like. Furthermore, typically, particles having electrical insulating properties are used, but particles (fine particles), which are obtained by subjecting surfaces of the particles (fine particles) of a conductive material to a surface treatment and the like with an electrically insulating material to have the electrical insulating properties, may be used.

Examples of the metal oxide, which can be preferably used, include silicon oxide ($SiO_2$), silica (silica powder, quartz glass, glass bead, diatomite, wet or dry synthesized product, and the like; examples of the wet synthesized product include colloidal silica, and examples of the dry synthesized product include fumed silica), zinc oxide (ZnO), tin oxide (SnO), magnesium oxide (magnesia, MgO), antimony oxide ($Sb_2O_3$), aluminum oxide (alumina, $Al_2O_3$), and the like.

Examples of the sulfate compound, which can be preferably used, include magnesium sulfate ($MgSO_4$), calcium sulfate ($CaSO_4$), barium sulfate ($BaSO_4$), strontium sulfate ($SrSO_4$), and the like. Examples of the carbonate compound, which can be preferably used, include magnesium carbonate ($MgCO_3$, magnesite), calcium carbonate ($CaCO_3$, calcite), barium carbonate ($BaCO_3$), lithium carbonate ($Li_2CO_3$), and the like. Examples of the metal hydroxide, which can be preferably used, include oxyhydroxide or hydrous oxide such as magnesium hydroxide ($Mg(OH)_2$, brucite), aluminum hydroxide ($Al(OH)_3$ (bayerite, gibbsite)), zinc hydroxide ($Zn(OH)_2$), boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), and magnesium oxide hydrate ($MgO_a.mH_2O$ (a=0.8 to 1.2, and m=0.5 to 10)), a hydroxide hydrate such as magnesium hydroxide octahydrate, and the like. Examples of the metal carbide, which can be preferably used, include boron carbide ($B_4C$), and the like. Examples of the metal nitride, which can be preferably used, include silicon nitride ($Si_3N_4$), boron nitride (BN), aluminum nitride (AlN), titanium nitride (TiN), and the like.

Examples of the metal fluoride, which can be preferably used, include lithium fluoride (LiF), aluminum fluoride ($AlF_3$), calcium fluoride ($CaF_2$), barium fluoride ($BaF_2$), magnesium fluoride, and the like. Examples of the phosphate compound, which can be preferably used, include trilithium phosphate ($Li_3PO_4$), magnesium phosphate, magnesium hydrogenphosphate, ammonium polyphosphate, and the like.

Examples of the mineral include a silicate mineral, a carbonate mineral, an oxide mineral, and the like. The silicate mineral is classified into a nesosilicate mineral, a sorosilicate mineral, a cyclosilicate mineral, an inosilicate mineral, a layered (philo) silicate mineral, and a tectosilicate mineral on the basis of a crystal structure. Furthermore, there is a mineral that is classified as a fibrous silicate mineral called asbestos on the basis of a classification standard different from the crystal structure.

The nesosilicate mineral is an island-shaped tetrahedral silicate mineral constituted by independent Si—O tetrahedron ($[SiO_4]^{4-}$). Examples of the nesosilicate mineral include minerals equivalent to olivines, minerals equivalent to garnets, and the like. More specific examples of the nesosilicate mineral include olivine (continuous solid-solution of $Mg_2SiO_4$ (forsterite) and $Fe_2SiO_4$ (fayalite)), magnesium silicate (forsterite, $Mg_2SiO_4$), aluminum silicate ($Al_2SiO_5$, sillimanite, andalusite, kyanite), zinc silicate (willemite, $Zn_2SiO_4$), zirconium silicate (zircon, $ZrSiO_4$), mullite ($3Al_2O_3.2SiO_2 \to 2Al_2O_3.SiO_2$), and the like.

The sorosilicate mineral is a group structure type silicate mineral that is constituted by a multiple bond group ($[Si_2O_7]^{6-}$ and $[Si_5O_{16}]^{12-}$) of the Si—O tetrahedron. Examples of the sorosilicate mineral include minerals equivalent to vesuvianite and epidote, and the like.

The cyclosilicate mineral is an annular body type silicate mineral that is constituted by a finite (three to six)-bond annular body ($[Si_3O_9]^{6-}$, $[Si_4O_{12}]^{8-}$, and $[Si_6O_{18}]^{12-}$) of the Si—O tetrahedron. Examples of the cyclosilicate mineral include beryl, tourmalines, and the like.

The inosilicate mineral is a fibrous silicate mineral in which connection of the Si—O tetrahedron indefinitely extends, and makes up a chain shape ($[Si_2O_6]^{4-}$), and a strip shape ($[Si_3O_9]^{6-}$, $[Si_4O_{11}]^{6-}$, $[Si_5O_{15}]^{10-}$, and $[Si_7O_{21}]^{14-}$). Examples of the inosilicate mineral include minerals equivalent to pyroxenes such as calcium silicate (wollastonite, $CaSiO_3$), minerals equivalent to amphiboles, and the like.

The layered silicate mineral is a layered silicate mineral that makes up a mesh bond of the Si—O tetrahedron ($[SiO_4]^{4-}$). Furthermore, specific examples of the layered silicate mineral will be described later.

The tectosilicate mineral is a three-dimensional network structure type silicate mineral in which the Si—O tetrahedron ($[SiO_4]^{4-}$) makes up a three-dimensional network bond. Examples of the tectosilicate mineral include quartz, feldspars, zeolites, aluminosilicate ($aM_2O.bAl_2O_3.cSiO_2.dH_2O$, M represents a metallic element, and a, b, c, and d are integers of 1 or greater, respectively) of zeolite ($M_{2/n}O.Al_2O_3.xSiO_2.yH_2O$, M represents a metallic element, n represents a valence of M, x≥2, and y≥0) and the like, and the like.

Examples of the asbestos include chrysotile, amosite, anthophyllite, and the like.

Examples of the carbonate mineral include dolomite ($CaMg(CO_3)_2$), hydrotalcite ($Mg_6Al_2(CO_3)(OH)_{16}.4(H_2O)$), and the like.

Examples of the oxide mineral include spinel ($MgAl_2O_4$), and the like.

As other minerals, barium titanate ($BaTiO_3$), strontium titanate ($SrTiO_3$), and the like can be exemplified. Furthermore, the minerals may be natural minerals or artificial minerals.

Furthermore, some of the minerals are classified as clay minerals. Examples of the clay minerals include a crystalline clay mineral, a non-crystalline or quasi-crystalline clay mineral, and the like. Examples of the crystalline clay minerals include a layered silicate mineral, a mineral having a structure close to that of layered silicate, other silicate minerals, a layered carbonate mineral, and the like.

The layered silicate mineral includes a tetrahedral sheet of Si—O, and an octahedral sheet of Al—O, Mg—O, and the like which are associated with the tetrahedral sheet. Typically, a layered silicate is classified in accordance with the number of the tetrahedral sheets and the octahedral sheets, the number of positive ions of an octahedron, and a layer charge. Furthermore, the layered silicate mineral may be a mineral in which the entirety or a part of interlayer metal ions is substituted with an organic ammonium ion and the like, and the like.

Specific examples of the layered silicate mineral include minerals equivalent to a kaolinite-serpentine group having 1:1 type structure, a pyrophyllite-talc group having 2:1 type structure, a smectite group, a vermiculite group, a mica group, a brittle mica group, a chlorite group, and the like, and the like.

Examples of the mineral equivalent to the kaolinite-serpentine group include chrysotile, antigorite, lizardite, kaolinite ($Al_2Si_2O_5(OH)_4$), dickite, and the like. Examples of the mineral equivalent to the pyrophyllite-talc group include talc ($Mg_3Si_4O_{10}$ $(OH)_2$), willemseite, pyrophyllite ($Al_2Si_4O_{10}(OH)_2$), and the like. Examples of the mineral equivalent to the smectite group include saponite [($Ca/2$, $Na)_{0.33}(Mg, Fe^{2+})_3(Si, Al)_4O_{10}(OH)_2 \cdot 4H_2O$], hectorite, sauconite, montmorillonite {($Na$, $Ca)_{0.33}(Al$, $Mg)2Si_4O_{10}$ $(OH)_2 \cdot nH_2O$; examples of clay that contains montmorillonite as a main component is referred to asbentonite}, beidellite, nontronite, and the like. Examples of the mineral equivalent to the mica group include muscovite ($KAl_2$ $(AlSi_3)O_{10}(OH)_2$), sericite, phlogopite, biotite, lepidolite, and the like. Examples of the mineral equivalent to the brittle mica group include margarite, clintonite, anandite, and the like. Examples of the mineral equivalent to chlorite group include cookeite, sudoite, clinochlore, chamosite, nimite, and the like.

Examples of the mineral having a structure close to that of layered silicate include moisture-containing magnesium silicate which has a 2:1 ribbon structure in which tetrahedral sheets arranged in a ribbon shape are connected to an adjacent tetrahedral sheet arranged in a ribbon shape during reverse rotation around the apex, and the like. Examples of the moisture-containing magnesium silicate include sepiolite ($Mg_9Si_{12}O_{30}$ $(OH)_6(OH_2)_4 \cdot 6H_2O$), palygorskite, and the like.

Examples of other silicate minerals include porous aluminosilicate such as zeolite ($M_{2/n}O \cdot Al_2O_3 \cdot xSiO_2 \cdot yH_2O$, M represents a metallic element, n represents a valence of M, $x \geq 2$, $y \geq 0$), attapulgite [($Mg$, $Al)2Si_4O_{10}(OH) \cdot 6H_2O$], and the like.

Examples of the layered carbonate mineral include hydrotalcite ($Mg_6Al_2(CO_3)(OH)_{16} \cdot 4(H_2O)$), and the like.

Examples of the non-crystalline or quasi-crystalline clay mineral include hisingerite, imogolite ($Al_2SiO_3(OH)$), allophane, and the like.

These inorganic particles may be used alone, or two more kinds thereof may be mixed and used.

The particles may be organic particles. Examples of a material that constitutes the organic particles include melamine, melamine cyanurate, melamine polyphosphate, crosslinked polymethyl methacrylate (crosslinked PMMA), polyethylene, polypropylene, polystyrene, polytetrafluoroethylene, polyvinylidene fluoride, polyamide, polyimide, a melamine resin, a phenol resin, an epoxy resin, and the like. These materials may be used alone, or two or more kinds thereof may be mixed and used.

(Mixing Ratio Between Particles and Resin)

It is preferable that a mixing ratio (particle/resin) between particles and a resin is in a range of 15/85 to 90/10 on the basis of a mass ratio (particle/resin) from the viewpoint of making the refractive index of the resin solution be close to that of the particles to further improve transparency of the resin-containing resin solution, more preferably in a range of 20/80 to 90/10, and still more preferably in a range of 20/80 to 80/20.

(Thickness of Separator)

The thickness of the separator 11 may be set in an arbitrary manner as long as the thickness is equal to or greater than a thickness capable of maintaining necessary strength. It is preferable that the separator 11 is set to a thickness which realizes insulation between the positive electrode and the negative electrode to prevent short-circuiting and the like, has ion permeability for a preferable battery reaction through the separator 11, and is capable of increasing volume efficiency of an active material layer, which contributes to the battery reaction in a battery, as much as possible. Specifically, for example, the thickness of the separator 11 is preferably 7 μm to 20 μm. Furthermore, the thickness of the separator 11 is not limited to the range.

(1-2) Method of Manufacturing Separator

The separator 11 according to the first embodiment as described above can be manufactured as follows.

The particle-containing resin layer 11b is formed on one main surface or both main surfaces of the separator base material 11a. According to this, it is possible to obtain the separator 11. For example, the particle-containing resin layer 11b can be formed in accordance with the following first example and second example.

First Example

A resin and particles are mixed in a predetermined mass ratio, and the resultant mixture is added to a dispersion solvent such as n-methyl-2-pyrrolidone to dissolve the resin, thereby obtaining a coating material (particle-containing resin solution). Continuously, the coating material is applied to at least one surface of the separator base material 11a to form the particle-containing resin solution layer.

When forming the particle-containing resin solution layer, typically, the thickness of an applied film is measured with an optical film thickness measuring device such as a laser. In a case where a measured value is different from a predetermined target thickness, the amount of the coating material ejected is automatically adjusted to adjust the application thickness of the coating material. In the present disclosure, particles, which have a predetermined plate rate and a predetermined refractive index, are used, and thus it is possible to obtain a coating material of which transparency is improved. According to this, it is possible to form the particle-containing resin solution layer while managing the application thickness with accuracy in real time by using the optical film thickness measuring device such as the laser. Accordingly, it is possible to form the particle-containing resin layer 11b of which a thickness is managed with high accuracy. Furthermore, this is true of the second example to be described later.

After application, the particle-containing resin solution layer is dried with hot wind and the like to obtain the separator 11 in which the particle-containing resin layer 11b is formed on the surface of the separator base material 11a. Furthermore, in the first example, the resin does not have a three-dimensional network structure that is peculiar to the following second example. For example, the resin exists at least between particles or between the particles and the surface of the base material, and binds the particles to each other or binds the particles and the surface of the base material to each other.

Second Example

As is the case with the first example, the resin and the particles are mixed in a predetermined mass ratio, and the resultant mixture is added to a dispersion solvent such as N-methyl-2-pyrrolidone to dissolve the resin, thereby obtaining a coating material (particle-containing resin solution). Continuously, the coating material is applied to at least one surface of the separator base material 11a to form the particle-containing resin solution layer.

Continuously, the separator base material 11a, on which the particle-containing resin solution layer is formed, is immersed in a water bath for phase separation of the particle-containing resin solution, and then drying is performed. That is, the particle-containing resin solution layer, which is formed on the surface of the separator base material 11a, is brought into contact with water or the like which is a poor solvent with respect to the resin that is dissolved in a dispersion solvent and is a good solvent with respect to the dispersion solvent that dissolves the resin for phase separation, and drying is performed with hot wind and the like. According to this, it is possible to obtain the separator 11 in which the particle-containing resin layer 11b composed of a resin having a particle-carrying three-dimensional network structure is formed on the surface of the separator base material 11a.

When using the method, the particle-containing resin layer 11b is formed due to a rapid poor solvent-induced phase separation phenomenon. In the particle-containing resin layer 11b, the resin is fibrillated, and has a three-dimensional network structure in which fibrils are continuously connected to each other. That is, when the particle-containing resin solution, in which the resin is dissolved, is brought into contact with a solvent such as water or the like which is a poor solvent with respect to the resin and is a good solvent with respect to the dispersion solvent that dissolves the resin, solvent exchange occurs. According to this, rapid (high-speed) phase separation accompanied with spinodal decomposition occurs, and the resin has a peculiar three-dimensional network structure. The particle-containing resin layer 11b, which is manufactured in the second example, uses the rapid poor solvent-induced phase separation phenomenon accompanied with the spinodal decomposition due to the poor solvent, and has a peculiar porous structure.

2. Second Embodiment

Figure 3:
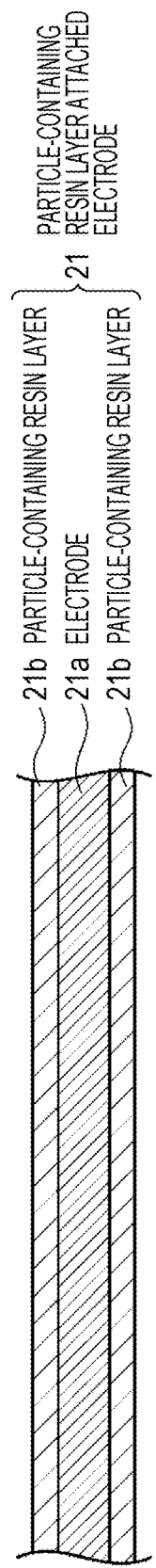
FIG. 3 is a schematic cross-sectional view of a particle-containing resin layer attached electrode according to the embodiment of the present disclosure.

Description will be given of a particle-containing resin layer attached electrode according to a second embodiment of the present disclosure. FIG. 3 is a schematic cross-sectional view illustrating a configuration example of the particle-containing resin layer attached electrode according to the second embodiment of the present disclosure.

As illustrated in FIG. 3, a particle-containing resin layer attached electrode 21 includes an electrode 21a, and a particle-containing resin layer 21b that is formed on at least one main surface of the electrode 21a. Furthermore, FIG. 3 illustrates a configuration example in which the particle-containing resin layer 21b is formed on both main surfaces of the electrode 21a, but the particle-containing resin layer 21b may be formed on only one main surface of the electrode 21a. In addition, the electrode 21a may be a positive electrode or a negative electrode.

[Particle-Containing Resin Layer]

The particle-containing resin layer 21b contains particles and a resin, and details of a configuration and a formation method thereof are the same as in the first embodiment except that the particle-containing resin layer 21b is formed on the electrode 21a instead of the separator base material 11a.

Furthermore, in a state in which the particle-containing resin layer attached electrode 21 according to the second embodiment is provided to a battery, the particle-containing resin layer 21b is impregnated with an electrolytic solution, and thus the particle-containing resin layer 21b contains the electrolytic solution. In this case, the particle-containing resin layer 21b, which contain the electrolytic solution, enters a first state or a second state in accordance with electrolytic solution absorbability of the resin that is contained in the particle-containing resin layer 21b, and the like.

(First State)

In the first state, the electrolytic solution enters a state of being contained in the particle-containing resin layer 21b in a state of existing in micropores (vacancies) formed in at least any one of the binder polymer compound and the particles. In this case, the particle-containing resin layer 21b has a function as a separator. That is, the particle-containing resin layer 21b is interposed between the positive electrode and the negative electrode, and prevents active materials of both electrodes from coming into contact with each other and retains the electrolytic solution in minute pores thereof to form an ion conduction path between the electrodes.

(Second State)

In the second state, the electrolytic solution enters a state of being contained in the particle-containing resin layer 21b in a state of being absorbed to the matrix polymer compound. Furthermore, in this state, the matrix polymer compound absorbs the electrolytic solution, swells, and enters a so-called gel state. The electrolytic solution and particles are retained by the matrix polymer compound. A porous structure of the particle-containing resin layer 11b may disappear in combination with the swelling of the matrix polymer compound. In this case, the particle-containing resin layer 21b has a function as an electrolyte. That is, in the particle-containing resin layer 21b, the matrix polymer compound, which absorbs the electrolytic solution, becomes an electrolyte that functions as an ionic conductor.

3. Third Embodiment

In a third embodiment of the present technology, description will be given of a laminated film type nonaqueous electrolyte battery (battery). For example, the nonaqueous electrolyte battery is a nonaqueous electrolyte secondary battery capable of being charged and discharged. In addition, the nonaqueous electrolyte battery is, for example, a lithium ion secondary battery.

Hereinafter, description will be given of two configuration examples (a first configuration example and a second configuration example) of the laminated film type nonaqueous electrolyte battery according to the third embodiment.

Furthermore, the battery according to the third embodiment is provided with a separator which is the same separator as in the first embodiment and uses a matrix polymer compound as the resin of the particle-containing resin layer 11b. In the battery according to the third embodiment, a separator 55 corresponds to the separator base material 11a, and a gel electrolyte layer 56 corresponds to the particle-containing resin layer 11b which is formed on the separator base material 11a and contains the electrolytic solution.

(3-1) First Configuration

Figure 4:
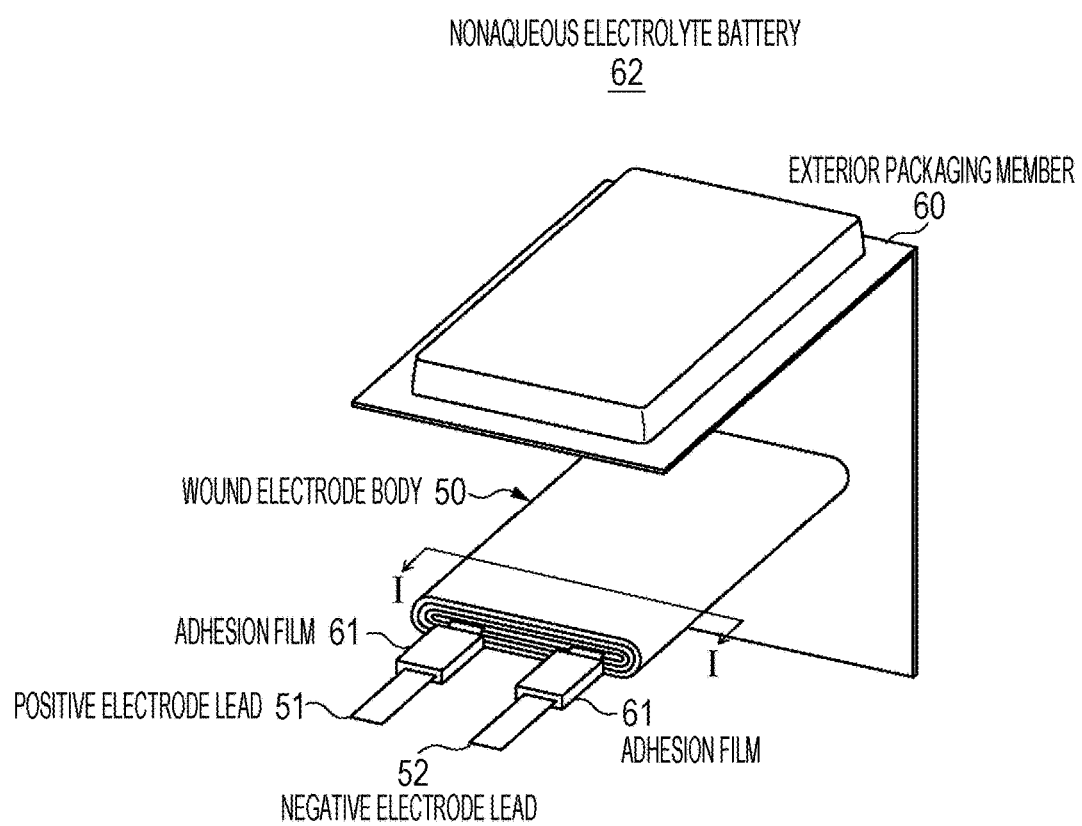
FIG. 4 is an exploded perspective view illustrating a configuration of a laminated film type nonaqueous electrolyte battery according to the embodiment of the present disclosure.

FIG. 4 illustrates a first configuration example of a nonaqueous electrolyte battery 62 according to the third embodiment. The nonaqueous electrolyte battery 62 is called a so-called laminated film type, and a wound electrode body 50, to which a positive electrode lead 51 and a negative electrode lead 52 are attached, is accommodated at the inside of a film-shaped exterior packaging member 60.

The positive electrode lead 51 and the negative electrode lead 52 are led out from the inside of the exterior packaging member 60 toward an outer side, for example, in the same direction. For example, the positive electrode lead 51 and the negative electrode lead 52 are constituted by a metallic material such as aluminum, copper, nickel, and stainless steel, and have a thin plate shape or a network shape.

For example, the exterior packaging member 60 is constituted by a laminated film in which a resin layer is formed on both surfaces of the metallic layer. In the laminated film, an outer side resin layer is formed on a surface of the metallic layer which is exposed to an outer side of a battery, and an inner side resin layer is formed on a surface, which faces power generation elements such as a wound electrode body 50, on an inner side of the battery.

The metallic layer has the most important function of blocking entrance of moisture, oxygen, and light to protect the contents, and aluminum (Al) is most commonly used to form the metallic layer from the viewpoints of lightness, extensibility, price, and easy processing. The outer side resin layer has beauty in exterior appearance, toughness, flexibility, and the like, and a resin material such as nylon or polyethylene terephthalate (PET) is used to form the outer side resin layer. The inner side resin layer is a portion to be melted and fused with each other with heat or ultrasonic waves, and thus polyolefin is preferable for the inner side resin layer, and casted polypropylene (CPP) is frequently used. An adhesive layer may be provided between the metallic layer and the outer side resin layer and between the metallic layer and the inner side resin layer, respectively, according to necessity.

In the exterior packaging member 60, a concave portion, which is formed, for example, through deep drawing in a direction toward the outer side resin layer from the inner side resin layer and accommodates the wound electrode body 50, is provided, and the inner side resin layer is disposed to face the wound electrode body 50. Inner side resin layers, which face each other, of exterior packaging member 60 are brought into close contact with each other at outer edge portions of the concave portion through fusion and the like. An adhesion film 61, which improves adhesiveness between the inner side resin layer of the exterior packaging member 60 and the positive electrode lead 51 and the negative electrode lead 52 which are formed from a metallic material, is disposed between the exterior packaging member 60, and the positive electrode lead 51 and between the exterior packaging member 60 and the negative electrode lead 52, respectively. The adhesion film 61 is formed from a resin material having a high adhesiveness with a metallic material. For example, the adhesion film 61 is formed from a polyolefin resin such as polyethylene, polypropylene, and modified polyethylene or modified polypropylene which is modified from the polyethylene or the polypropylene.

Furthermore, instead of an aluminum laminated film in which the metallic layer is formed from aluminum (Al), the exterior packaging member 60 may be formed from a laminated film having a different structure, a polymeric film such as polypropylene, or a metallic film.

Figure 5:
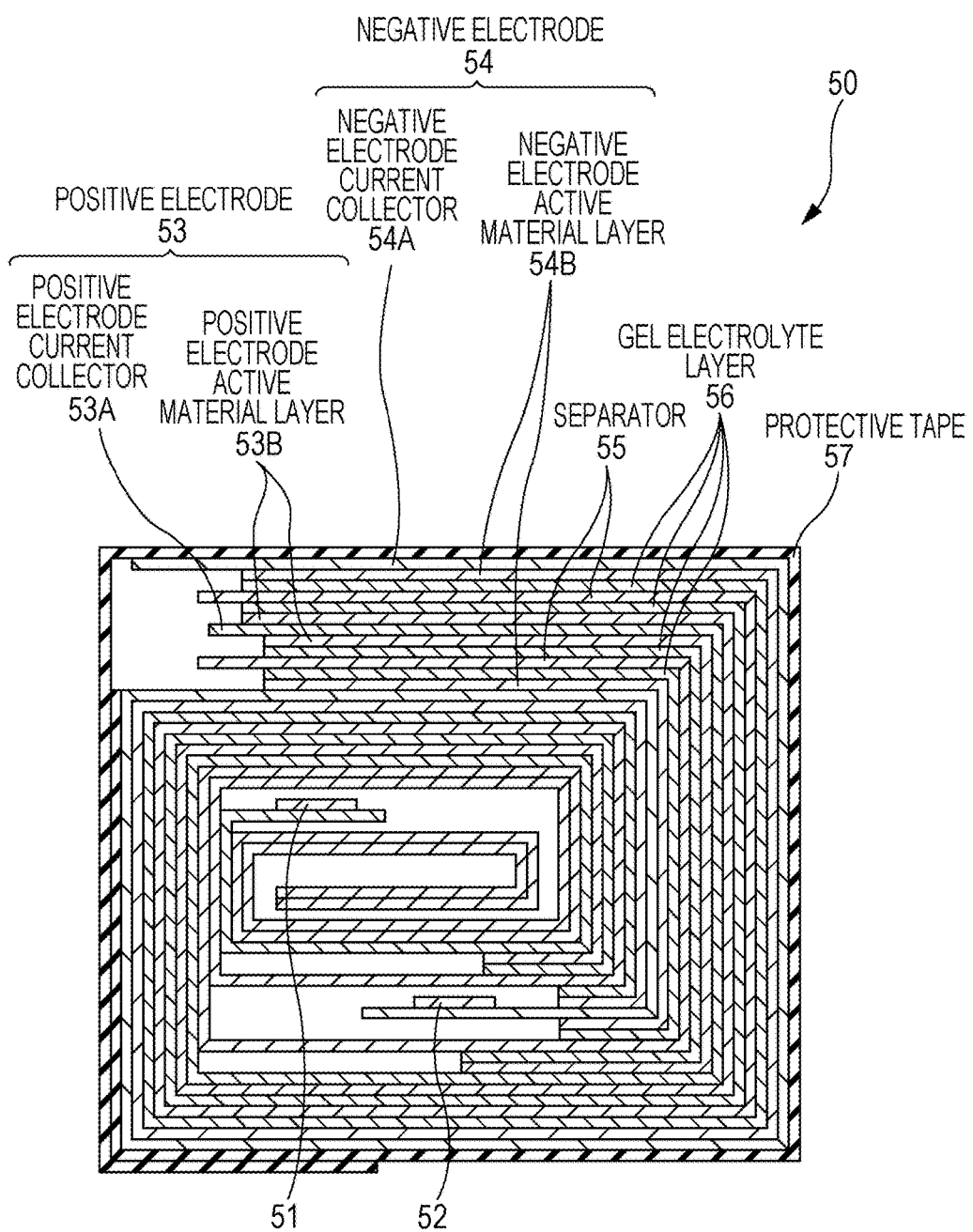
FIG. 5 is a cross-sectional view illustrating a cross-sectional configuration along a line I-I of the wound electrode body illustrated in FIG. 4.

FIG. 5 is a cross-sectional view illustrating a cross-sectional structure along line I-I in the wound electrode body 50 illustrated in FIG. 4.

As illustrated in FIG. 5, a wound electrode body 50 has a structure in which a strip-shaped positive electrode 53 and a strip-shaped negative electrode 54 are laminated through the strip-shaped separator 55 and the gel electrolyte layer 56 and the resultant laminated body is wound. The outermost peripheral portion of the wound electrode body 50 is protected by a protective tape 57 as necessary.

[Positive Electrode]

The positive electrode 53 has a structure in which a positive electrode active material layer 53B is provided on one surface or both surfaces of a positive electrode current collector 53A.

In the positive electrode 53, the positive electrode active material layer 53B that contains a positive electrode active material is formed on both surfaces of the positive electrode current collector 53A. As the positive electrode current collector 53A, for example, metal foil such as aluminum (Al) foil, nickel (Ni) foil, and stainless steel (SUS) foil can be used.

The positive electrode active material layer 53B contains anyone or more kinds of positive electrode materials, which are capable of intercalating and deintercalating lithium, as the positive electrode active material, and may contain other materials such as a binding agent and a conductive agent as necessary.

As the positive electrode material capable of intercalating and deintercalating lithium, for example, a lithium-containing compound is preferable. The reason for this is that a high energy density is obtained. Examples of the lithium-containing compound include a composite oxide that contains lithium and a transition metal element, a phosphate compound that contains lithium and a transition metal element, and the like. Among these, a lithium-containing compound, which contains at least one kind selected from the group consisting of cobalt (Co), nickel (Ni), manganese (Mn), and iron (Fe) as the transition metal element, is preferable. The reason for this is that a higher voltage is obtained.

As a positive electrode material, for example, a lithium-containing compound expressed by $Li_xM1O_2$ or $Li_yM2PO_4$ can be used. In the formula, M1 and M2 represent one or more kinds of transition metal elements. Values of x and y are different in accordance with a charge and discharge state of a battery. Typically, the values of x and y satisfy relationships of $0.05 \leq x \leq 1.10$ and $0.05 \leq y \leq 1.10$. Examples of the composite oxide that contains lithium and a transition metal element include a lithium-cobalt composite oxide ($Li_xCoO_2$), a lithium-nickel composite oxide ($Li_xNiO_2$), a lithium-nickel-cobalt composite oxide ($Li_xNi_{1-z}Co_zO_2$ ($0<z<1$)), a lithium-nickel-cobalt-manganese composite oxide ($Li_xNi_{(1-v-w)}Co_vMn_wO_2$ ($0<v+w<1$, $v>0$, $w>0$)), a lithium-manganese composite oxide ($LiMn_2O_4$) or a lithium-manganese-nickel composite oxide ($LiMn_{2-t}Ni_tO_4$ ($0<t<2$)) which has a spinel type structure, and the like. Among these, the composite oxide that contains cobalt is preferable. The reason for this is that a high capacity is obtained, and excellent cycle characteristics are also obtained. In addition, examples of the phosphate compound that contains lithium and a transition metal element include a lithium-iron phosphate compound ($LiFePO_4$), a lithium-iron-manganese phosphate compound ($LiFe_{1-u}Mn_uPO_4$ ($0<u<1$)), and the like.

Specific examples of the lithium composite oxide include a lithium cobaltate ($LiCoO_2$), a lithium nickelate ($LiNiO_2$), a lithium manganate ($LiMn_2O_4$), and the like. In addition, a solid-solution in which a part of transition metal elements is substituted with other elements can be used. Examples thereof include nickel-cobalt composite lithium oxides ($LiNi_{0.5}Co_{0.5}O_2$, $LiNi_{0.8}Co_{0.2}O_2$, and the like). The lithium composite oxides can generate a high voltage, and thus an energy density becomes excellent.

Composite particles, in which surfaces of particles of any of the lithium-containing compounds are coated with fine particles composed of any of other lithium-containing compounds, may be employed from the viewpoints of obtaining higher electrode charge properties and cycle characteristics.

In addition, examples of other positive electrode materials capable of intercalating and deintercalating lithium include an oxide such as vanadium oxide ($V_2O_5$), titanium dioxide ($TiO_2$), and manganese dioxide ($MnO_2$), disulfides such as iron disulfide ($FeS_2$), titanium disulfide ($TiS_2$), and molybdenum disulfide ($MoS_2$), a chalcogenide such as niobium diselenide ($NbSe_2$) that does not contain lithium (particularly, a layered compound or a spinel type compound), a lithium-containing compound that contains lithium, sulfur, and a conducive polymer such as polyaniline, polythiophene, polyacetylene, and polypyrrole. The positive electrode material, which is capable of intercalating and deintercalating lithium, may be a material other than the above-described materials. In addition, two or more kinds of the above-described positive electrode materials may be mixed in an arbitrary combination.

In addition, as the conductive agent, for example, a carbon material such as carbon black and graphite can be used. As the binding agent, it is possible to use, for example, at least one kind selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers containing these resin materials as a main component.

The positive electrode 53 includes the positive electrode lead 51 that is connected to one end of the positive electrode current collector 53A through spot welding or ultrasonic welding. As the positive electrode lead 51, metal foil or a member having a network shape is preferable. However, any material other than a metal may be employed as long as the material is electrochemically or chemically stable and conduction is obtained. Examples of the material of the positive electrode lead 51 include aluminum (Al), Nickel (Ni), and the like.

[Negative Electrode]

The negative electrode 54 has a structure in which a negative electrode active material layer 54B is provided on one surface or both surfaces of a negative electrode current collector 54A, and the negative electrode active material layer 54B and the positive electrode active material layer 53B are disposed to face each other.

On the other hand, although not illustrated, the negative electrode active material layer 54B may be provided on only one surface of the negative electrode current collector 54A. For example, the negative electrode current collector 54A is constituted by metal foil such as copper foil.

The negative electrode active material layer 54B contains anyone or more kinds of negative electrode materials, which are capable of intercalating and deintercalating lithium, as a negative electrode active material, and may contain other materials, for example, the same binding agent and conductive agent as in the positive electrode active material layer 53B as necessary.

In addition, in the nonaqueous electrolyte battery 62, an electrochemical equivalent of the negative electrode material capable of intercalating and deintercalating lithium is greater than that of the positive electrode 53, and is theoretically set in order for a lithium metal not to precipitate to the negative electrode 54 during charging.

In addition, in the nonaqueous electrolyte battery 62, an open circuit voltage (that is, a battery voltage) in a fully charged state is designed to be, for example, in a range of 2.80 V to 6.00 V. Particularly, in a case of using a material that forms a lithium alloy with Li/Li$^+$ or a material that intercalates lithium in the vicinity of 0 V as the negative electrode active material, the open-circuit voltage in a fully charged state is designed to be, for example, in a range of 4.20 V to 6.00 V. In this case, it is preferable that the open-circuit voltage in the fully charged state is 4.25 V to 6.00 V. In a case where the open-circuit voltage in the fully charged state is equal to or greater than 4.25 V, even in the same positive electrode active material, the amount of lithium deintercalated per unit mass further increases in comparison to a battery of 4.20 V, and thus the amount of the positive electrode active material and the amount of the negative electrode active material are adjusted in accordance with this phenomenon. According to this, a high energy density is obtained.

Examples of the negative electrode material capable of intercalating and deintercalating lithium include carbon materials such as a non-graphitization carbon, easy-graphitization carbon, graphite, pyrolytic carbons, cokes, glassy carbons, a baked body of an organic polymer compound, carbon fiber, and activated charcoal. Among these, examples of the cokes include pitch coke, needle coke, petroleum coke, and the like. The baked body of an organic polymer compound represents a carbonized material that is obtained by baking polymeric material such as a phenol resin or a furan resin at an appropriate temperature, and may be classified into non-graphitization carbon or easy-graphitization carbon in some parts. These carbon materials are preferable because a change in the crystal structure, which occurs during charging and discharging, is very small, a high charging and discharging capacity may be obtained, and a satisfactory cycle characteristic may be obtained. Particularly, graphite is preferable because an electrochemical equivalent is great and a high energy density can be obtained. In addition, non-graphitization carbon is preferable because a superior cycle characteristic may be obtained. Furthermore, a material of which charge and discharge electric potential is low, specifically, a material of which charge and discharge electric potential is close to that of a lithium metal is preferable because a high energy density of a battery can be easily realized.

Examples of other negative electrode materials which are capable of intercalating and deintercalating lithium and are capable of realizing a high capacity include a material that is capable of intercalating and deintercalating lithium and contains at least one kind of a metallic element and a metalloid element as a constituent element. The reason for this is that when using the material, it is possible to obtain a high energy density. Particularly, it is more preferable to use the material in combination with a carbon material because a high energy density and excellent cycle characteristics can be obtained. The negative electrode material may be an elementary metallic element or metalloid element, an alloy thereof, or a compound thereof, and the negative electrode material may have one or more kinds of phases thereof at least at a part. Furthermore, in the present technology, in addition to an alloy of two or more kinds of metallic elements, the term "alloy" also includes an alloy containing one or more kinds of metallic elements and one or more kinds of metalloid elements. In addition, the alloy may contain a nonmetallic element. The texture of the alloy includes a solid-solution, a eutectic crystal (a eutectic mixture), an intermetallic compound, and a texture in which two or more kinds of these textures coexist.

Examples of the metallic elements or the metalloid elements, which constitute the negative electrode material, include metallic elements or metalloid elements which are capable of forming an alloy with lithium. Specific examples of the metallic elements or the metalloid elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. These may be crystalline materials or amorphous materials.

As the negative electrode material, for example, materials containing a metallic element or a metalloid element of Group 4B in a short-period type periodic table as a constituent element are preferable, materials containing at least one of silicon (Si) and tin (Sn) as a constituent element are more preferable, and materials containing at least silicon is particularly preferable. The reason for this is that silicon (Si) and tin (Sn) have large capacity of intercalating and deintercalating lithium and can obtain a high energy density. Examples of the negative electrode material, which contains at least one kind of silicon and tin, include elementary silicon, alloys or compounds of silicon, elementary tin, alloys or compounds of tin, and materials which have one or more kinds of phases thereof at least at a part.

Examples of the alloys of silicon include alloys containing at least one kind selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than silicon.

Examples of the alloys of tin include alloys containing at least one kind selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as A Secondary Constituent Element Other than Tin (Sn).

Examples of the compounds of tin (Sn) or silicon (Si) include compounds containing oxygen (O) or carbon (C). Furthermore, the tin or silicon compounds may contain the above-described secondary constituent element in addition to tin (Sn) or silicon (Si).

Among these, as the negative electrode material, a SnCoC-containing material, which contains cobalt (Co), tin (Sn), and carbon (C) as a constituent element and in which the amount of carbon contained is 9.9% by mass to 29.7% by mass, a ratio of cobalt (Co) to the sum of tin (Sn) and cobalt (Co) is 30% by mass to 70% by mass, is preferable. The reason for this is that a high energy density and excellent cycle characteristics can be obtained in this composition range.

This SnCoC-containing material may further contain another constituent element as necessary. As another constituent element, for example, silicon (Si), iron (Fe), nickel (Ni), chrome (Cr), indium (In), niobium (Nb), germanium (Ge), titanium (Ti), molybdenum (Mo), aluminum (Al), phosphorus (P), gallium (Ga), or bismuth (Bi) is preferable, and the SnCoC-containing material may contain two or more kinds of these constituent elements. The reason for this is that the capacity or cycle characteristic may be further improved.

Furthermore, the SnCoC-containing material has a phase including tin (Sn), cobalt (Co), and carbon (C), and it is preferable that this phase has a low crystalline or amorphous structure. In addition, in the SnCoC-containing material, it is preferable that at least a part of carbon (C) as a constituent element is bonded to a metallic element or a metalloid element as another constituent element. The reason for this is as follows. It is considered that a decrease in cycle characteristics is caused by aggregation or crystallization of tin (Sn) or the like, but when carbon (C) is bonded to another element, the aggregation or crystallization can be suppressed.

Examples of a measurement method of examining a bonding state of elements include X-ray photoelectron spectroscopy (XPS). In the XPS, in a case of graphite, a peak of the 1s orbital (C1s) of carbon is shown at 284.5 eV in a device that is subjected to energy calibration so that a peak of the 4f orbital (Au4f) of a gold atom is obtained at 84.0 eV. In addition, in a case of surface-contaminated carbon, the peak is shown at 284.8 eV. In contrast, in a case where the charge density of the carbon atom increases, for example, in a case where carbon is bonded to the metallic element or the metalloid element, the C1s peak is shown in a range below 284.5 eV. That is, in a case where a peak of a synthetic wave of C1s, which is obtained for the SnCoC-containing material, is shown in a range below 284.5 eV, at least a part of carbon contained in the SnCoC-containing material is bonded to the metallic element or the metalloid element as another constituent element.

Furthermore, in the XPS measurement, for example, the C1s peak is used for calibration of an energy axis of spectrum. Typically, surface-contaminated carbon is exists on a surface of the SnCoC-containing material, and thus the C1s peak of the surface-contaminated carbon is set to 284.8 eV, and this is used as an energy reference. In the XPS measurement, a waveform of the C1s peak is obtained as a waveform that includes both the peak of the surface-contaminated carbon and the peak of the carbon in the SnCoC-containing material. Accordingly, the peak of the surface-contaminated carbon and the peak of the carbon in the SnCoC-containing material are separated from each other, for example, through analysis conducted by using commercially available software. In the waveform analysis, the position of a main peak that exists on a minimum binding energy side is used as an energy reference (284.8 eV).

Examples of the negative electrode material capable of intercalating and deintercalating lithium further include a metal oxide and a polymer compound which are capable of intercalating and deintercalating lithium, and the like. Examples of the metal oxide include a lithium-titanium oxide such as lithium titanate ($Li_4Ti_5O_{12}$) that contains titanium and lithium, iron oxide, ruthenium oxide, molybdenum oxide, and the like. Examples of the polymer compound include polyacetylene, polyaniline, polypyrrole, and the like.

[Separator]

The separator 55 is a porous film that is constituted by an insulating film that has large ion permeability and predetermined mechanical strength. A nonaqueous electrolytic solution is retained in a vacancy of the separator 55. The configuration of the separator 55 is the same as that of the separator base material 11a according to the first embodiment.

[Gel Electrolyte Layer]

The gel electrolyte layer 56 contains particles as filler, a matrix polymer compound (resin), and a nonaqueous electrolytic solution (electrolytic solution), and is formed in such a manner that a particle-containing resin layer formed on at least one main surface of the separator 55 contains the electrolytic solution. In the particle-containing resin layer formed on at least one main surface of the separator 55, for example, the matrix polymer compound absorbs the electrolytic solution, swells, and becomes a so-called gel shape, and the gel-shaped matrix polymer, which absorbs the electrolytic solution, becomes the gel electrolyte layer 56 that functions as an ionic conductor. Furthermore, in this case, a porous structure of the particle-containing resin layer may disappear in combination with the swelling of the matrix polymer compound. Since particles are contained in the gel electrolyte layer 56, strength, heat resistance, and oxidation resistance of the gel electrolyte layer 56 are improved, and thus it is possible to improve characteristics such as stability.

(Nonaqueous Electrolytic Solution)

The nonaqueous electrolytic solution contains an electrolyte salt, and a nonaqueous solvent that dissolves the electrolyte salt.

(Electrolyte Salt)

For example, the electrolyte salt contains one or more kinds of light metal compounds such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate (Li-$AlCl_4$), dilithium hexafluorosilicate ($Li_2SiF_6$), lithium chloride (LiCl), lithium bromide (LiBr), and the like. Among these, at least one kind selected from the group consisting of lithium hexafluorophosphate, lithium tetrafluoroborate, lithium perchlorate, and lithium hexafluoroarsenate is preferable, and lithium hexafluorophosphate is more preferable.

(Nonaqueous Solvent)

Examples of the nonaqueous solvent include a lactone-based solvent such as γ-butyrolactone, γ-valerolactone, δ-valerolactone, and ε-caprolactone, a carbonic acid ester-based solvent such as ethylene carbonate, propylene carbonate, butylene carbonate, vinylene carbonate, dimethyl carbonate, ethyl methyl carbonate, and diethyl carbonate, an ether-based solvent such as 1,2-dimethoxyethane, 1-ethoxy-2-methoxy ethane, 1,2-diethoxyethane, tetrahydrofuran, and 2-methyltetrahydrofuran, a nitrile-based solvent such as acetonitrile, a sulfolane-based solvent, phosphoric acids, a phosphoric acid ester solvent, and a nonaqueous solvent such as pyrrolidones. Any one kind of the solvents may be used alone, or two or more kinds thereof may be mixed and used.

In addition, as the nonaqueous solvent, it is preferable to use a mixture of cyclic carbonic acid ester and chain carbonic acid ester, and it is more preferable that the nonaqueous solvent contains a compound in which a part or the entirety of hydrogen in the cyclic carbonic acid ester or the chain carbonic acid ester is fluorinated. As the fluorinated compound, it is preferable to use fluoroethylene carbonate (4-fluoro-1,3-dioxolan-2-one: FEC), and difluoroethylene carbonate (4,5-difluoro-1,3-dioxolane-2-one: DFEC). The reason for this is that even when using the negative electrode 54 containing a compound such as silicon (Si), tin (Sn), and germanium (Ge) as the negative electrode active material, it is possible to improve charge and discharge cycle characteristics. Among these, it is preferable to use difluoroethylene carbonate as the nonaqueous solvent. The reason for this is that difluoroethylene carbonate is excellent in an effect of improving the cycle characteristics.

(3-2) Method of Manufacturing Nonaqueous Electrolyte Battery

For example, the nonaqueous electrolyte battery 62 can be manufactured by the following method. Typically, the nonaqueous electrolyte battery 62 is manufactured by sequentially performing, for example, a process of manufacturing a positive electrode, a process of manufacturing a negative electrode, a process of forming a particle-containing resin layer (process of manufacturing a separator), a winding process, and a battery assembly process which are described below.

[Process of Manufacturing Positive Electrode]

A positive electrode active material, a conductive agent, and a binding agent are mixed to prepare a positive electrode mixture, and the positive electrode mixture is dispersed in a solvent such as N-methyl-2-pyrrolidone to prepare paste-like positive electrode mixture slurry. Next, the positive electrode mixture slurry is applied to the positive electrode current collector 53A, and the solvent is dried. Then, compression molding is performed by using a roll press machine and the like to form the positive electrode active material layer 53B, thereby preparing the positive electrode 53. Then, the positive electrode lead 51 is attached to an end of the positive electrode current collector 53A through welding.

[Process of Manufacturing Negative Electrode]

A negative electrode active material and a binding agent are mixed to prepare a negative electrode mixture, and the negative electrode mixture is dispersed in a solvent such as N-methyl-2-pyrrolidone to prepare paste-like negative electrode mixture slurry. Next, the negative electrode mixture slurry is applied to the negative electrode current collector 54A, and the solvent is dried. Then, compression molding is performed by using a roll press machine to form the negative electrode active material layer 54B, thereby preparing the negative electrode 54. Then, the negative electrode lead 52 is attached to an end of the negative electrode current collector 54A through welding.

[Process of Forming Particle-Containing Resin Layer (Process of Manufacturing Separator)]

First, the same separator as in the first embodiment, in which the particle-containing resin layer is formed on one main surface or both main surfaces of the separator 55, is manufactured. Details of the process of forming the particle-containing resin layer are the same as in the first embodiment. The configuration of the separator 55 corresponds to the configuration of the separator base material 11a, and has the same configuration as that of the separator base material 11a. The separator 55 and the particle-containing resin layer that is formed on at least one main surface of the separator 55 correspond to the separator 11 (the separator 11 including the separator base material 11a and the particle-containing resin layer 11b that is formed on at least one main surface of the separator base material 11a) according to the first embodiment, and have the same configuration as that of the separator 11.

[Winding Process]

Next, the positive electrode 53 and the negative electrode 54 are laminated through the separator 55 in which the particle-containing resin layer is formed on one main surface or both main surfaces, and the resultant laminated body is wound, thereby manufacturing the wound electrode body 50 having a winding structure. Then, the positive electrode lead 51 is attached to an end of the positive electrode current collector 53A through welding, and the negative electrode lead 52 is attached to an end of the negative electrode current collector 54A through welding.

[Battery Assembly Process]

Next, the exterior packaging member 60, which is constituted by a laminated film, is subjected to deep drawing to form a concave portion, and the wound electrode body 50 is inserted into the concave portion. Then, a non-processed portion of the exterior packaging member 60 is folded back to an upper side of the concave portion, and is thermally fused except for apart (for example, one side) of the outer periphery of the concave portion. At this time, the adhesion film 61 is interposed between the positive electrode lead 51 and the exterior packaging member 60 and between the negative electrode lead 52 and the exterior packaging member 60, respectively.

Subsequently, the nonaqueous electrolyte solution is prepared, and is injected to the inside of the exterior packaging member 60 from the non-fused portion thereof, and then the non-fused portion of the exterior packaging member 60 is hermetically closed through thermal fusion and the like. At this time, vacuum sealing is performed, and thus the particle-containing resin layer is impregnated with the nonaqueous electrolytic solution, and the matrix polymer compound (resin) swells. In this manner, the gel electrolyte layer 56 is formed. According to this, the nonaqueous electrolyte battery 62 illustrated in FIGS. 4 and 5 is completed.

(3-3) Second Configuration (Lamination Type)

Figure 6:
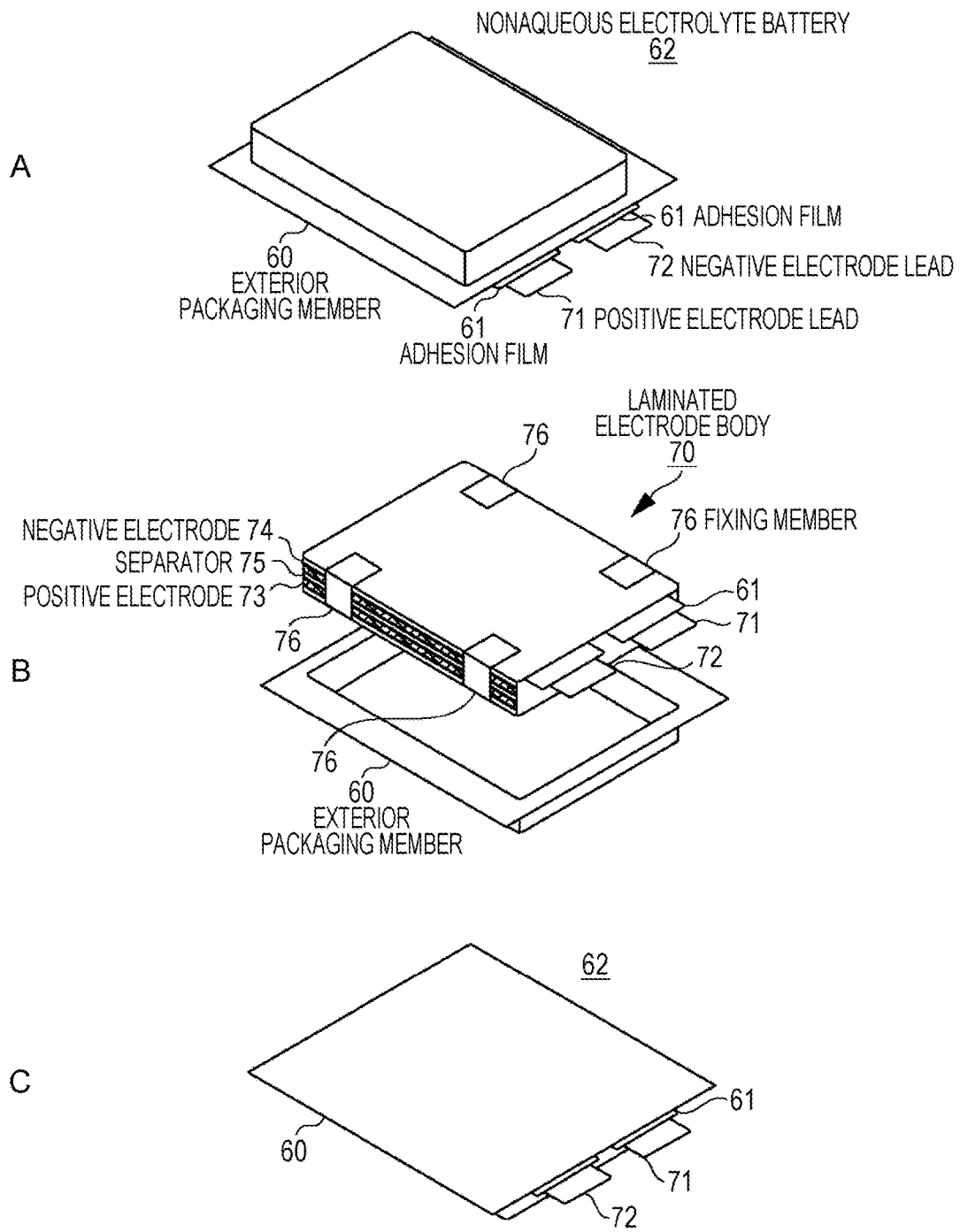
FIGS. 6A to 6C are exploded perspective views illustrating a configuration of a laminated film type nonaqueous electrolyte battery that uses the laminated electrode body.

In the above-described first configuration, description has been given of the nonaqueous electrolyte battery 62 in which the wound electrode body 50 is packaged with the exterior packaging member 60, but as illustrated in FIGS. 6A to 6C, a laminated electrode body 70 may be used instead of the wound electrode body 50. FIG. 6A is an external appearance view of the nonaqueous electrolyte battery 62 in which the laminated electrode body 70 is accommodated. FIG. 6B is an exploded perspective view illustrating a state in which the laminated electrode body 70 is accommodated in the exterior packaging member 60. FIG. 6C is an external appearance view illustrating the external appearance of the nonaqueous electrolyte battery 62, which is illustrated in FIG. 6A, on a bottom side.

As the laminated electrode body 70, a laminated electrode body 70, in which a rectangular positive electrode 73 and a rectangular negative electrode 74 are laminated through a rectangular separator 75, and are fixed by a fixing member 76, is used. Furthermore, although not illustrated in the drawings, a gel electrolyte layer is provided to come into contact with the positive electrode 73 and the negative electrode 74. For example, the gel electrolyte layer (not illustrated) is provided between the positive electrode 73 and the separator 75, and between the negative electrode 74 and the separator 75. The gel electrolyte layer is the same as the gel electrolyte layer 56 in the first configuration example. A positive electrode lead 71 that is connected to the positive electrode 73, and a negative electrode lead 72 that is connected to the negative electrode 74 are led out from the laminated electrode body 70, and the adhesion film 61 is provided between the positive electrode lead 71 and the exterior packaging member 60, and between the negative electrode lead 72 and the exterior packaging member 60, respectively.

Furthermore, a method of forming the gel electrolyte layer, and a method of thermally fusing the exterior packaging member 60 are the same as those in the first configuration example.

4. Fourth Embodiment

In a fourth embodiment of the present disclosure, description will be given of a laminated film type nonaqueous electrolyte battery (battery). For example, the nonaqueous electrolyte battery is a nonaqueous electrolyte secondary battery capable of being charged and discharged, and is a lithium ion secondary battery as an example.

Hereinafter, description will be given of two configuration examples (a first configuration example and a second configuration example) of the laminated film type nonaqueous electrolyte battery according to the fourth embodiment.

Furthermore, the battery according to the fourth embodiment is provided with a particle-containing resin layer attached electrode which is the same as in the second embodiment, and in which the matrix polymer compound is used as the resin of the particle-containing resin layer. In the battery according to the fourth embodiment, the separator 55 is the same as the separator base material 11a, and the gel electrolyte layer 56 corresponds to the particle-containing resin layer 11b that is formed on the electrode and contains the electrolytic solution.

(4-1) First Configuration

The first configuration example of the nonaqueous electrolyte battery 62 according to the fourth embodiment is the same as the first configuration example of a nonaqueous electrolyte battery 63 illustrated in FIGS. 4 and 5 according to the third embodiment except for the following description. That is, as is the case with the third embodiment, the nonaqueous electrolyte battery 62 is not provided with a configuration (the separator according to the first embodiment) in which the particle-containing resin layer is formed on the surface of the separator 55. Instead of the configuration, the nonaqueous electrolyte battery 62 is provided with a particle-containing resin layer attached electrode which is the same as in the second embodiment, and in which the matrix polymer compound is used as the resin of the particle-containing resin layer. In addition, the particle-containing resin layer, which is formed on a surface of an electrode, contains an electrolytic solution, and thus the gel electrolyte layer 56 is formed. The other configurations are the same as those in the third embodiment. Hereinafter, redundant description of the same configurations as in the third embodiment will be appropriately omitted, and configurations different from those of the third embodiment will be described in detail.

[Gel Electrolyte Layer]

The gel electrolyte layer 56 contains particles as filler, a matrix polymer compound (resin), and a nonaqueous electrolytic solution (electrolytic solution), and is formed in such a manner that the particle-containing resin layer, which is formed on both main surfaces of at least one electrode of the positive electrode 53 and the negative electrode 54, contains the electrolytic solution. In the particle-containing resin layer formed on both main surfaces of at least one electrode of the positive electrode 53 and the negative electrode 54, for example, the matrix polymer compound absorbs the electrolytic solution, swells, and becomes a so-called gel shape, and gel-shaped matrix polymer, which absorbs the electrolytic solution, becomes the gel electrolyte layer 56 that functions as an ionic conductor. Furthermore, a porous structure of the particle-containing resin layer may disappear in combination with the swelling of the matrix polymer compound. Since particles are contained in the gel electrolyte layer 56, strength, heat resistance, and oxidation resistance of the gel electrolyte layer 56 are improved, and thus it is possible to improve characteristics such as stability.

(4-2) Method of Manufacturing Nonaqueous Electrolyte Battery

Typically, the nonaqueous electrolyte battery 62 is manufactured by sequentially performing, for example, a process of forming a particle-containing resin layer (process of manufacturing a particle-containing resin layer attached electrode), a winding process, and a battery assembly process after performing a process of manufacturing a positive electrode and a process of manufacturing a negative electrode which are the same as in the third embodiment.

[Process of Forming Particle-Containing Resin Layer]

First, a particle-containing resin layer attached electrode (positive electrode) in which the particle-containing resin layer is formed on both main surfaces of the positive electrode 53, and a particle-containing resin layer attached electrode (negative electrode) in which the particle-containing resin layer is formed on both main surfaces of the negative electrode 54 are manufactured. Furthermore, only one electrode of the positive electrode and the negative electrode may be set as the particle-containing resin layer attached electrode. A method of forming the particle-containing resin layer is the same as in the second embodiment.

[Winding Process]

Next, the particle-containing resin layer attached positive electrode 53 and the particle-containing resin layer attached negative electrode 54 are laminated through the separator 55, and the resultant laminated body is wound, thereby manufacturing the wound electrode body 50 having a winding structure.

[Battery Assembly Process]

Next, the exterior packaging member 60, which is constituted by a laminated film, is subjected to deep drawing to form a concave portion, and the wound electrode body 50 is inserted into the concave portion. Then, a non-processed portion of the exterior packaging member 60 is folded back to an upper side of the concave portion, and is thermally fused except for apart (for example, one side) of the outer periphery of the concave portion. At this time, the adhesion film 61 is interposed between the positive electrode lead 51 and the exterior packaging member 60 and between the negative electrode lead 52 and the exterior packaging member 60, respectively.

Subsequently, the nonaqueous electrolyte solution is prepared, and is injected to the inside of the exterior packaging member 60 from the non-fused portion thereof, and then the non-fused portion of the exterior packaging member 60 is hermetically closed through thermal fusion and the like. At this time, vacuum sealing is performed, and thus the particle-containing resin layer is impregnated with the nonaqueous electrolytic solution, and the matrix polymer compound (resin) absorbs the nonaqueous electrolytic solution and swells. In this manner, the gel electrolyte layer 56 is formed. According to this, the nonaqueous electrolyte battery 62 illustrated in FIGS. 4 and 5 is completed.

(4-3) Second Configuration

In the first configuration example described above, description has been given of the nonaqueous electrolyte battery 62 in which the wound electrode body 50 is packaged with the exterior packaging member 60, but the laminated electrode body 70 may be used instead of the wound electrode body 50. A second configuration example of the nonaqueous electrolyte battery 62 according to the fourth embodiment is the same as a configuration illustrated in FIGS. 6A to 6C.

A laminated electrode body 70, in which the rectangular positive electrode 73 and the rectangular negative electrode 74 are laminated through the rectangular separator 75, and are fixed with the fixing member 76, is used as the laminated electrode body 70. On the other hand, although not illustrated in the drawings, a gel electrolyte layer is provided to come into contact with the positive electrode 73 and the negative electrode 74. For example, the gel electrolyte layer (not illustrated) is provided between the positive electrode 73 and the separator 75, and between the negative electrode 74 and the separator 75. The gel electrolyte layer is the same as the gel electrolyte layer 56 in the first configuration example. The positive electrode lead 71 that is connected to the positive electrode 73, and the negative electrode lead 72 that is connected to the negative electrode 74 are led out from the laminated electrode body 70, and the adhesion film 61 is provided between the positive electrode lead 71 and the exterior packaging member 60, and between the negative electrode lead 72 and the exterior packaging member 60, respectively.

Furthermore, a method of forming the gel electrolyte layer and a method of thermally fusing the exterior packaging member 60 are the same as those in the first configuration example.

5. Fifth Embodiment

In a fifth embodiment, description will be given of a cylindrical nonaqueous electrolyte battery. A battery according to the fifth embodiment is provided with a separator which is the same as in the first embodiment, and in which a binder polymer compound is used as the resin of the particle-containing resin layer.

(5-1) Configuration of Nonaqueous Electrolyte Battery

Figure 7:
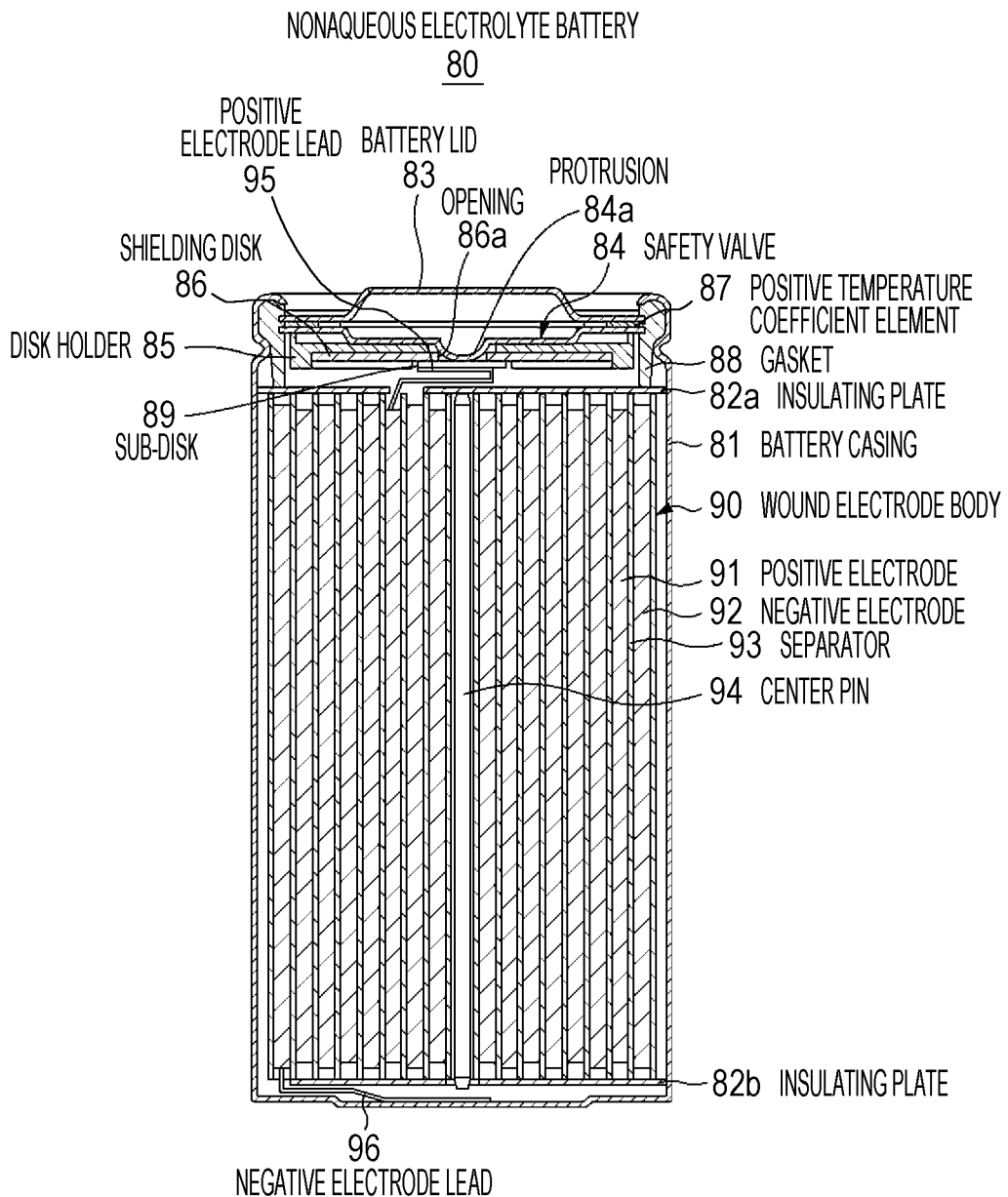
FIG. 7 is a cross-sectional view illustrating a configuration of a cylindrical nonaqueous electrolyte battery according to the embodiment of the present disclosure.

FIG. 7 is a cross-sectional view illustrating an example of a nonaqueous electrolyte battery according to the fifth embodiment. A nonaqueous electrolyte battery 80 is, for example, a nonaqueous electrolyte secondary battery capable of being charged and discharged. The nonaqueous electrolyte battery 80 is a so-called cylindrical type battery. A wound electrode body 90, in which a strip-shaped positive electrode 91 and a strip-shaped negative electrode 92 are wound through a separator 93 in combination with a liquid-like nonaqueous electrolyte (not illustrated in the drawings) (hereinafter, appropriately referred to as a nonaqueous electrolytic solution), is provided at the inside of a battery casing 81 having an approximately hollow cylindrical shape.

For example, the battery casing 81 is constituted by iron that is subjected to nickel plating. One end of the battery casing 81 is closed and the other end thereof is opened. A pair of insulating plates 82a and 82b perpendicular to a winding peripheral surface is disposed at the inside of the battery casing 81 with the wound electrode body 90 interposed between the pair of insulating plates 82a and 82b.

Examples of a material of the battery casing 81 include iron (Fe), nickel (Ni), stainless steel (SUS), aluminum (Al), titanium (Ti), and the like. For example, the battery casing 81 may be plated with nickel and the like so as to prevent corrosion due to an electrochemical nonaqueous electrolytic solution along with charging and discharging of the nonaqueous electrolyte battery 80. A battery lid 83 that is a positive electrode lead plate, and a safety valve mechanism and a positive temperature coefficient (PTC) element 87 which are provided on an inner side of the battery lid 83 are attached to an opened end of the battery casing 81 through caulking via a gasket 88 for insulation sealing.

For example, the battery lid 83 is constituted by the same material as the battery casing 81, and an opening, through which a gas that occurs at the inside of the battery is discharged, is provided in the battery lid 83. In the safety valve mechanism, a safety valve 84, a disk holder 85, and a shielding disk 86 are sequentially overlap each other. A protrusion 84a of the safety valve 84 is connected to a positive electrode lead 95, which is led out from the wound electrode body 90, through a sub-disk 89 that is disposed to cover an opening 86a that is provided at the central portion of the shielding disk 86. Since the safety valve 84 and the positive electrode lead 95 are connected to each other through the sub-disk 89, the positive electrode lead 95 is prevented from being inserted from the opening 86a during inversion of the safety valve 84. In addition, the safety valve mechanism is electrically connected to the battery lid 83 through the positive temperature coefficient element 87.

In a case where an inner pressure of the nonaqueous electrolyte battery 80 becomes a constant value or greater due to battery inner short-circuit, heating from an outer side of the battery, and the like, in the safety valve mechanism, the safety valve 84 is inverted to cut off electrical connection between the protrusion 84a, the battery lid 83, and the wound electrode body 90. That is, when the safety valve 84 is inverted, the positive electrode lead 95 can be pressed by the shielding disk 86, and thus connection between the safety valve 84 and the positive electrode lead 95 is released. The disk holder 85 is formed from an insulating material, and in a case where the safety valve 84 is inverted, the safety valve 84 and the shielding disk 86 are insulated from each other.

In addition, in a case where a gas occurs at the inside of the battery, and a battery inner pressure is raised, a part of the safety valve 84 is fractured to discharge the gas to a battery lid 83 side.

In addition, for example, a plurality of gas discharge holes (not illustrated) are provided at the periphery of the opening 86a of the shielding disk 86, and in a case where a gas occurs from the wound electrode body 90, the gas is effectively discharged to the battery lid 83 side.

When a temperature is raised, a resistance value of the positive temperature coefficient element 87 increases, and the electrical connection between the battery lid 83 and the wound electrode body 90 is cut off. According to this, a current is cut off, and the positive temperature coefficient element 87 prevents abnormal heat generation due to an excessive current. For example, the gasket 88 is constituted by, for example, an insulating material, and asphalt is applied to a surface of the gasket 88.

The wound electrode body 90, which is accommodated in the nonaqueous electrolyte battery 80, is wound around a center pin 94. The wound electrode body 90 is obtained as follows. The positive electrode 91 and the negative electrode 92 are laminated with the separator 93 interposed therebetween, and the resultant laminated body is wound in a longitudinal direction thereof. The positive electrode lead 95 is connected to the positive electrode 91, and a negative electrode lead 96 is connected to the negative electrode 92. As described above, the positive electrode lead 95 is welded to the safety valve 84 and is electrically connected to the battery lid 83, and the negative electrode lead 96 is welded to the battery casing 81 and is electrically connected thereto.

Figure 8:
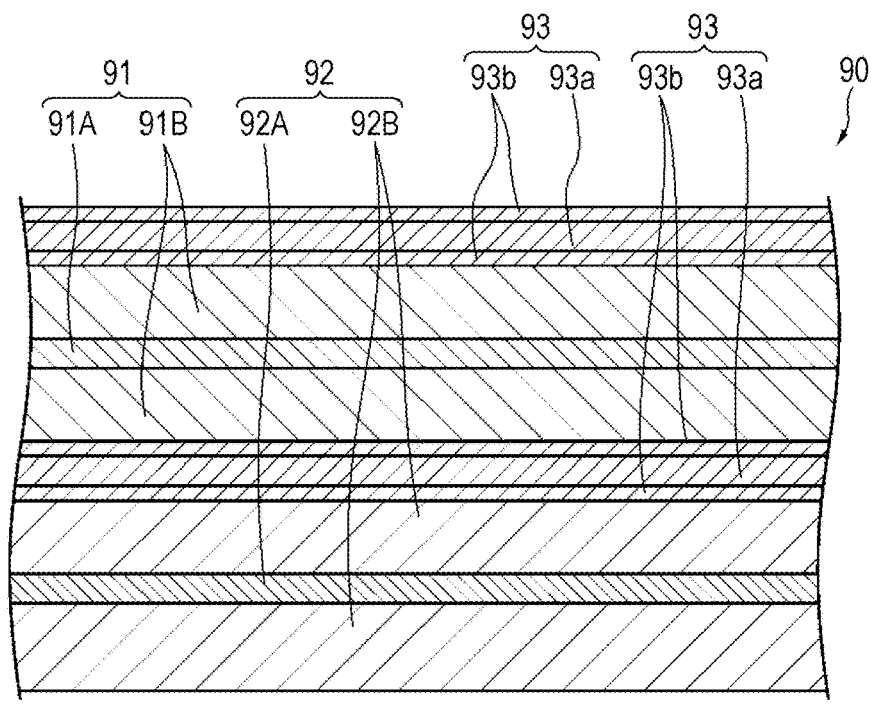
FIG. 8 is an enlarged cross-sectional view illustrating a part of the wound electrode body that is accommodated in the cylindrical nonaqueous electrolyte battery.

FIG. 8 illustrates a part of the wound electrode body 90 illustrated in FIG. 7 in an enlarged manner. Hereinafter, the positive electrode 91, the negative electrode 92, and the separator 93 will be described in detail.

[Positive Electrode]

The positive electrode 91 has a configuration in which a positive electrode active material layer 91B that contains a positive electrode active material is formed on both surfaces of a positive electrode current collector 91A. As the positive electrode current collector 91A, for example, metal foil such as aluminum (Al) foil, nickel (Ni) foil, and stainless steel (SUS) foil can be used.

The positive electrode active material layer 91B includes any one or more kinds of positive electrode materials capable of intercalating and deintercalating lithium as the positive electrode active material, and may contain other materials such as a binding agent and a conductive agent as necessary. Furthermore, as the positive electrode active material, the conductive agent, and the binding agent, the same things as in the third embodiments can be used.

The positive electrode 91 includes the positive electrode lead 95 that is connected to one end of the positive electrode current collector 91A through spot welding or ultrasonic welding. As the positive electrode lead 95, metal foil or a member having a network shape is preferable. However, any material other than a metal may be employed as long as the material is electrochemically or chemically stable and conduction is obtained. Examples of the material of the positive electrode lead 95 include aluminum (Al), Nickel (Ni), and the like.

[Negative Electrode]

For example, the negative electrode 92 has a structure in which a negative electrode active material layer 92B is provided on both surfaces of a negative electrode current collector 92A having a pair of opposite surfaces. Furthermore, although not illustrated, the negative electrode active material layer 92B may be provided on only one surface of the negative electrode current collector 92A. For example, the negative electrode current collector 92A is constituted by metal foil such as copper foil.

The negative electrode active material layer 92B contains anyone or more kinds of negative electrode materials, which are capable of intercalating and deintercalating lithium, as a negative electrode active material, and may contain other materials, for example, the same binding agent and conductive agent as in the positive electrode active material layer 91B as necessary. Furthermore, as the negative electrode active material, the conductive agent, and the binding agent, the same things as in the third embodiments can be used.

[Separator]

The separator 93 is the same as the separator 11 according to the first embodiment. That is, as illustrated in FIG. 8, a particle-containing resin layer 93b is formed on both main surfaces of a separator base material 93a. The particle-containing resin layer 93b may be formed on only one main surface of the separator base material 93a. The strength, the heat resistance, and the oxidation resistance of the separator 93 are improved due to the particle-containing resin layer 93b, and characteristics such as stability can be improved. Furthermore, as a resin that is contained in the particle-containing resin layer 93b, a binder polymer compound is typically used. The separator 93 is impregnated with a nonaqueous electrolytic solution. For example, the particle-containing resin layer 93b is interposed between the positive electrode 91 and the negative electrode 92 in combination with the separator base material 93a to prevent active materials of both electrodes from coming into contact with each other, and retains the electrolytic solution in micropores similar to the separator base material 93a to form an interelectrode ion conduction path.

[Nonaqueous Electrolytic Solution]

The nonaqueous electrolytic solution is the same as in the third embodiment.

(5-2) Method of Manufacturing Nonaqueous Electrolyte Battery

[Method of Manufacturing Positive Electrode, and Method of Manufacturing Negative Electrode]

The positive electrode 91 and the negative electrode 92 are manufactured in the same manner as in the third embodiment.

[Method of Manufacturing Separator]

The particle-containing resin layer 93b is formed on at least one main surface of the separator base material 93a in the same manner as in the first embodiment, thereby manufacturing the separator 93.

[Preparation of Nonaqueous Electrolytic Solution]

The nonaqueous electrolytic solution is prepared by dissolving an electrolyte salt in a nonaqueous solvent.

[Assembly of Nonaqueous Electrolyte Battery]

The positive electrode lead 95 is attached to the positive electrode current collector 91A through welding and the like, and the negative electrode lead 96 is attached to the negative electrode current collector 92A through welding and the like. Then, the positive electrode 91 and the negative electrode 92 are wound with the separator 93 of the present disclosure interposed therebetween, thereby obtaining the wound electrode body 90. The tip end of the positive electrode lead 95 is welded to the safety valve mechanism, and the tip end of the negative electrode lead 96 is welded to the battery casing 81. Next, the wound electrode body 90 is accommodated in the battery casing 81 with a winding surface of the wound electrode body 90 interposed between a pair of insulating plates 82 and 83. After the wound electrode body 90 is accommodated in the battery casing 81, a nonaqueous electrolytic solution is injected to the inside of the battery casing 81 so as to impregnate the separator 93 with the nonaqueous electrolytic solution. Next, the battery lid 83, the safety valve mechanism including the safety valve 84, and the like, and the positive temperature coefficient element 87 are fixed to the opening end of the battery casing 81 through caulking via the gasket 88. According to this, the nonaqueous electrolyte battery 80, which is illustrated in FIG. 7, according to the present disclosure, is formed.

In the nonaqueous electrolyte battery 80, when charging is performed, for example, lithium ions are deintercalated from the positive electrode active material layer 91B, and are intercalated to the negative electrode active material layer 92B through the nonaqueous electrolytic solution with which the separator 93 (the separator base material 93a and the particle-containing resin layer 93b) is impregnated. In addition, when performing discharging, for example, lithium ions are deintercalated from the negative electrode active material layer 92B, and are intercalated to the positive electrode active material layer 91B through the nonaqueous electrolytic solution with which the separator 93 (the separator base material 93a and the particle-containing resin layer 93b) is impregnated.

6. Sixth Embodiment

In a sixth embodiment, description will be given of a cylindrical nonaqueous electrolyte battery. A battery according to the sixth embodiment is provided with a particle-containing resin layer attached electrode which is the same as in the second embodiment, and in which a binder polymer compound is used as a resin of the particle-containing resin layer.

(6-1) Configuration of Nonaqueous Electrolyte Battery

Figure 9:
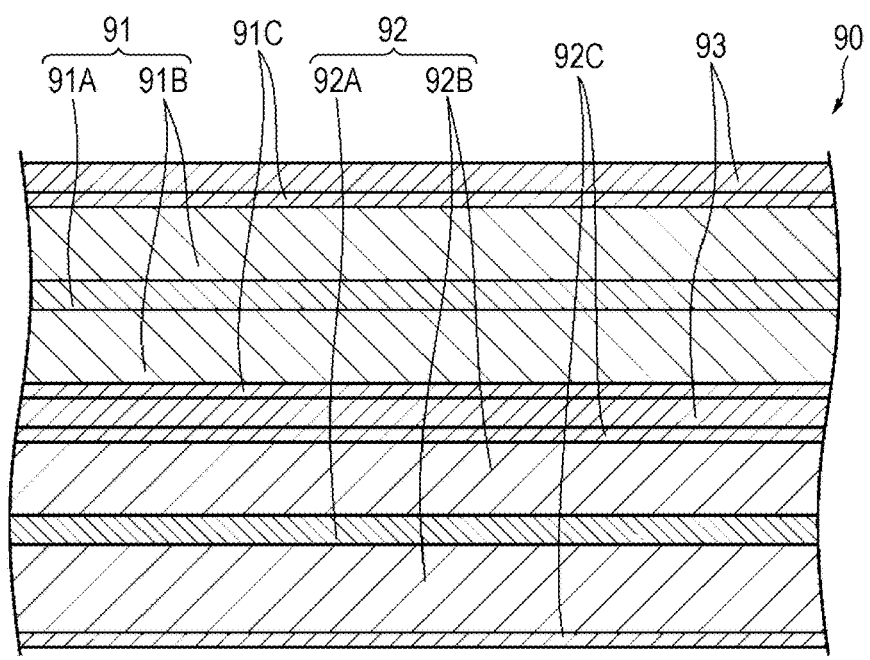
FIG. 9 is an enlarged cross-sectional view illustrating a part of the wound electrode body that is accommodated in the cylindrical nonaqueous electrolyte battery.

As illustrated in FIG. 9, for example, a particle-containing resin layer 91C and a particle-containing resin layer 92C are interposed between the positive electrode 91 and the negative electrode 92, respectively, in combination with the separator 93 to prevent active materials of both electrodes from coming into contact with each other, and retain the electrolytic solution in micropores similar to the separator 93 to form an interelectrode ion conduction path. The strength, the heat resistance, and the oxidation resistance of the separator 93 can be reinforced with the particle-containing resin layers 91C and 92C, and it is possible to improve characteristics such as stability. Typically, the separator 93 has the same configuration as the separator base material 93a. Furthermore, as the separator 93, the same separator (the separator base material 93a and the particle-containing resin layer 93b) as in the fifth embodiment may be used. The other configurations except for the above-described configurations are the same as in the fifth embodiment.

Furthermore, it is possible to employ a configuration including only a particle-containing resin layer attached electrode (positive electrode) in which the particle-containing resin layer 91C is provided on both main surfaces or one main surface of the positive electrode 91 without forming the particle-containing resin layer 92C with respect to the negative electrode 92. It is also possible to employ a configuration including only a particle-containing resin layer attached electrode (negative electrode) in which the particle-containing resin layer 92C is provided on both main surfaces or one main surface of the negative electrode 92 without forming the particle-containing resin layer 91C with respect to the positive electrode 91. In addition, it is also possible to employ a configuration including a particle-containing resin layer attached electrode (positive electrode) in which the particle-containing resin layer 91C is provided on one main surface of the positive electrode 91, and a particle-containing resin layer attached electrode in which the particle-containing resin layer 92C is provided on at least one main surface of the negative electrode 92. In addition, it is also possible to employ a configuration including a particle-containing resin layer attached electrode in which the particle-containing resin layer 91C is provided on both main surfaces of the positive electrode 91, and a particle-containing resin layer attached electrode in which the particle-containing resin layer 92C is provided on one main surface of the negative electrode 92.

(6-2) Method of Manufacturing Nonaqueous Electrolyte Battery

[Method of Manufacturing Positive Electrode]

A particle-containing resin layer attached positive electrode is manufactured in the same manner as in the second embodiment. Specifically, the positive electrode 91 is manufactured in the same manner as in the fifth embodiment. Next, a coating material (particle-containing resin solution) is applied to both main surfaces or one main surface of the positive electrode 91 to form a particle-containing resin solution layer. Then, the particle-containing resin solution layer is dried to form the particle-containing resin layer 91C.

[Method of Manufacturing Negative Electrode]

A particle-containing resin layer attached negative electrode is manufactured in the same manner as in the second embodiment. The negative electrode 92 is manufactured in the same manner as in the fifth embodiment. Next, a coating material (particle-containing resin solution) is applied to both main surfaces or one main surface of the negative electrode 92 to form a particle-containing resin solution layer. Then, the particle-containing resin solution layer is dried to form the particle-containing resin layer 92C.

[Separator]

The separator 93 having the same configuration as the separator base material 93a is prepared.

[Preparation of Nonaqueous Electrolytic Solution]

The nonaqueous electrolytic solution is prepared by dissolving an electrolyte salt in a nonaqueous solvent.

[Assembly of Nonaqueous Electrolyte Battery]

The positive electrode lead 95 is attached to the positive electrode current collector 91A through welding and the like, and the negative electrode lead 96 is attached to the negative electrode current collector 92A through welding and the like. Then, the particle-containing resin layer attached positive electrode 91 and the particle-containing resin layer attached negative electrode 92 are wound with the separator 93 interposed therebetween, thereby obtaining the wound electrode body 90. The tip end of the positive electrode lead 95 is welded to the safety valve mechanism, and the tip end of the negative electrode lead 96 is welded to the battery casing 81.

Next, the wound electrode body 90 is accommodated in the battery casing 81 with a winding surface of the wound electrode body 90 interposed between the pair of insulating plates 82 and 83. After the wound electrode body 90 is accommodated in the battery casing 81, a nonaqueous electrolytic solution is injected to the inside of the battery casing 81 so as to impregnate the separator 93, the particle-containing resin layer 91C, and the particle-containing resin layer 92C with the nonaqueous electrolytic solution. Next, the battery lid 83, the safety valve mechanism including the safety valve 84, and the like, and the positive temperature coefficient element 87 are fixed to the opening end of the battery casing 81 through caulking via the gasket 88. According to this, the nonaqueous electrolyte battery 80, which is illustrated in FIG. 7, according to the present disclosure, is formed.

In the nonaqueous electrolyte battery 80, when charging is performed, for example, lithium ions are deintercalated from the positive electrode active material layer 91B, and are intercalated to the negative electrode active material layer 92B through the nonaqueous electrolytic solution with which the separator 93, the particle-containing resin layer 91C, and the particle-containing resin layer 92C are impregnated. In addition, when performing discharging, for example, lithium ions are deintercalated from the negative electrode active material layer 92B, and are intercalated to the positive electrode active material layer 91B through the nonaqueous electrolytic solution with which the separator 93, the particle-containing resin layer 91C, and the particle-containing resin layer 92C are impregnated.

7. Seventh Embodiment

In a seventh embodiment, description will be given of an example of a battery pack of a laminated film type battery (nonaqueous electrolyte battery) including the same gel electrolyte layer as in the third embodiment or the fourth embodiment.

The battery pack is a simple type battery pack (also, referred to as a soft pack). The simple type battery pack is embedded in an electronic apparatus, such as a smartphone. In the simple type battery pack, a battery cell, a protective circuit, and the like are fixed with an insulating tape, a part of the battery cell is exposed, and an output such as a connector that is connected to an electronic apparatus main body is provided.

Figure 10:
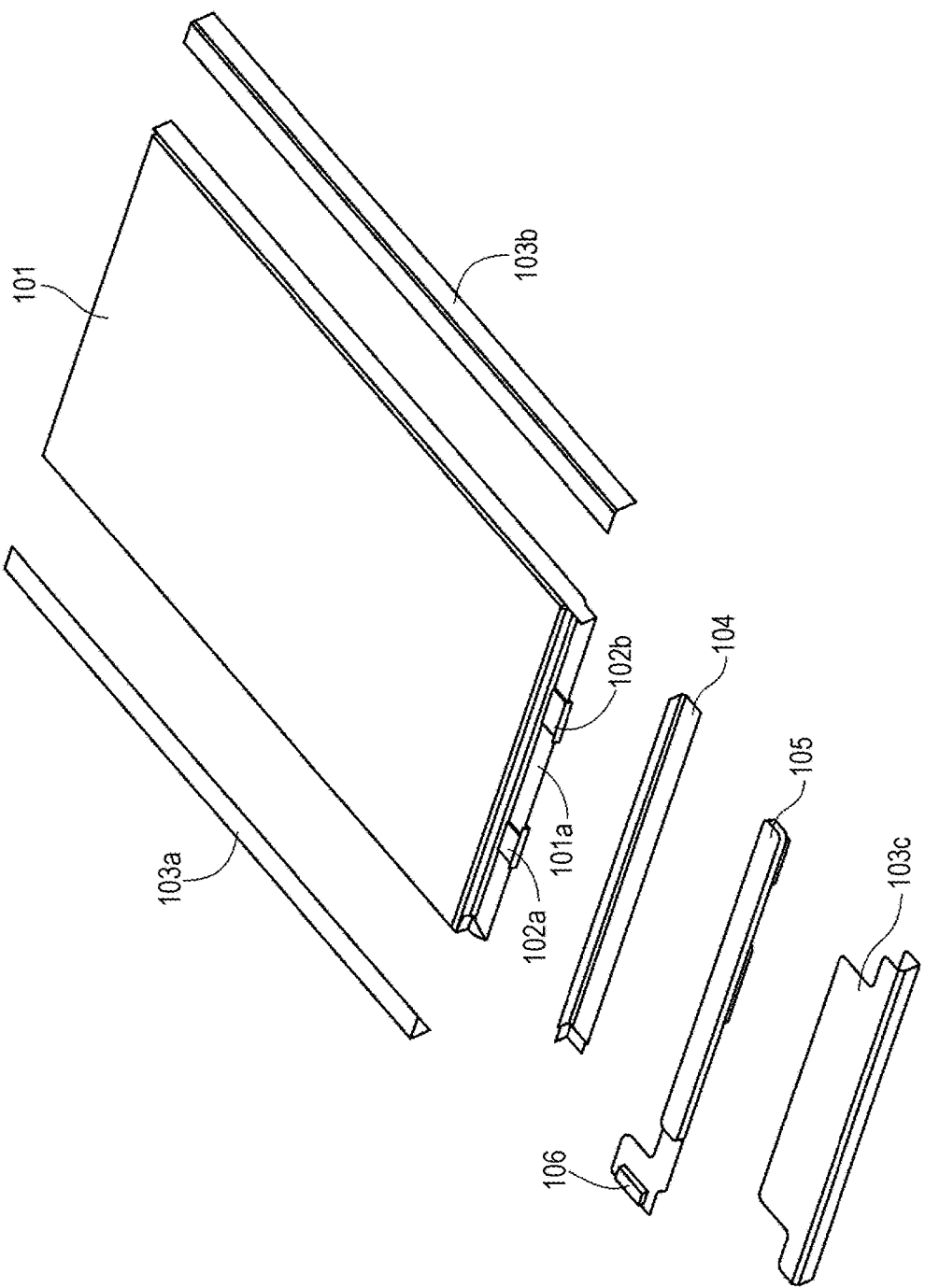
FIG. 10 is an exploded perspective view illustrating a configuration example of a simple type battery pack.

An example of a configuration of the simple type battery pack will be described. FIG. 10 is an exploded perspective view illustrating a configuration example of the simple type battery pack. FIG. 11A is a schematic perspective view illustrating the external appearance of the simple type battery pack, and FIG. 11B is a schematic perspective view illustrating the external appearance of the simple type battery pack.

As illustrated in FIG. 10, and FIGS. 11A and 11B, the simple type battery pack includes a battery cell 101, leads 102a and 102b which are led out from the battery cell 101, insulating tapes 103a to 103c, an insulating plate 104, a circuit substrate 105 on which a protective circuit (PCM; Protection Circuit Module) is provided, and a connector 106. For example, the battery cell 101 is the same as the nonaqueous electrolyte secondary battery as in the third or fourth embodiment.

The insulating plate 104 and the circuit substrate 105 are disposed at a terrace portion 101a on a front end side of the battery cell 101, and the leads 102a and 102b, which are led out from the battery cell 101, are connected to the circuit substrate 105.

The connector 106 for output is connected to the circuit substrate 105. The members such as the battery cell 101, the insulating plate 104, and the circuit substrate 105 are fixed by pasting the insulating tapes 103a to 103c to predetermined positions.

8. Eighth Embodiment

Figure 12:
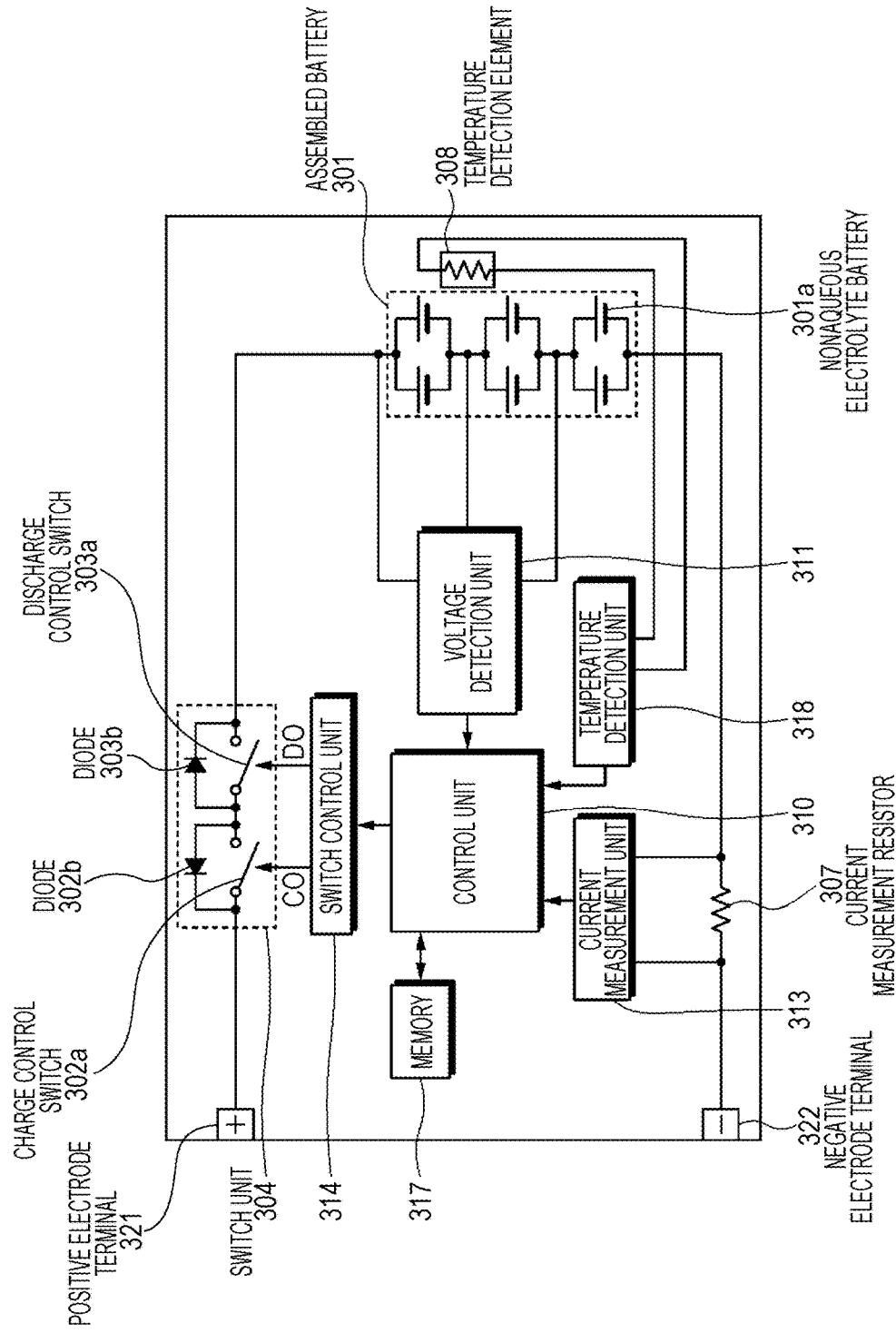
FIG. 12 is a block diagram illustrating a circuit configuration example of a battery pack according to an embodiment of the present technology.

FIG. 12 is a block diagram illustrating a circuit configuration example in a case where the battery (hereinafter, referred to as appropriately secondary battery) according to the third to sixth embodiment of the present technology is applied to a battery pack. The battery pack includes an assembled battery 301, an exterior package, a switch unit 304 provided with a charge control switch 302a and a discharge control switch 303a, a current detection resistor 307, a temperature detection element 308, and a control unit 310.

In addition, the battery pack is provided with a positive electrode terminal 321 and a negative electrode lead 322, and the positive electrode terminal 321 and the negative electrode lead 322 are connected to a positive electrode terminal and a negative electrode terminal of a charger, respectively, during charging to carry out the charging. In addition, at the time of using an electronic apparatus, the positive electrode terminal 321 and the negative electrode lead 322 are connected to a positive electrode terminal and a negative electrode terminal of the electronic apparatus to carry out discharging.

The assembled battery 301 is obtained by connecting a plurality of secondary batteries 301a in series and/or in parallel. The secondary batteries 301a are secondary batteries of the present technology. In addition, in FIG. 12, a case where six secondary batteries 301a are connected in two-parallel and three-series (2P3S) is illustrated as an example, but in addition to this, an arbitrary connection method such as n-parallel m-series (n and m are integers) is possible.

The switch unit 304 is provided with the charge control switch 302a and a diode 302b, and the discharge control switch 303a and a diode 303b, and is controlled by the control unit 310. The diode 302b has a reverse directional polarity with respect to a charge current that flows in a direction from the positive electrode terminal 321 to the assembled battery 301, and a forward directional polarity with respect to a discharge current that flows in a direction from the negative electrode lead 322 to the assembled battery 301. The diode 303b has a forward directional polarity with respect to the charge current and a reverse directional polarity with respect to the discharge current. Furthermore, in this example, the switch unit 304 is provided at a positive side, but may be provided at a negative side.

The charge control switch 302a is controlled by a charge and discharge control unit in such a manner that when a battery voltage becomes an overcharge detection voltage, the charge control switch 302a is turned off, and thus a charge current does not flow through a current path of the assembled battery 301. After the charge control switch 302a is turned off, only discharging through the diode 302b is possible. In addition, the charge control switch 302a is controlled by the control unit 310 in such a manner that when a large current flows during charging, the charge control switch 302a is turned off so as to block a charge current flowing through the current path of the assembled battery 301.

The discharge control switch 303a is controlled by the control unit 310 in such a manner that when the battery voltage becomes an overdischarge detection voltage, the discharge control switch 303a is turned off, and thus a discharge current does not flow through the current path of the assembled battery 301. After the discharge control switch 303*a* is turned off, only charging through the diode 303*b* is possible. In addition, the discharge control switch 303*a* is controlled by the control unit 310 in such a manner that when a large current flows during discharging, the discharge control switch 303*a* is turned off so as to block a discharge current flowing through the current path of the assembled battery 301.

For example, the temperature detection element 308 is a thermistor, and is provided in the vicinity of the assembled battery 301 to measure a temperature of the assembled battery 301 and to supply the temperature that is measured to the control unit 310. A voltage detection unit 311 measures the voltage of the assembled battery 301 and the respective secondary batteries 301*a* which constitute the assembled battery 301, A/D converts the voltage that is measured, and supplies the voltage that is converted to the control unit 310. A current measurement unit 313 measures a current by using the current detection resistor 307, and supplies the current that is measured to the control unit 310.

A switch control unit 314 controls the charge control switch 302*a* and the discharge control switch 303*a* of the switch unit 304 on the basis of the voltage and current which are input from the voltage detection unit 311 and the current measurement unit 313. When the voltage of any one of the secondary batteries 301*a* becomes equal to or less than the overcharge detection voltage or the overdischarge detection voltage, or when the large current suddenly flows, the switch control unit 314 transmits a control signal to the switch unit 304 so as to prevent overcharging, overdischarging, and overcurrent charging and discharging.

Here, for example, in a case where the secondary battery is a lithium ion secondary battery, the overcharge detection voltage is defined to, for example, 4.20 V±0.05 V, and the overdischarge detection voltage is defined to, for example, 2.4 V±0.1 V.

As charge and discharge switches, for example, a semiconductor switch such as a MOSFET may be used. In this case, parasitic diodes of the MOSFET function as the diodes 302*b* and 303*b*. In a case where P-channel type FETs are used as the charge and discharge switches, the switch control unit 314 supplies control signals DO and CO with respect to respective gates of the charge control switch 302*a* and the discharge control switch 303*a*, respectively. In a case where charge control switch 302*a* and the discharge control switch 303*a* are P-channel type switches, the switches are turned on with respect to a gate potential lower than a source potential by a predetermined value or greater. That is, in normal charging and discharging operations, the control signal CO and DO are set to a low level, and the charge control switch 302*a* and the discharge control switch 303*a* are turned on.

In addition, for example, during overcharge or overdischarge, the control signals CO and DO are set to a high level, and the charge control switch 302*a* and the discharge control switch 303*a* are turned off.

A memory 317 is constituted by a RAM or a ROM, for example, an erasable programmable read only memory (EPROM) that is a nonvolatile memory or the like. In the memory 317, a value calculated by the control unit 310, an internal resistance value, which is measured at a manufacturing process stage, of the battery at an initial state of the respective secondary batteries 301*a*, and the like are stored in advance, and these values may be appropriately rewritten. In addition, a full charge capacity of the secondary batteries 301*a* may be stored in the memory 317, and for example, a remaining capacity may be calculated in combination with the control unit 310.

In a temperature detection unit 318, the temperature is measured by using the temperature detection element 308, and at the time of abnormal heat generation, charge and discharge control is performed, or correction is performed during calculation of the remaining capacity.

9. Ninth Embodiment

The battery according to the third to sixth embodiments of the present technology, and the battery packs according to the seventh to eighth embodiments may be mounded on apparatuses such as an electronic apparatus, an electrically driven vehicle, and an electrical storage device, or may be used to supply electric power to the apparatuses.

Examples of the electronic apparatus include a notebook computer, a portable information terminal (PDA), a cellular phone, a cordless phone handset, a video movie, a digital still camera, an electronic book, an electronic dictionary, a music player, a radio, a headphone, a gaming machine, a navigation system, a memory card, a pacemaker, a hearing aid, an electric tool, an electric shaver, a refrigerator, an air-conditioner, a television, a stereo, a water heater, a microwave oven, a dishwasher, a washing machine, a dryer, an illumination apparatus, a toy, a medical apparatus, a robot, a road conditioner, a signal apparatus, and the like.

In addition, examples of the electrically driven vehicle include a railway vehicle, a golf cart, an electrically driven cart, an electric vehicle (including a hybrid car), and the like, and the battery can be used as a driving power supply or an auxiliary power supply of the vehicles.

Examples of the electrical storage device include power supplies for electrical storage of buildings starting from a house or a power generating facility.

Hereinafter, among the above-described application examples, specific examples of the electrical storage system using an electrical storage device to which the battery of the present technology is applied will be described.

As the electrical storage system, for example, the following configuration may be exemplified. A first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electronic apparatus to which electric power is supplied from an electrical storage device. This electrical storage system is executed as a system that realizes effective power supply in cooperation with an external power supply network.

In addition, a fourth electrical storage system is an electrically driven vehicle provided with a conversion device to which electric power is supplied from an electrical storage device and which converts the electric power to a driving force of a vehicle, and a control device that performs information processing relating to vehicle control on the basis of information relating to the electrical storage device. A fifth electrical storage system is an electric power system that is provided with an electric power information transmitting and receiving unit that transmits and receives signal to and from other apparatuses through a network, and performs charge and discharge control of the above-described electrical storage device on the basis of the information that is received by the transmitting and receiving unit. A sixth electrical storage system is an electrical power system to which electric power is supplied from the above-described electrical storage device or which supplies electric power from a power generator or a power network to the electrical storage device. Hereinafter, the electrical storage system will be described.

(9-1) Electrical Storage System in House as Application Example

Figure 13:
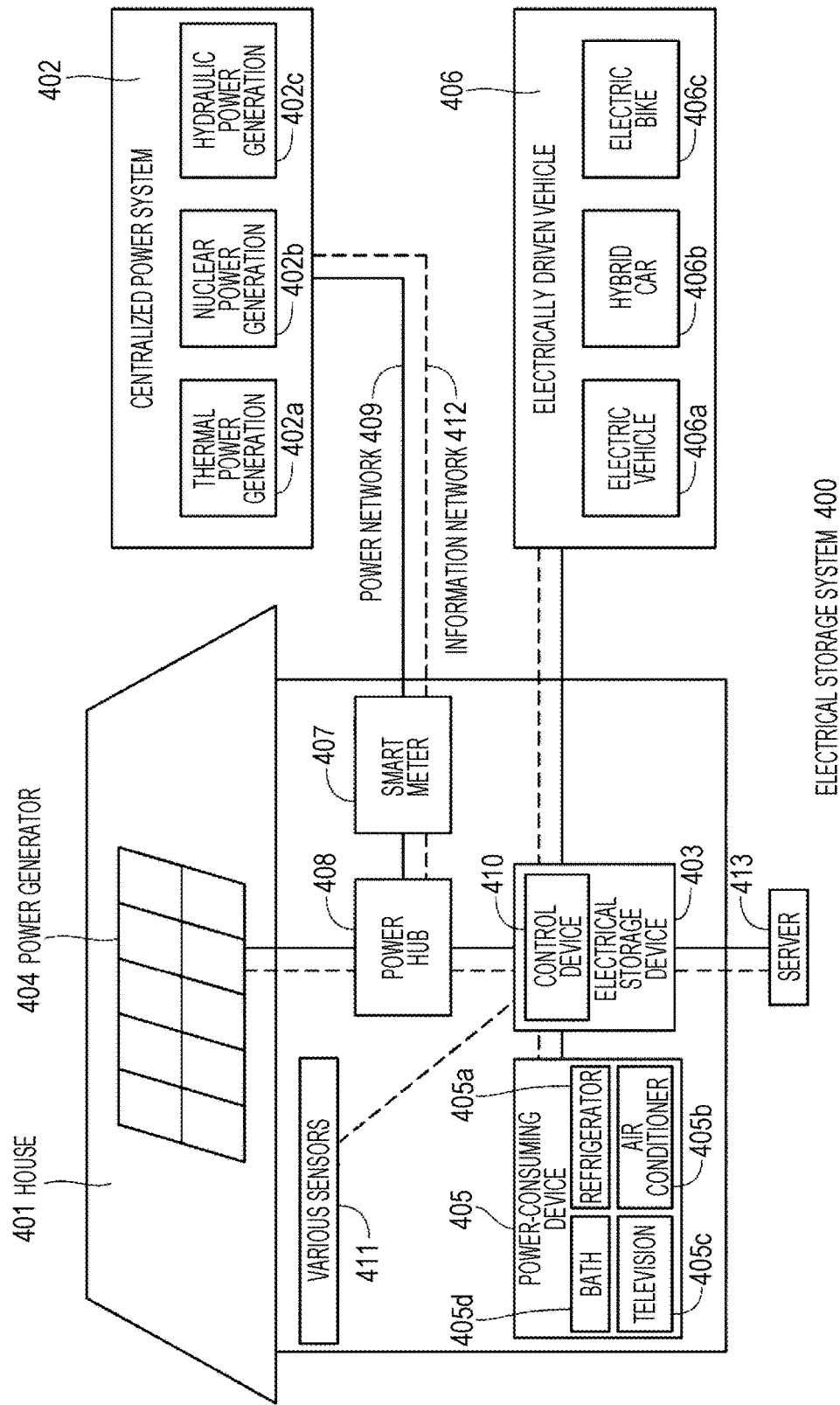
FIG. 13 is a schematic view illustrating an application example to a household electrical storage system that uses the nonaqueous electrolyte battery of present technology.

An example in which an electrical storage device using the battery of the present technology is applied to an electrical storage system for a house will be described with reference to FIG. 13. For example, in an electrical storage system 400 for a house 401, electric power is supplied to an electrical storage device 403 from a centralized power system 402 such as a thermal power generation 402a, a nuclear power generation 402b, a hydraulic power generation 402c through a power network 409, an information network 412, a smart meter 407, a power hub 408, and the like. In addition, electric power from an independent power supply such as an in-house power generator 404 is supplied to the electrical storage device 403. The electric power supplied to the electrical storage device 403 is stored. Electric power that is used in the house 401 is supplied by using the electrical storage device 403. The same electrical storage system may also be used with respect to a building without limitation to the house 401.

The power generator 404, power-consuming devices 405, the electrical storage device 403, a control device 410 that controls respective devices, the smart meter 407, and sensors 411 which acquire various pieces of information are provided to the house 401. The respective devices are connected by the power network 409 and the information network 412. As the power generator 404, a solar cell, a fuel cell, and the like are used, and generated power is supplied to the power-consuming devices 405 and/or the electrical storage device 403. Examples of the power-consuming devices 405 include a refrigerator 405a, an air-conditioner 405b, a television receiver 405c, a bath 405d, and the like. In addition, examples of the power-consuming device 405 include an electrically driven vehicle 406. Examples of the electrically driven vehicle 406 include an electric vehicle 406a, a hybrid car 406b, and an electric bike 406c.

The battery of the present technology is applied with respect to this electrical storage device 403. The battery of the present technology may be constituted by, for example, the above-described lithium ion secondary battery. The smart meter 407 has a function of measuring the amount of commercial power used and of transmitting the measured amount of commercial power used to a power company. The power network 409 may be any one of a DC power supply type, an AC power supply type, and non-contact power supply type, or a combination of a plurality of the types.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power-consuming devices 405 are automatically controlled. Therefore, it is possible to make the energy-consumption minimal. In addition, the control device 410 may transmit information related to the house 401 to an external power company or the like through the Internet.

Processes such as divergence of power lines and DC-AC conversion are performed by the power hub 408. Examples of a communication method of the information network 412 connected to the control device 410 include a method using a communication interface such as a universal asynchronous receiver-transceiver (UART: transmission and reception circuit for asynchronous serial communication), and a method using a sensor network compliant to a wireless communication standard such as Bluetooth, ZigBee, and Wi-Fi may be exemplified. The Bluetooth method is applied to multimedia communication and can perform one-to-multi-connection communication. The ZigBee uses a physical layer of IEEE (Institute of Electrical and Electronics Engineers) 802.15.4. IEEE 802.15.4 is the name of a short-range wireless network standard called a personal area network (PAN) or wireless (W) PAN.

The control device 410 is connected to an external server 413. The server 413 may be managed by any one of the house 401, the power company, and a service provider. Examples of information that is transmitted to and received from the server 413 include power-consumption information, life pattern information, power rates, weather information, disaster information, and information related to power transaction. These kinds of information may be transmitted to and received from in-house power-consuming devices (for example, television receivers), but may be transmitted to and received from devices (for example, cellular phones, or the like) located on an outer side of the house. These kinds of information may be displayed on, for example, a television receiver, a cellular phone, a personal digital assistant (PDA), and the like which have a display function.

The control device 410 that controls each unit includes a central processing unit (CPU), a random access memory (RAM), a read only memory (ROM), and the like, and is accommodated in the electrical storage device 403 in this example. The control device 410 is connected to the electrical storage device 403, the in-house power generator 404, the power-consuming devices 405, the various sensors 411, and the server 413 through the information network 412, and has, for example, a function of adjusting the amount of commercial power used and the amount of power generation. Furthermore, in addition to this function, the control device 410 may have a function of performing power transaction in a power market, and the like.

As described above, a generated output of the in-house power generator 404 (photovoltaic generation and wind power generation) as well as the centralized power system 402 such as the thermal power generation 402a, the nuclear power generation 402b, and the hydraulic power generation 402c may be stored in the electrical storage device 403. Therefore, even when the generated output of the in-house power generator 404 varies, it is possible to make the amount of power transmitted to an outer side uniform, or it is possible to control discharging as much as necessary. For example, a method of use described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, description has been given of an example in which the control device 410 is accommodated in the electrical storage device 403, but the control device 410 may be accommodated in the smart meter 407, or may be configured independently. Furthermore, the electrical storage system 400 may be used in a plurality of homes as targets in regard to an apartment house, or may be used in a plurality of detached houses as targets.

(9-2) Electrical Storage System in Vehicle as Application Example

Figure 14:
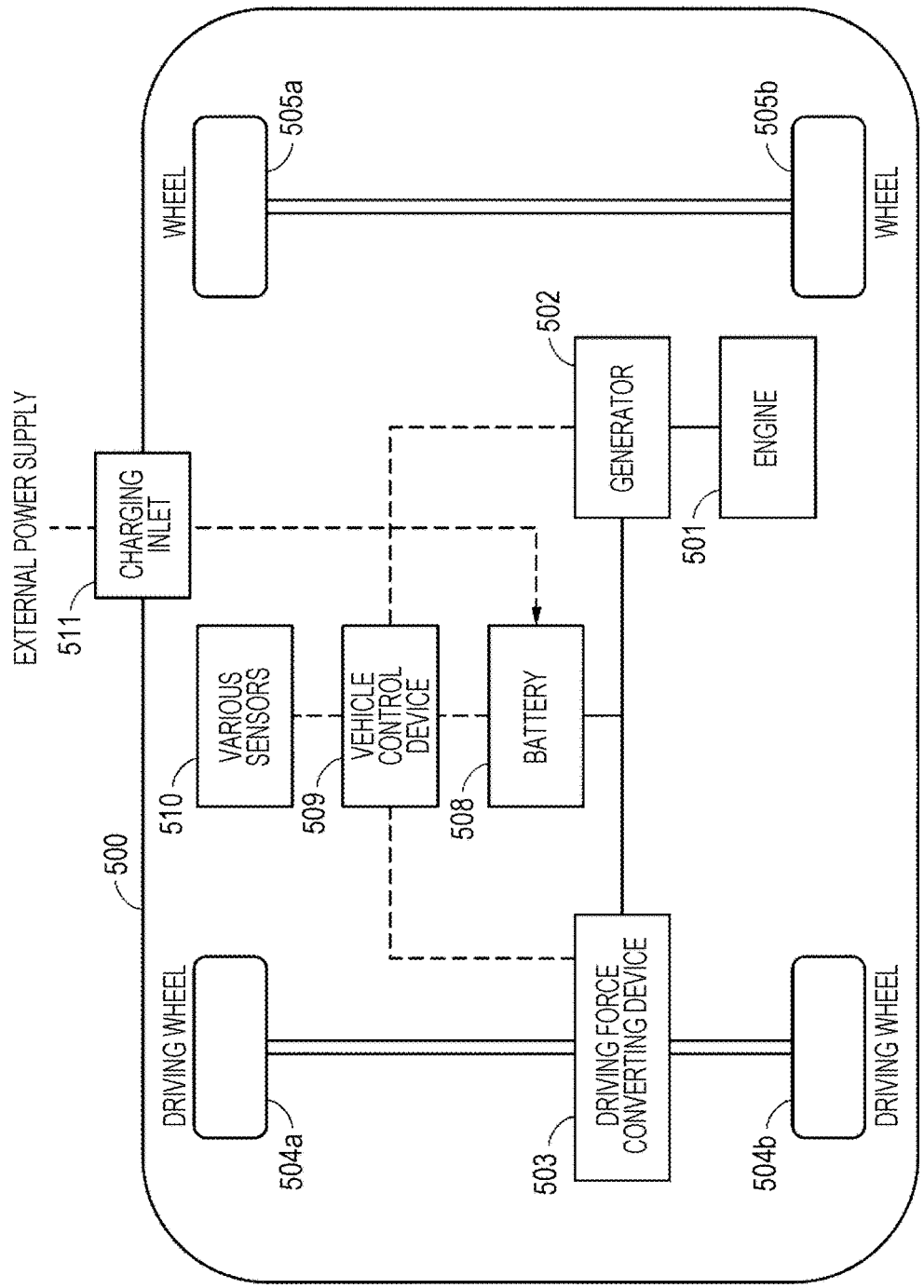
FIG. 14 is a schematic view schematically illustrating an example of a configuration of a hybrid vehicle that employs a series hybrid system to which the present technology is applied.

An example in which the present technology is applied to an electrical storage system for a vehicle will be described with reference to FIG. 14. FIG. 14 schematically illustrates a configuration example of a hybrid car that employs a series hybrid system to which the present technology is applied. The series hybrid system is a vehicle that travels with a power-driving force converting device by using electric power generated by a generator moved by an engine or the electric power that is temporarily stored in a battery.

In a hybrid vehicle 500, an engine 501, a generator 502, a power-driving force converting device 503, a driving wheel 504a, a driving wheel 504b, a wheel 505a, a wheel 505b, a battery 508, a vehicle control device 509, various sensors 510, and a charging inlet 511 are mounted. As the battery 508, the above-described battery of the present technology is applied.

The hybrid vehicle 500 travels by using the power-driving force converting device 503 as a power source. An example of the power-driving force converting device 503 is a motor. The power-driving force converting device 503 operates by electric power of the battery 508, and the torque of the power-driving force converting device 503 is transmitted to the driving wheels 504a and 504b. In addition, the power-driving force converting device 503 is applicable to an AC motor or a DC motor by using DC-AC conversion or invert conversion (AC-DC conversion) as necessary. The various sensors 510 control the engine speed or the opening degree (throttle opening degree) of a throttle valve (not illustrated) through the vehicle control device 509. Examples of the various sensors 510 include a speed sensor, an acceleration sensor, an engine speed sensor, and the like.

The torque of the engine 501 may be transmitted to the generator 502, and electric power generated by the generator 502 using the torque may be stored in the battery 508.

When the hybrid vehicle 500 is decelerated by a brake mechanism (not illustrated), a resistance force during the deceleration is added to the power-driving force converting device 503 as a torque, and regenerated electric power that is generated by the power-driving force converting device 503 due to the torque is stored in the battery 508.

When the battery 508 is connected to an external power supply on an outer side of the hybrid vehicle 500, electric power can be supplied to the battery 508 from the external power supply by using the charging inlet 511 as an input inlet, and the battery 508 can store the electric power that is supplied.

Although not illustrated, an information processing device that performs information processing related to vehicle control on the basis of information related to the secondary battery may be provided. Examples of the information processing device include an information processing device that performs displaying of a residual amount of the battery on the basis of information about the residual amount of the battery, and the like.

In addition, hereinbefore, description has been given of the series hybrid car that travels with a motor by using electric power generated by a generator moved by an engine, or the electric power that is temporarily stored in a battery as an example. However, the present technology may be effectively applied to a parallel hybrid car that uses both the output of the engine and the output of the motor as driving sources, and utilizes three types of traveling using the engine only, traveling using the motor only, and traveling using the engine and motor by appropriately changing these types. In addition, the present technology may be effectively applied to a so-called electrically driven vehicle that travels using driving by a driving motor only without using the engine.

EXAMPLES

Hereinafter, the present technology will be described in detail with reference to examples. Furthermore, the present technology is not limited to configuration of the following examples.

Example 1-1

[Manufacturing of Positive Electrode]

91% by mass of lithium cobaltate ($LiCoO_2$) as a positive electrode active material, 6% by mass of carbon black as a conductive agent, and 3% by mass of polyvinylidene fluoride (PVdF) as a binding agent were mixed to prepare a positive electrode mixture, and the positive electrode mixture was dispersed in N-methyl-2-pyrrolidone (NMP) as a dispersion medium as a dispersion medium, thereby obtaining positive electrode mixture slurry. The positive electrode mixture slurry was applied to both surfaces of a positive electrode current collector, which was constituted by strip-shaped aluminum foil having a thickness of 12 µm, in such a manner that a part of the positive electrode current collector was exposed. Then, the dispersion medium in the positive electrode mixture slurry that was applied was evaporated and dried, and compression molding was performed with a roll press machine, thereby forming a positive electrode active material layer. Finally, a positive electrode terminal was attached to an exposed portion of the positive electrode current collector, thereby forming a positive electrode.

[Manufacturing of Negative Electrode]

96% by mass of particle-like graphite powder having an average particle size of 20 µm as a negative electrode active material, 1.5% by mass of acrylic acid modified product of a styrene-butadiene copolymer as a binding agent, 1.5% by mass of carboxymethyl cellulose as a thickening agent were mixed to obtain a negative electrode mixture. Then, an appropriate amount of water was added to the negative electrode mixture, and the resultant mixture was stirred to prepare negative electrode mixture slurry. The negative electrode mixture slurry was applied to both surfaces of a negative electrode current collector, which was constituted by a strip-shaped copper foil having a thickness of 15 µm, in such a manner that a part of the negative electrode current collector was exposed. Next, a dispersion medium in the negative electrode mixture slurry that was applied was evaporated and dried, and then compression molding was performed with a roll press machine, thereby forming a negative electrode active material layer. Finally, a negative electrode terminal was attached to an exposed portion of the positive electrode current collector, thereby forming a negative electrode.

[Manufacturing of Separator]

As the base material, a microporous polyethylene (PE) film (polyethylene separator) having a thickness of 9 µm was used. A coating material was applied to both surfaces of the base material in the following manner to form a particle-containing resin solution layer (coating material film), and the particle-containing resin solution layer was dried to form a particle-containing resin layer.

First, boehmite particles (refractive index: 1.7) having an average particle size of 0.8 μm as filler, and polyvinyl fluoride (PVdF) as a matrix polymer compound were dispersed in N-methyl-2-pyrrolidone (NMP) to prepare a coating material (particle-containing resin solution). At this time, the amount of respective materials was adjusted in such a manner that the amount of boehmite contained was set to 5% by mass on the basis of the total amount of the coating material, a mass ratio (boehmite/PVdF) between boehmite and PVdF was set to 50/50, and a solid content (boehmite and PVdF) became 20% by mass on the basis of the total amount of the coating material.

Next, the coating material was uniformly applied to both surfaces of the base material in a predetermined coating material thickness illustrated in Table 1 (in Example 1-1, 10.0 μm). At this time, the thickness of a coating material film was measured by a laser thickness meter during application, and in a case where a measured value was different from a predetermined coating material thickness, an ejection amount of the coating material was automatically adjusted so that the measured value approximated to the predetermined coating material thickness.

Then, the base material, on which the coating material was applied, was allowed to pass through a dryer to remove NMP from a particle-containing resin solution layer, thereby preparing a separator including the base material, and the particle-containing resin layer that was formed on both surfaces of the base material and was constituted by PVdF and the boehmite particles.

[Assembly of Laminated Film Type Battery]

The positive electrode, the negative electrode, and the separator in which the particle-containing resin layer was formed on both surfaces thereof were sequentially laminated in the order of the positive electrode, the separator, the negative electrode, and the separator, and the resultant laminated body was wound a plurality of times in a flat shape along a longitudinal direction thereof. Then, a winding end portion was fixed with an adhesive tape, thereby forming a wound electrode body.

Next, the wound electrode body was interposed between parts of an exterior packaging member, and three sides of the exterior packaging member were thermally fused. Furthermore, as the exterior packaging member, a laminated film including a soft aluminum layer was used.

Then, an electrolytic solution was injected into the exterior packaging member, and the remaining one side was thermally fused under a reduced pressure and was hermetically closed. At this time, the particle-containing resin layer was impregnated with the electrolytic solution to swell the matrix polymer compound, thereby forming a gel-like electrolyte (gel electrolyte layer). Furthermore, as the electrolytic solution, an electrolytic solution prepared as follows was used. Lithium hexafluorophosphate ($LiPF_6$) as an electrolyte salt was dissolved in a nonaqueous solvent in which ethylene carbonate (EC) and dimethyl carbonate (DMC) were mixed, thereby preparing the electrolytic solution. At this time, the amount of respective constituent components was adjusted so that a mass ratio (EC/DMC/$LiPF_6$) of the constituent components (EC/DMC/$LiPF_6$) of the electrolytic solution became 35/50/15. In this manner, a laminated film type battery illustrated in FIG. 4, in which a battery shape had a thickness of 4.5 mm, a width of 30 mm, and a height of 50 mm, was manufactured.

Example 1-2 to Example 1-55, and Comparative Example 1-1 to Comparative Example 1-8

In Example 1-2 to Example 1-55, and Comparative Example 1-1 to Comparative Example 1-8, laminated film type batteries were manufactured in the same manner as in Example 1-1 except that the filler that was used was changed as illustrated in Table 1.

(Evaluation: Plane Rate of Filler, and External Appearance of Coating Material)

In the above-described Examples and Comparative Examples, a plane rate of the filler and the external appearance of the coating material were measured and evaluated as follows. (This is true of the following Examples and Comparative Examples)

(Measurement of Plane Rate)

The plate rate was measured as follows. The particle-containing resin layer that contained the electrolytic solution was observed with a SEM in a direction perpendicular to a main surface of the particle-containing resin layer that contained the electrolytic solution, and a picture of 10 particles, which had a typical shape in a size approximately equal to a 50% average size (D50) on a volume basis, was taken. Furthermore, the average particle size (D50) represents a value that was measured by observing a powder, which was obtained by removing the resin, the liquid component, and the like from the particle-containing resin layer that contained the electrolytic solution, with a laser diffraction particle size analyzer. Next, with respect to respective particles, a projection area of a plane (in a case where a plurality of the planes exist, a total area thereof) equivalent to the crystal plane, the broken plane, or the cleavage plane in a projection area was obtained to calculate the percentage of the projection area of the plane with respect to a projection area of all of the particles, and then an average value of the calculated percentages of the respective particles was set as the plane rate.

(Evaluation of External Appearance)

The external appearance of the coating material film was observed through visual observation. Furthermore, evaluation was performed in a step wise manner such as "transparent", "almost transparent", "close to transparent", and "translucent" on the basis of the degree of transparency. In the case of the "transparent", "almost transparent", and "close to transparent", in any case, the contour of an application target (the electrodes or the separator) could be visually recognized in a perfect manner through the coating material film. In addition, in accordance with the degree of chroma of white turbidity, evaluation was performed in a step wise manner such as "light white turbidity", "white turbidity", and "dark white turbidity". In the case of "light white turbidity", "white turbidity", "dark white turbidity", and "brown opacity", it was difficult to visually recognize the contour of the application target (the electrodes or the separator) through the coating material film.

(Evaluation of Battery: Determination of Passing or Failing in Laser Measurement)

The respective batteries which were manufactured were disassembled, and the thickness of the gel electrolyte layer, in which the matrix polymer compound of the particle-containing resin layer suctioned the electrolytic solution and swelled, was confirmed with a contact type thickness meter. Calculation of the thickness was performed by obtaining a difference between the thickness of the polyethylene separator (base material) and the thickness of the separator that contained the gel electrolyte.

Furthermore, the thickness of the particle-containing resin layer depends on the volume of the solvent that is contained in the particle-containing resin layer. That is, in a case where the kind of the solvent contained in the particle-containing resin layer is different in each case but the amount of the solvent contained is set to the same volume in each case, the thickness of the coating material film containing NMP which is measured by the laser thickness meter, and the thickness of the particle-containing resin layer (gel electrolyte layer) containing the electrolytic solution which is measured by the contact type thickness meter become the same as each other.

Accordingly, in a case where a difference between the thickness of the coating material film containing NMP which is measured with the laser thickness meter, and the thickness of the particle-containing resin layer (gel electrolyte layer) containing the electrolytic solution which is measured by the contact type thickness meter is in a range of ±10%, it can be determined that thickness management of the coating material film, which is performed in real time during application of the coating material, functions in an accurate manner.

On the basis of the determination standard, in a case where a difference between a measured value of the thickness of the coating material film, and a measured value of the thickness of the gel electrolyte layer was in a range of ±10% on the basis of the percentage with respect to the measured value of the thickness of the coating material film, this case was regarded as "passing", and the other cases were regarded as "failing".

Evaluation results are illustrated in Table 1.

TABLE 1

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 1-1 | Boehmite | 75 | 1.7 | PVdF | Separator | Transparent | 10.0 | 9.8 | Passing |
| Example 1-2 | Talc | | 1.6 | | | Transparent | 9.7 | 9.5 | Passing |
| Example 1-3 | Zinc oxide | | 2.0 | | | Transparent | 10.9 | 11.0 | Passing |
| Example 1-4 | Tin oxide | | 2.0 | | | Transparent | 11.0 | 11.2 | Passing |
| Example 1-5 | Silicon oxide | | 1.5 | | | Transparent | 9.4 | 9.0 | Passing |
| Example 1-6 | Magnesium oxide | | 1.7 | | | Transparent | 10.2 | 10.1 | Passing |
| Example 1-7 | Antimony oxide | | 2.1 | | | Transparent | 11.3 | 11.6 | Passing |
| Example 1-8 | Aluminum oxide | | 1.8 | | | Transparent | 10.3 | 10.3 | Passing |
| Example 1-9 | Magnesium sulfate | | 1.5 | | | Transparent | 9.6 | 9.3 | Passing |
| Example 1-10 | Calcium sulfate | | 1.6 | | | Transparent | 9.8 | 9.6 | Passing |
| Example 1-11 | Barium sulfate | | 1.6 | | | Transparent | 9.9 | 9.8 | Passing |
| Example 1-12 | Strontium sulfate | | 1.5 | | | Transparent | 9.5 | 9.2 | Passing |
| Example 1-13 | Magnesium carbonate | | 1.5 | | | Transparent | 9.6 | 9.3 | Passing |
| Example 1-14 | Calcium carbonate | | 1.6 | | | Transparent | 9.7 | 9.5 | Passing |
| Example 1-15 | Barium carbonate | | 1.6 | | | Transparent | 9.8 | 9.6 | Passing |
| Example 1-16 | Lithium carbonate | | 1.5 | | | Transparent | 9.5 | 9.2 | Passing |
| Example 1-17 | Magnesium hydroxide | | 1.6 | | | Transparent | 9.7 | 9.5 | Passing |
| Example 1-18 | Aluminum hydroxide | | 1.3 | | | Transparent | 9.0 | 8.5 | Passing |
| Example 1-19 | Zinc hydroxide | | 1.5 | | | Transparent | 9.5 | 9.2 | Passing |
| Example 1-20 | Boron carbide | | 1.5 | | | Transparent | 9.5 | 9.2 | Passing |
| Example 1-21 | Silicon nitride | | 2.0 | | | Transparent | 11.0 | 11.2 | Passing |
| Example 1-22 | Boron nitride | | 2.1 | | | Transparent | 11.4 | 11.7 | Passing |
| Example 1-23 | Aluminum nitride | | 2.1 | | | Transparent | 11.3 | 11.6 | Passing |
| Example 1-24 | Titanium nitride | | 1.3 | | | Transparent | 8.9 | 8.4 | Passing |
| Example 1-25 | Lithium fluoride | | 1.4 | | | Transparent | 9.2 | 8.8 | Passing |
| Example 1-26 | Aluminum fluoride | | 1.3 | | | Transparent | 8.9 | 8.4 | Passing |
| Example 1-27 | Calcium fluoride | | 1.4 | | | Transparent | 9.3 | 8.9 | Passing |
| Example 1-28 | Barium fluoride | | 1.5 | | | Transparent | 9.4 | 9.1 | Passing |
| Example 1-29 | Magnesium fluoride | 75 | 1.4 | PVdF | Separator | Transparent | 9.1 | 8.7 | Passing |
| Example 1-30 | Trilithium phosphate | | 1.5 | | | Transparent | 9.5 | 9.2 | Passing |
| Example 1-31 | Magnesium phosphate | | 1.5 | | | Transparent | 9.5 | 9.2 | Passing |
| Example 1-32 | Magnesium hydrogenphosphate | | 1.5 | | | Transparent | 9.5 | 9.2 | Passing |
| Example 1-33 | Calcium silicate | | 1.6 | | | Transparent | 9.9 | 9.7 | Passing |
| Example 1-34 | Zinc silicate | | 1.6 | | | Transparent | 9.8 | 9.6 | Passing |
| Example 1-35 | Zirconium silicate | | 2.0 | | | Transparent | 11.0 | 11.2 | Passing |
| Example 1-36 | Aluminum silicate | | 1.7 | | | Transparent | 10.0 | 9.8 | Passing |
| Example 1-37 | Magnesium silicate | | 1.6 | | | Transparent | 9.8 | 9.6 | Passing |
| Example 1-38 | Spinel | | 1.7 | | | Transparent | 10.2 | 10.1 | Passing |
| Example 1-39 | Hydrotalcite | | 1.5 | | | Transparent | 9.6 | 9.3 | Passing |
| Example 1-40 | Dolomite | | 1.6 | | | Transparent | 9.8 | 9.6 | Passing |
| Example 1-41 | Kaolinite | | 1.6 | | | Transparent | 9.7 | 9.4 | Passing |
| Example 1-42 | Sepiolite | | 1.5 | | | Transparent | 9.5 | 9.2 | Passing |
| Example 1-43 | Imogolite | | 1.5 | | | Transparent | 9.5 | 9.2 | Passing |
| Example 1-44 | Sericite | | 1.6 | | | Transparent | 9.7 | 9.5 | Passing |
| Example 1-45 | Pyrophyllite | | 1.6 | | | Transparent | 9.7 | 9.5 | Passing |
| Example 1-46 | Mica | | 1.6 | | | Transparent | 9.7 | 9.5 | Passing |
| Example 1-47 | Zeolite | | 1.5 | | | Transparent | 9.4 | 9.1 | Passing |
| Example 1-48 | Mullite | | 1.5 | | | Transparent | 9.5 | 9.2 | Passing |
| Example 1-49 | Saponite | | 1.5 | | | Transparent | 9.5 | 9.2 | Passing |
| Example 1-50 | Attapulgite | | 1.5 | | | Transparent | 9.5 | 9.2 | Passing |

TABLE 1-continued

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 1-51 | Montmorillonite | | 1.5 | | | Transparent | 9.5 | 9.2 | Passing |
| Example 1-52 | Melamine | 76 | 1.6 | | | Transparent | 9.8 | 9.6 | Passing |
| Example 1-53 | Ammonium polyphosphate | 77 | 1.6 | | | Transparent | 9.8 | 9.6 | Passing |
| Example 1-54 | Melamine cyanurate | 78 | 1.6 | | | Transparent | 9.8 | 9.6 | Passing |
| Example 1-55 | Melamine polyphosphate | 79 | 1.6 | | | Transparent | 9.8 | 9.6 | Passing |
| Comparative Example 1-1 | Zirconium oxide | 75 | 2.4 | PVdF | Separator | Dark white turbidity | 9.8 | 32.0 | Failing |
| Comparative Example 1-2 | Cerium oxide | 75 | 2.2 | PVdF | Separator | Dark white turbidity | 9.8 | 23.0 | Failing |
| Comparative Example 1-3 | Barium titanate | | 2.4 | | | Dark white turbidity | 9.8 | 26.0 | Failing |
| Comparative Example 1-4 | Strontium titanate | | 2.4 | | | Dark white turbidity | 9.8 | 45.0 | Failing |
| Comparative Example 1-5 | Titanium oxide | | 2.6 | | | Dark white turbidity | 9.8 | 32.0 | Failing |
| Comparative Example 1-6 | Diamond | | 2.4 | | | Dark white turbidity | 9.8 | 26.0 | Failing |
| Comparative Example 1-7 | Silicon carbide (colored) | | — | | | Opaque | 9.8 | 54.0 | Failing |
| Comparative Example 1-8 | Iron oxide (colored) | | — | | | Opaque | 9.8 | 33.0 | Failing |
| Comparative Example 1-9 | Silicon (colored) | | — | | | Opaque | 9.8 | 39.0 | Failing |

As illustrated in Table 1, in Example 1-1 to Example 1-55, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 1-1 to Comparative Example 1-8, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 2-1

A laminated film type batter was manufactured in the same manner as Example 1-1.

Example 2-2 to Example 2-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 2-2, boehmite particles having a plane rate of 45% were used as the filler. In Example 2-3, boehmite particles having a plane rate of 50% were used as the filler. In Example 2-4, boehmite particles having a plane rate of 60% were used as the filler. In Example 2-5, boehmite particles having a plane rate of 80% were used as the filler. In Example 2-6, boehmite particles having a plane rate of 90% were used as the filler. In Example 2-7, boehmite particles having a plane rate of 100% were used as the filler. Laminated film type batteries were manufactured in the same manner as in Example 2-1 except for the above-described configurations.

Example 2-8

A laminated film type battery was manufactured in the same manner as in Example 1-2.

Example 2-9 to Example 2-14

As the filler, talc particles having a different plane rate were used. In a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane. Specifically, in Example 2-9, talc particles having a plane rate of 45% were used as the filler. In Example 2-10, talc particles having a plane rate of 50% were used as the filler. In Example 2-11, talc particles having a plane rate of 60% were used as the filler. In Example 2-12, talc particles having a plane rate of 80% were used as the filler. In Example 2-13, talc particles having a plane rate of 90% were used as the filler. In Example 2-14, talc particles having a plane rate of 100% were used as the filler. Laminated film type batteries were manufactured in the same manner as in Example 2-8 except for the above-described configurations.

Comparative Example 2-1 to Comparative Example 2-5

Instead of the boehmite particles, aluminum oxide particles having a different plane rate were used as the filler. Specifically, in Comparative Example 2-1, aluminum oxide particles having a plane rate of 40% were used as the filler. In Comparative Example 2-2, aluminum oxide particles having a plane rate of 30% were used as the filler. In Comparative Example 2-3, aluminum oxide particles having a plane rate of 20% were used as the filler. In Comparative Example 2-4, aluminum oxide particles having a plane rate of 10% were used as the filler. In Comparative Example 2-5, aluminum oxide particles (plane rate: 0%) having a spherical shape were used as the filler. Laminated film type batteries were manufactured in the same manner as in Example 2-1 except for the above-described configurations.
(Evaluation of Battery: Determination of Passing or Failing in Laser Measurement)
With respect to the manufactured laminated film type batteries of respective Examples and Comparative Examples, the determination of passing or failing in the laser measurement was performed in the same manner as in Example 1-1.
Evaluation results are illustrated in Table 2.

As illustrated in Table 2, in Example 2-1 to Example 2-14, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 2-1 to Comparative Example 2-5, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 3-1 to Example 3-8

In Example 3-1 to Example 3-8, laminated film type batteries were manufactured in the same manner as in Example 1-1 except that the mass ratio between the filler (boehmite particles) and the matrix polymer compound (PVdF) was changed. Specifically, in Example 3-1, the mass ratio (particle/PVdF) was set to 15/85. In Example 3-2, the mass ratio (particle/PVdF) was set to 20/80. In Example 3-3, the mass ratio (particle/PVdF) was set to 30/70. In Example 3-4, the mass ratio (particle/PVdF) was set to 50/50 similar to Example 1-1. In Example 3-5, the mass ratio (particle/PVdF) was set to 70/30. In Example 3-6, the mass ratio (particle/PVdF) was set to 80/20. In Example 3-7, the mass

TABLE 2

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 2-1 | Boehmite | 75 | 1.7 | PVdF | Separator | Transparent | 10.0 | 9.8 | Passing |
| Example 2-2 | | 45 | 1.7 | | | Close to transparent | 10.0 | 10.8 | Passing |
| Example 2-3 | | 50 | 1.7 | | | Almost transparent | 10.0 | 10.5 | Passing |
| Example 2-4 | | 60 | 1.7 | | | Transparent | 10.0 | 10.5 | Passing |
| Example 2-5 | | 80 | 1.7 | | | Transparent | 10.0 | 9.7 | Passing |
| Example 2-6 | | 90 | 1.7 | | | Transparent | 10.0 | 9.7 | Passing |
| Example 2-7 | | 100 | 1.7 | | | Transparent | 10.0 | 9.7 | Passing |
| Example 2-8 | Talc | 75 | 1.6 | PVdF | Separator | Transparent | 9.7 | 9.5 | Passing |
| Example 2-9 | | 45 | 1.6 | | | Close to transparent | 9.7 | 10.5 | Passing |
| Example 2-10 | | 50 | 1.6 | | | Almost transparent | 9.7 | 10.2 | Passing |
| Example 2-11 | | 60 | 1.6 | | | Transparent | 9.7 | 10.2 | Passing |
| Example 2-12 | | 80 | 1.6 | | | Transparent | 9.7 | 9.4 | Passing |
| Example 2-13 | | 90 | 1.6 | | | Transparent | 9.7 | 9.4 | Passing |
| Example 2-14 | | 100 | 1.6 | | | Transparent | 9.7 | 9.4 | Passing |
| Comparative Example 2-1 | Aluminum oxide | 40 | 1.8 | PVdF | Separator | Translucent | 10 | 24.3 | Failing |
| Comparative Example 2-2 | | 30 | 1.8 | | | Light white turbidity | 10 | 26.7 | Failing |
| Comparative Example 2-3 | | 20 | 1.8 | | | White turbidity | 10 | 28.9 | Failing |
| Comparative Example 2-4 | | 10 | 1.8 | | | Dark white turbidity | 10 | 30.1 | Failing |
| Comparative Example 2-5 | | 0 (Spherical body) | 1.8 | | | Dark white turbidity | 10 | 36.5 | Failing | ratio (particle/PVdF) was set to 85/15. In Example 3-8, the mass ratio (particle/PVdF) was set to 90/10.

Example 3-9 to Example 3-15

In Example 3-9 to Example 3-15, laminated film type batteries were manufactured in the same manner as in Example 1-2 except that the mass ratio between the filler (talc particles) and the matrix polymer compound (PVdF) was changed. Specifically, in Example 3-9, the mass ratio (particle/PVdF) was set to 20/80. In Example 3-10, the mass ratio (particle/PVdF) was set to 40/60. In Example 3-11, the mass ratio (particle/PVdF) was set to 50/50 similar to Example 1-2. In Example 3-12, the mass ratio (particle/PVdF) was set to 60/40. In Example 3-13, the mass ratio (particle/PVdF) was set to 80/20. In Example 3-14, the mass ratio (particle/PVdF) was set to 85/15. In Example 3-15, the mass ratio (particle/PVdF) was set to 90/10.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 1-1.

Evaluation results are illustrated in Table 3.

was confirmed that the degree of transparency could be changed by changing the ratio (mixing ratio) between the filler and the matrix polymer compound.

Example 4-1

In Example 4-1, a laminated film type battery was manufactured in the same manner in Example 1-1.

Example 4-2 and Example 4-3

In Example 4-2 and Example 4-3, the kind of the matrix polymer compound (resin), which constitutes the gel electrolyte layer, was changed. In Example 4-2, polyacrylonitrile (PAN) was used as the matrix polymer compound. In Example 4-3, polyethylene glycol (PEG) was used as the matrix polymer compound. Laminated film type batteries were manufactured in the same manner as in Example 4-1 except for the above-described configurations.

Example 4-4

In Example 4-4, a laminated film type battery was manufactured in the same manner as in Example 1-2.

Example 4-5 and Example 4-6

In Example 4-5 and Example 4-6, the kind of the matrix polymer compound, which constitutes the gel electrolyte

TABLE 3

Electrode Structure: Winding Type, Laminated Film Battery

| | Coating material | | | | | | Evaluation | | |
|---|---|---|---|---|---|---|---|---|---|
| | | Filler | | | | | Thickness of coating material | Thickness of gel electrolyte | |
| | Kind of material | Plane rate [%] | Refractive index | Mass ratio Particle/PVdF | Application target | External appearance | (measured with visible light laser) [μm] | (confirmed with contact type thickness meter) [μm] | Determination of passing or failing in laser measurement |
| Example 3-1 | Boehmite | 75 | 1.7 | 15/85 | Separator | Transparent | 10.0 | 9.6 | Passing |
| Example 3-2 | | | | 20/80 | | Transparent | 10.0 | 9.6 | Passing |
| Example 3-3 | | | | 30/70 | | Transparent | 10.0 | 9.7 | Passing |
| Example 3-4 | | | | 50/50 | | Transparent | 10.0 | 9.8 | Passing |
| Example 3-5 | | | | 70/30 | | Transparent | 10.0 | 10.2 | Passing |
| Example 3-6 | | | | 80/20 | | Transparent | 10.0 | 10.3 | Passing |
| Example 3-7 | | | | 85/15 | | Almost transparent | 10.0 | 10.5 | Passing |
| Example 3-8 | | | | 90/10 | | Close to transparent | 10.0 | 10.9 | Passing |
| Example 3-9 | Talc | 75 | 1.6 | 20/80 | Separator | Transparent | 9.7 | 9.6 | Passing |
| Example 3-10 | | | | 40/60 | | Transparent | 9.7 | 9.7 | Passing |
| Example 3-11 | | | | 50/50 | | Transparent | 9.7 | 9.7 | Passing |
| Example 3-12 | | | | 60/40 | | Transparent | 9.7 | 9.8 | Passing |
| Example 3-13 | | | | 80/20 | | Transparent | 9.7 | 9.9 | Passing |
| Example 3-14 | | | | 85/15 | | Almost transparent | 9.7 | 10.2 | Passing |
| Example 3-15 | | | | 90/10 | | Close to transparent | 9.7 | 10.2 | Passing |

As illustrated in Table 3, in Example 3-1 to Example 3-15, the coating material contained particles which had a plane rate in a predetermined range, and a refractive index in a predetermined range. Accordingly, the coating material was transparent, and the determination of passing or failing in the laser measurement was regarded as "passing". In addition, it layer, was changed. In Example 4-5, polyacrylonitrile (PAN) was used as the matrix polymer compound. In Example 4-6, polyethylene glycol (PEG) was used as the matrix polymer compound. Laminated film type batteries were manufactured in the same manner as in Example 4-4 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 1-1.

Evaluation results are illustrated in Table 4.

TABLE 4

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 4-1 | Boehmite | 75 | 1.7 | PVdF | Separator | Transparent | 10.0 | 9.8 | Passing |
| Example 4-2 | | | | PAN | | Transparent | 10.0 | 9.7 | Passing |
| Example 4-3 | | | | PEG | | Transparent | 10.0 | 9.6 | Passing |
| Example 4-4 | Talc | 75 | 1.6 | PVdF | Separator | Transparent | 9.7 | 9.7 | Passing |
| Example 4-5 | | | | PAN | | Transparent | 9.7 | 9.6 | Passing |
| Example 4-6 | | | | PEG | | Transparent | 9.7 | 9.5 | Passing |

As illustrated in Table 4, in Example 4-1 to Example 4-6, the coating material contained particles which had a plane rate in a predetermined range, and a refractive index in a predetermined range. Accordingly, the coating material was transparent, and the determination of passing or failing in the laser measurement was regarded as "passing".

Example 5-1 and Example 5-2

In Example 5-1 and Example 5-2, simple type battery packs (soft packs) illustrated in FIG. 10, FIG. 11A, and FIG. 11B were manufactured by using the same laminated film type batteries as in Example 1-1 and Example 1-2.

Example 5-3 and Example 5-4

In Example 5-3 and Example 5-4, simple type battery packs (soft packs) illustrated in FIG. 10, FIG. 11A, and FIG. 11B were manufactured by using the same laminated film type batteries as in Example 1-1 and Example 1-2 except that the coating material was applied to only one surface of the separator on a positive electrode side.

Example 5-5 and Example 5-6

In Example 5-5 and Example 5-6, simple type battery packs (soft packs) illustrated in FIG. 10, FIG. 11A, and FIG. 11B were manufactured by using the same laminated film type batteries as in Example 1-1 and Example 1-2 except that the coating material was applied to only one surface of the separator on a negative electrode side.

Comparative Example 5-1

A simple type battery pack (soft pack) illustrated in FIG. 10, FIG. 11A, and FIG. 11B was manufactured in the same manner as in Example 5-1 except that the filler was not contained in the coating material.

Comparative Example 5-2

A simple type battery pack (soft pack) illustrated in FIG. 10, FIG. 11A, and FIG. 11B was manufactured in the same manner as in Example 5-5 except that the filler was not contained in the coating material.

(Evaluation of Battery: 100 kg Pressing Test, and Storage Test at 60° C. for One Month)

With respect to the manufactured soft packs of respective Examples and Comparative Examples, the following 100 kg pressing test and storage test at 60° C. for one month were performed.

[100 kg Pressing Test]

Under an atmosphere of 23° C., each of the soft packs which were manufactured was constant-current charged with a constant current of 1 C until a battery voltage reached 4.2 V, and was constant-voltage charged with a constant voltage of 4.2 V until a total of charging time reached 2.5 hours. Next, the charged soft pack was disposed on two round rods which were arranged in parallel with a gap of 30 mm. One round rod was pressed to the central position of the soft pack from an upper side to apply a load of 100 kg. At this time, a voltage of the soft pack was confirmed with a voltmeter (tester). In a case where a voltage drop by 1% or greater was confirmed, short-circuit was determined as "present", and in a case where a voltage drop by 1% or greater was not confirmed, short-circuit was determined as "not present".

[Storage Test at 60° C. for One Month]

Under an atmosphere of 23° C., each of the soft packs which were manufactured was constant-current charged with a constant current of 1 C until a battery voltage reached 4.35 V, and was constant-voltage charged with a constant voltage of 4.35 V until a total of charging time reached 2.5 hours. Continuously, the soft pack in a charged state was stored for one month in a thermostatic bath that was maintained at 60° C., and it was confirmed whether or not internal short-circuit, which was caused by deterioration of the separator, was present.

Evaluation results are illustrated in Table 5.

and PVdF) became 20% by mass on the basis of the total amount of the coating material.

Next, the coating material was uniformly applied to both surfaces of the positive electrode in a predetermined coating material thickness illustrated in Table 5. At this time, the

TABLE 5

Electrode Structure: Winding Type, Soft Pack

| | Coating material | | | | | Evaluation | | |
|---|---|---|---|---|---|---|---|---|
| | Filler | | | | | | | Storage test |
| | Kind of material | Plane rate [%] | Refractive index | Matrix polymer | Application target | External appearance | 100 kg pressing test | at 60° C. for one month |
| Example 5-1 | Boehmite | 75 | 1.7 | PVdF | Both surfaces of separator | Transparent | Short-circuit was not present | Passing |
| Example 5-2 | Talc | 75 | 1.6 | PVdF | Both surfaces of separator | Transparent | Short-circuit was not present | Passing |
| Example 5-3 | Boehmite | 75 | 1.7 | PVdF | One surface of separator on positive electrode side | Transparent | Short-circuit was not present | Passing |
| Example 5-4 | Talc | 75 | 1.6 | PVdF | One surface of separator on positive electrode side | Transparent | Short-circuit was not present | Passing |
| Example 5-5 | Boehmite | 75 | 1.7 | PVdF | One surface of separator on negative electrode side | Transparent | Short-circuit was not present | Passing |
| Example 5-6 | Talc | 75 | 1.6 | PVdF | One surface of separator on negative electrode side | Transparent | Short-circuit was not present | Passing |
| Comparative Example 5-1 | — | — | — | PVdF | Both surfaces of separator | Transparent | Short-circuit was present | Passing |
| Comparative Example 5-2 | — | — | — | PVdF | One surface of separator on negative electrode side | Transparent | Short-circuit was present | Failing |

As illustrated in Table 5, in Example 5-1 to Example 5-6, results of the pressing test and the storage test were satisfactory. Furthermore, in Example 5-5 and Example 5-6, the separator deteriorated, but the filler on the negative electrode functioned, and thus the result of the storage test was regarded as "passing". On the other hand, in Comparative Example 5-1, the result of the pressing test was bad, and in Comparative Example 5-2, the results of the pressing test and the storage test were bad.

Example 6-1

[Manufacturing of Positive Electrode, and Formation of Particle-Containing Resin Layer]

A positive electrode was manufactured in the same manner as in Example 1-1. In addition, a particle-containing resin layer was formed on both surfaces of the positive electrode as follows.

(Formation of Particle-Containing Resin Layer)

First, boehmite particles (refractive index: 1.7) having an average particle size of 0.8 μm as filler, and polyvinyl fluoride (PVdF) as a matrix polymer compound were dispersed in N-methyl-2-pyrrolidone (NMP) to prepare a coating material (particle-containing resin solution). At this time, the amount of respective materials was adjusted in such a manner that the amount of boehmite contained was set to 5% by mass on the basis of the total amount of the coating material, a mass ratio (boehmite/PVdF) between boehmite and PVdF was set to 50/50, and a solid content (boehmite thickness of a coating material film was measured by the laser thickness meter during application, and in a case where a measured value was different from a predetermined coating material thickness, an ejection amount of the coating material was automatically adjusted so that the measured value approximated to the predetermined coating material thickness.

Then, the positive electrode, on which the coating material was applied, was allowed to pass through a dryer to remove NMP from a particle-containing resin solution layer, thereby forming a particle-containing resin layer, which was constituted by PVdF and boehmite, on both surfaces of the positive electrode.

[Manufacturing Negative Electrode, and Formation of Particle-Containing Reins Layer]

A negative electrode was manufactured in the same manner as in Example 1-1. In addition, a particle-containing resin layer was formed on both surfaces of the negative electrode by the same method as in the positive electrode.

[Manufacturing of Separator]

As the base material, a microporous polyethylene (PE) film having a thickness of 9 μm was used.

[Assembly of Laminated Film Type Battery]

The positive electrode in which the particle-containing resin layer was formed on both surfaces thereof, the negative electrode in which the particle-containing resin layer was formed on both surfaces thereof, and the separator were laminated in the order of the positive electrode, the separator, the negative electrode, and the separator, and the resultant laminated body was wound a plurality of times in a flat shape along a longitudinal direction thereof. Then, a winding end portion was fixed with an adhesive tape, thereby forming a wound electrode body.

Next, the wound electrode body was interposed between parts of an exterior packaging member, and three sides of the exterior packaging member were thermally fused. Furthermore, as the exterior packaging member, a laminated film including a soft aluminum layer was used.

Then, an electrolytic solution was injected into the exterior packaging member, and the remaining one side was thermally fused under a reduced pressure and was hermetically closed. At this time, the particle-containing resin layer was impregnated with the electrolytic solution to swell the matrix polymer compound, thereby forming a gel-like electrolyte (gel electrolyte layer). Furthermore, as the electrolytic solution, an electrolytic solution prepared as follows was used. Lithium hexafluorophosphate (LiPF$_6$) as an electrolyte salt was dissolved in a nonaqueous solvent in which ethylene carbonate (EC) and dimethyl carbonate (DMC) were mixed, thereby preparing the electrolytic solution. At this time, the amount of respective constituent components was adjusted so that a mass ratio (EC/DMC/LiPF$_6$) of the constituent components (EC/DMC/LiPF$_6$) of the electrolytic solution became 35/50/15. In this manner, a laminated film type battery illustrated in FIG. 4, in which a battery shape had a thickness of 4.5 mm, a width of 30 mm, and a height of 50 mm, was manufactured.

Example 6-2 to Example 6-55, and Comparative Example 6-1 to Comparative Example 6-8

In Example 6-2 to Example 6-55, and Comparative Example 6-1 to Comparative Example 6-8, laminated film type batteries were manufactured in the same manner as in Example 6-1 except that the filler that was used was changed as illustrated in Table 6 to be described below.

(Evaluation of Battery: Determination of Passing or Failing in Laser Measurement)

The respective batteries which were manufactured were disassembled, and the thickness of the gel electrolyte layer, in which the matrix polymer compound of the particle-containing resin layer suctioned the electrolytic solution and swelled, was confirmed with a contact type thickness meter. Calculation of the thickness was performed by obtaining a difference between the thickness of an electrode, and the thickness of an electrode including the gel electrolyte layer. In a case where a difference between a measured value of the thickness of the coating material film and a measured value of the thickness of the gel electrolyte layer was in a range of ±10% on the basis of the percentage with respect to the measured value of the thickness of the coating material film, this case was regarded as "passing", and the other cases were regarded as "failing".

Evaluation results are illustrated in Table 6.

TABLE 6

Electrode Structure: Winding Type, Laminated Film Battery

| | Coating material | | | | | Evaluation | | |
| | Filler | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
|---|---|---|---|---|---|---|---|---|---|
| Example 6-1 | Boehmite | 75 | 1.7 | PVdF | Positive and negative electrodes | Transparent | 10.0 | 9.8 | Passing |
| Example 6-2 | Talc | | 1.6 | | | Transparent | 9.7 | 9.5 | Passing |
| Example 6-3 | Zinc oxide | | 2.0 | | | Transparent | 10.9 | 11.0 | Passing |
| Example 6-4 | Tin oxide | | 2.0 | | | Transparent | 11.0 | 11.2 | Passing |
| Example 6-5 | Silicon oxide | | 1.5 | | | Transparent | 9.4 | 9.0 | Passing |
| Example 6-6 | Magnesium oxide | | 1.7 | | | Transparent | 10.2 | 10.1 | Passing |
| Example 6-7 | Antimony oxide | | 2.1 | | | Transparent | 11.3 | 11.6 | Passing |
| Example 6-8 | Aluminum oxide | | 1.8 | | | Transparent | 10.3 | 10.3 | Passing |
| Example 6-9 | Magnesium sulfate | | 1.5 | | | Transparent | 9.6 | 9.3 | Passing |
| Example 6-10 | Calcium sulfate | | 1.6 | | | Transparent | 9.8 | 9.6 | Passing |
| Example 6-11 | Barium sulfate | | 1.6 | | | Transparent | 9.9 | 9.8 | Passing |
| Example 6-12 | Strontium sulfate | | 1.5 | | | Transparent | 9.5 | 9.2 | Passing |
| Example 6-13 | Magnesium carbonate | | 1.5 | | | Transparent | 9.6 | 9.3 | Passing |
| Example 6-14 | Calcium carbonate | | 1.6 | | | Transparent | 9.7 | 9.5 | Passing |
| Example 6-15 | Barium carbonate | | 1.6 | | | Transparent | 9.8 | 9.6 | Passing |
| Example 6-16 | Lithium carbonate | | 1.5 | | | Transparent | 9.5 | 9.2 | Passing |
| Example 6-17 | Magnesium hydroxide | | 1.6 | | | Transparent | 9.7 | 9.5 | Passing |
| Example 6-18 | Aluminum hydroxide | | 1.3 | | | Transparent | 9.0 | 8.5 | Passing |
| Example 6-19 | Zinc hydroxide | | 1.5 | | | Transparent | 9.5 | 9.2 | Passing |
| Example 6-20 | Boron carbide | | 1.5 | | | Transparent | 9.5 | 9.2 | Passing |
| Example 6-21 | Silicon nitride | | 2.0 | | | Transparent | 11.0 | 11.2 | Passing |
| Example 6-22 | Boron nitride | | 2.1 | | | Transparent | 11.4 | 11.7 | Passing |
| Example 6-23 | Aluminum nitride | | 2.1 | | | Transparent | 11.3 | 11.6 | Passing |
| Example 6-24 | Titanium nitride | | 1.3 | | | Transparent | 8.9 | 8.4 | Passing |
| Example 6-25 | Lithium fluoride | | 1.4 | | | Transparent | 9.2 | 8.8 | Passing |
| Example 6-26 | Aluminum fluoride | | 1.3 | | | Transparent | 8.9 | 8.4 | Passing |
| Example 6-27 | Calcium fluoride | | 1.4 | | | Transparent | 9.3 | 8.9 | Passing |
| Example 6-28 | Barium fluoride | | 1.5 | | | Transparent | 9.4 | 9.1 | Passing |
| Example 6-29 | Magnesium fluoride | 75 | 1.4 | PVdF | Positive and negative electrodes | Transparent | 9.1 | 8.7 | Passing |
| Example 6-30 | Trilithium phosphate | | 1.5 | | | Transparent | 9.5 | 9.2 | Passing |
| Example 6-31 | Magnesium phosphate | | 1.5 | | | Transparent | 9.5 | 9.2 | Passing |

TABLE 6-continued

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 6-32 | Magnesium hydrogenphosphate | | 1.5 | | | Transparent | 9.5 | 9.2 | Passing |
| Example 6-33 | Calcium silicate | | 1.6 | | | Transparent | 9.9 | 9.7 | Passing |
| Example 6-34 | Zinc silicate | | 1.6 | | | Transparent | 9.8 | 9.6 | Passing |
| Example 6-35 | Zirconium silicate | | 2.0 | | | Transparent | 11.0 | 11.2 | Passing |
| Example 6-36 | Aluminum silicate | | 1.7 | | | Transparent | 10.0 | 9.8 | Passing |
| Example 6-37 | Magnesium silicate | | 1.6 | | | Transparent | 9.8 | 9.6 | Passing |
| Example 6-38 | Spinel | | 1.7 | | | Transparent | 10.2 | 10.1 | Passing |
| Example 6-39 | Hydrotalcite | | 1.5 | | | Transparent | 9.6 | 9.3 | Passing |
| Example 6-40 | Dolomite | | 1.6 | | | Transparent | 9.8 | 9.6 | Passing |
| Example 6-41 | Kaolinite | | 1.6 | | | Transparent | 9.7 | 9.4 | Passing |
| Example 6-42 | Sepiolite | | 1.5 | | | Transparent | 9.5 | 9.2 | Passing |
| Example 6-43 | Imogolite | | 1.5 | | | Transparent | 9.5 | 9.2 | Passing |
| Example 6-44 | Sericite | | 1.6 | | | Transparent | 9.7 | 9.5 | Passing |
| Example 6-45 | Pyrophyllite | | 1.6 | | | Transparent | 9.7 | 9.5 | Passing |
| Example 6-46 | Mica | | 1.6 | | | Transparent | 9.7 | 9.5 | Passing |
| Example 6-47 | Zeolite | | 1.5 | | | Transparent | 9.4 | 9.1 | Passing |
| Example 6-48 | Mullite | | 1.5 | | | Transparent | 9.5 | 9.2 | Passing |
| Example 6-49 | Saponite | | 1.5 | | | Transparent | 9.5 | 9.2 | Passing |
| Example 6-50 | Attapulgite | | 1.5 | | | Transparent | 9.5 | 9.2 | Passing |
| Example 6-51 | Montmorillonite | | 1.5 | | | Transparent | 9.5 | 9.2 | Passing |
| Example 6-52 | Melamine | 76 | 1.6 | | | Transparent | 9.8 | 9.6 | Passing |
| Example 6-53 | Ammonium polyphosphate | 77 | 1.6 | | | Transparent | 9.8 | 9.6 | Passing |
| Example 6-54 | Melamine cyanurate | 78 | 1.6 | | | Transparent | 9.8 | 9.6 | Passing |
| Example 6-55 | Melamine polyphosphate | 79 | 1.6 | | | Transparent | 9.8 | 9.6 | Passing |
| Comparative Example 6-1 | Zirconium oxide | 75 | 2.4 | PVdF | Positive and negative electrodes | Dark white turbidity | 9.8 | 26.0 | Failing |
| Comparative Example 6-2 | Cerium oxide | | 2.2 | | | Dark white turbidity | 9.8 | 32.0 | Failing |
| Comparative Example 6-3 | Barium titanate | | 2.4 | | | Dark white turbidity | 9.8 | 21.0 | Failing |
| Comparative Example 6-4 | Strontium titanate | | 2.4 | | | Dark white turbidity | 9.8 | 36.0 | Failing |
| Comparative Example 6-5 | Titanium oxide | | 2.6 | | | Dark white turbidity | 9.8 | 41.0 | Failing |
| Comparative Example 6-6 | Diamond | | 2.4 | | | Dark white turbidity | 9.8 | 21.0 | Failing |
| Comparative Example 6-7 | Silicon carbide (colored) | | — | | | Opaque | 9.8 | 31.0 | Failing |
| Comparative Example 6-8 | Iron oxide (colored) | | — | | | Opaque | 9.8 | 38.0 | Failing |
| Comparative Example 6-9 | Silicon (colored) | | — | | | Opaque | 9.8 | 27.0 | Failing |

As illustrated in Table 6, in Example 6-1 to Example 6-55, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 6-1 to Comparative Example 6-8, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 7-1

A laminated film type batter was manufactured in the same manner as in Example 7-1.

Example 7-2 to Example 7-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 7-2, boehmite particles having a plane rate of 45% were used as the filler. In Example 7-3, boehmite particles having a plane rate of 50% were used as the filler.

In Example 7-4, boehmite particles having a plane rate of 60% were used as the filler. In Example 7-5, boehmite particles having a plane rate of 80% were used as the filler. In Example 7-6, boehmite particles having a plane rate of 90% were used as the filler. In Example 7-7, boehmite particles having a plane rate of 100% were used as the filler. Laminated film type batteries were manufactured in the same manner as in Example 7-1 except for the above-described configurations.

Example 7-8

A laminated film type battery was manufactured in the same manner as in Example 1-2.

Example 7-9 to Example 7-14

As the filler, talc particles having a different plane rate were used. In a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane. Specifically, in Example 7-9, talc particles having a plane rate of 45% were used as the filler. In Example 7-10, talc particles having a plane rate of 50% were used as the filler. In Example 7-11, talc particles having a plane rate of 60% were used as the filler. In Example 7-12, talc particles having a plane rate of 80% were used as the filler. In Example 7-13, talc particles having a plane rate of 90% were used as the filler. In Example 7-14, talc particles having a plane rate of 100% were used as the filler. Laminated film type batteries were manufactured in the same manner as in Example 7-8 except for the above-described configurations.

Comparative Example 7-1 to Comparative Example 7-5

Instead of the boehmite particles, aluminum oxide particles having a different plane rate were used as the filler. Specifically, in Comparative Example 7-1, aluminum oxide particles having a plane rate of 40% were used as the filler. In Comparative Example 7-2, aluminum oxide particles having a plane rate of 30% were used as the filler. In Comparative Example 7-3, aluminum oxide particles having a plane rate of 20% were used as the filler. In Comparative Example 7-4, aluminum oxide particles having a plane rate of 10% were used as the filler. In Comparative Example 7-5, aluminum oxide particles (plane rate: 0%) having a spherical shape were used as the filler. Laminated film type batteries were manufactured in the same manner as in Example 7-1 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 1-1.

Evaluation results are illustrated in Table 7.

TABLE 7

| | Electrode Structure: Winding Type, Laminated Film Battery | | | | | | | | |
|---|---|---|---|---|---|---|---|---|---|
| | Coating material | | | | | | Evaluation | | |
| | Filler | | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 7-1 | Boehmite | 75 | 1.7 | PVdF | Positive and negative electrodes | Transparent | 10.0 | 9.8 | Passing |
| Example 7-2 | | 45 | 1.7 | | | Close to transparent | 10.0 | 10.8 | Passing |
| Example 7-3 | | 50 | 1.7 | | | Almost transparent | 10.0 | 10.5 | Passing |
| Example 7-4 | | 60 | 1.7 | | | Transparent | 10.0 | 10.5 | Passing |
| Example 7-5 | | 80 | 1.7 | | | Transparent | 10.0 | 9.7 | Passing |
| Example 7-6 | | 90 | 1.7 | | | Transparent | 10.0 | 9.7 | Passing |
| Example 7-7 | | 100 | 1.6 | | | Transparent | 10.0 | 9.7 | Passing |
| Example 7-8 | Talc | 75 | 1.6 | PVdF | Positive and negative electrodes | Close to transparent | 9.7 | 9.5 | Passing |
| Example 7-9 | | 45 | 1.6 | | | Almost transparent | 9.7 | 10.5 | Passing |
| Example 7-10 | | 50 | 1.6 | | | Transparent | 9.7 | 10.2 | Passing |
| Example 7-11 | | 60 | 1.6 | | | Transparent | 9.7 | 10.2 | Passing |
| Example 7-12 | | 80 | 1.6 | | | Transparent | 9.7 | 9.4 | Passing |
| Example 7-13 | | 90 | 1.6 | | | Transparent | 9.7 | 9.4 | Passing |
| Example 7-14 | | 100 | 1.6 | | | Transparent | 9.7 | 9.4 | Passing |
| Comparative Example 7-1 | Aluminum oxide | 40 | 1.8 | PVdF | Positive and negative electrodes | Translucent | 10 | 43 | Failing |
| Comparative Example 7-2 | | 30 | 1.8 | | | Light white turbidity | 10 | 37 | Failing |
| Comparative Example 7-3 | | 20 | 1.8 | | | White turbidity | 10 | 18 | Failing |
| Comparative | | 10 | 1.8 | | | Dark white | 10 | 19 | Failing |

TABLE 7-continued

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 7-4 Comparative Example 7-5 | | 0 (Spherical body) | 1.8 | | | turbidity Dark white turbidity | 10 | 25 | Failing |

As illustrated in Table 7, in Example 7-1 to Example 7-14, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 7-1 to Comparative Example 7-5, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 8-1 to Example 8-8

In Example 8-1 to Example 8-8, laminated film type batteries were manufactured in the same manner as in Example 1-1 except that the mass ratio between the filler (boehmite particles) and the matrix polymer compound (PVdF) was changed. Specifically, in Example 8-1, the mass ratio (particle/PVdF) was set to 15/85. In Example 8-2, the mass ratio (particle/PVdF) was set to 20/80. In Example 8-3, the mass ratio (particle/PVdF) was set to 30/70. In Example 8-4, the mass ratio (particle/PVdF) was set to 50/50 similar to Example 1-1. In Example 8-5, the mass ratio (particle/PVdF) was set to 70/30. In Example 8-6, the mass ratio (particle/PVdF) was set to 80/20. In Example 8-7, the mass ratio (particle/PVdF) was set to 85/15. In Example 8-8, the mass ratio (particle/PVdF) was set to 90/10.

Example 8-9 to Example 8-15

In Example 8-9 to Example 8-15, laminated film type batteries were manufactured in the same manner as in Example 1-2 except that the mass ratio between the filler (talc particles) and the matrix polymer compound (PVdF) was changed. Specifically, in Example 8-9, the mass ratio (particle/PVdF) was set to 20/80. In Example 8-10, the mass ratio (particle/PVdF) was set to 40/60. In Example 8-11, the mass ratio (particle/PVdF) was set to 50/50 similar to Example 1-2. In Example 8-12, the mass ratio (particle/PVdF) was set to 60/40. In Example 8-13, the mass ratio (particle/PVdF) was set to 80/20. In Example 8-14, the mass ratio (particle/PVdF) was set to 85/15. In Example 8-15, the mass ratio (particle/PVdF) was set to 90/10.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 1-1.

Evaluation results are illustrated in Table 8.

TABLE 8

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Mass ratio Particle/PVdF | Application target | External appearance | (measured with visible light laser) [μm] | (confirmed with contact type thickness meter) [μm] | Determination of passing or failing in laser measurement |
| Example 8-1 | Boehmite | 75 | 1.7 | 15/85 | Positive and negative electrodes | Transparent | 10.0 | 9.6 | Passing |
| Example 8-2 | | | | 20/80 | | Transparent | 10.0 | 9.6 | Passing |
| Example 8-3 | | | | 30/70 | | Transparent | 10.0 | 9.7 | Passing |
| Example 8-4 | | | | 50/50 | | Transparent | 10.0 | 9.8 | Passing |
| Example 8-5 | | | | 70/30 | | Transparent | 10.0 | 10.2 | Passing |
| Example 8-6 | | | | 80/20 | | Transparent | 10.0 | 10.3 | Passing |
| Example 8-7 | | | | 85/15 | | Almost transparent | 10.0 | 10.5 | Passing |
| Example 8-8 | | | | 90/10 | | Close to transparent | 10.0 | 10.9 | Passing |

TABLE 8-continued

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Mass ratio Particle/ PVdF | Application target | External appearance | (measured with visible light laser) [μm] | (confirmed with contact type thickness meter) [μm] | Determination of passing or failing in laser measurement |
| Example 8-9 | Talc | 75 | 1.6 | 20/80 | Positive and | Transparent | 9.7 | 9.6 | Passing |
| Example 8-10 | | | | 40/60 | negative | Transparent | 9.7 | 9.7 | Passing |
| Example 8-11 | | | | 50/50 | electrodes | Transparent | 9.7 | 9.7 | Passing |
| Example 8-12 | | | | 60/40 | | Transparent | 9.7 | 9.8 | Passing |
| Example 8-13 | | | | 80/20 | | Transparent | 9.7 | 9.9 | Passing |
| Example 8-14 | | | | 85/15 | | Almost transparent | 9.7 | 10.2 | Passing |
| Example 8-15 | | | | 90/10 | | Close to transparent | 9.7 | 10.5 | Passing |

As illustrated in Table 8, in Example 8-1 to Example 8-15, the coating material contained particles which had a plane rate in a predetermined range, and a refractive index in a predetermined range. Accordingly, the coating material was transparent, and the determination of passing or failing in the laser measurement was regarded as "passing". In addition, it was confirmed that the degree of transparency could be changed by changing the ratio (mixing ratio) between the filler and the matrix polymer compound.

Example 9-1

In Example 9-1, a laminated film type battery was manufactured in the same manner as in Example 1-1.

Example 9-2 and Example 9-3

In Example 9-2 and Example 9-3, the kind of the matrix polymer compound (resin), which constitutes the gel electrolyte layer, was changed. In Example 9-2, polyacrylonitrile (PAN) was used as the matrix polymer compound. In Example 9-3, polyethylene glycol (PEG) was used as the matrix polymer compound. Laminated film type batteries were manufactured in the same manner as in Example 9-1 except for the above-described configurations.

Example 9-4

In Example 9-4, a laminated film type battery was manufactured in the same manner as in Example 1-2.

Example 9-5 and Example 9-6

In Example 9-5 and Example 9-6, the kind of the matrix polymer compound, which constitutes the gel electrolyte layer, was changed. In Example 9-5, polyacrylonitrile (PAN) was used as the matrix polymer compound. In Example 9-6, polyethylene glycol (PEG) was used as the matrix polymer compound. Laminated film type batteries were manufactured in the same manner as in Example 9-4 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 1-1.

Evaluation results are illustrated in Table 9.

TABLE 9

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Matrix polymer | Application target | External appearance | (measured with visible light laser) [μm] | (confirmed with contact type thickness meter) [μm] | Determination of passing or failing in laser measurement |
| Example 9-1 | Boehmite | 75 | 1.7 | PVdF | Positive and | Transparent | 10.0 | 9.8 | Passing |
| Example 9-2 | | | | PAN | negative | Transparent | 10.0 | 9.7 | Passing |
| Example 9-3 | | | | PEG | electrodes | Transparent | 10.0 | 9.6 | Passing |
| Example 9-4 | Talc | 75 | 1.6 | PVdF | Positive and | Transparent | 9.7 | 9.7 | Passing |
| Example 9-5 | | | | PAN | negative | Transparent | 9.7 | 9.6 | Passing |
| Example 9-6 | | | | PEG | electrodes | Transparent | 9.7 | 9.5 | Passing |

As illustrated in Table 9, in Example 9-1 to Example 9-6, the coating material contained particles which had a plane rate in a predetermined range, and a refractive index in a predetermined range. Accordingly, the coating material was transparent, and the determination of passing or failing in the laser measurement was regarded as "passing".

Example 10-1 and Example 10-2

In Example 10-1 and Example 10-2, simple type battery packs (soft packs) illustrated in FIG. 10, FIG. 11A, and FIG. 11B were manufactured by using the same laminated film type batteries as in Example 6-1 and Example 6-2.

Example 10-3 and Example 10-4

In Example 10-3 and Example 10-4, simple type battery packs (soft packs) illustrated in FIG. 10, FIG. 11A, and FIG. 11B were manufactured by using the same laminated film type batteries as in Example 6-1 and Example 6-2 except that the coating material was applied to only both surfaces of the positive electrode.

Example 10-5 and Example 10-6

In Example 10-5 and Example 10-6, simple type battery packs (soft packs) illustrated in FIG. 10, FIG. 11A, and FIG. 11B were manufactured by using the same laminated film type batteries as in Example 6-1 and Example 6-2 except that the coating material was applied to only both surfaces of the negative electrode.

Comparative Example 10-1

A simple type battery pack (soft pack) illustrated in FIG. 10, FIG. 11A, and FIG. 11B was manufactured in the same manner as in Example 10-1 except that the filler was not contained in the coating material.

Comparative Example 10-2

A simple type battery pack (soft pack) illustrated in FIG. 10, FIG. 11A, and FIG. 11B was manufactured in the same manner as in Example 10-5 except that the filler was not contained in the coating material.

(Evaluation of Battery: 100 kg Pressing Test, and Storage Test at 60° C. for One Month)

With respect to the manufactured soft packs of respective Examples and Comparative Examples, the following 100 kg pressing test and storage test at 60° C. for one month were performed in the same manner as in Example 5-1.

Evaluation results are illustrated in Table 10.

TABLE 10

Electrode Structure: Winding Type, Soft Pack

| | Coating material | | | | | Evaluation | | |
|---|---|---|---|---|---|---|---|---|
| | Filler | | | | | | | Storage test |
| | Kind of material | Plane rate [%] | Refractive index | Matrix polymer | Application target | External appearance | 100 kg pressing test | at 60° C. for one month |
| Example 10-1 | Boehmite | 75 | 1.7 | PVdF | Positive and negative electrodes | Transparent | Short-circuit was not present | Passing |
| Example 10-2 | Talc | 75 | 1.6 | PVdF | Positive and negative electrodes | Transparent | Short-circuit was not present | Passing |
| Example 10-3 | Boehmite | 75 | 1.7 | PVdF | Only positive electrode | Transparent | Short-circuit was not present | Passing |
| Example 10-4 | Talc | 75 | 1.6 | PVdF | Only positive electrode | Transparent | Short-circuit was not present | Passing |
| Example 10-5 | Boehmite | 75 | 1.7 | PVdF | Only negative electrode | Transparent | Short-circuit was not present | Passing |
| Example 10-6 | Talc | 75 | 1.6 | PVdF | Only negative electrode | Transparent | Short-circuit was not present | Passing |
| Comparative Example 10-1 | — | — | — | PVdF | Positive and negative electrodes | Transparent | Short-circuit was present | Passing |
| Comparative Example 10-2 | — | — | — | PVdF | Only negative electrode | Transparent | Short-circuit was present | Failing |

As illustrated in Table 10, in Example 10-1 to Example 10-6, results of the pressing test and the storage test were satisfactory. Furthermore, in Example 10-5 and Example 10-6, the separator deteriorated, but the filler on the negative electrode functioned, and thus the result of the storage test was regarded as "passing". On the other hand, in Comparative Example 10-1, the result of the pressing test was bad, and in Comparative Example 10-2, the results of the pressing test and the storage test were bad.

Example 11-1

[Manufacturing of Positive Electrode, and Manufacturing of Negative Electrode]

The positive electrode and the negative electrodes were manufactured in the same manner as in Example 1-1

[Manufacturing of Separator]

As the base material, a microporous polyethylene (PE) film having a thickness of 9 μm was used. A coating material was applied to both surfaces of the base material in the following manner to form a particle-containing resin solution layer (coating material film), and the particle-containing resin solution layer was dried to form a particle-containing resin layer.

First, boehmite particles (refractive index: 1.7) having an average particle size of 0.8 μm as filler, and polyvinyl fluoride (PVdF) as a binder polymer compound were dispersed in N-methyl-2-pyrrolidone (NMP) to prepare a coating material (particle-containing resin solution). At this time, the amount of respective materials was adjusted in such a manner that the amount of boehmite contained was set to 5% by mass on the basis of the total amount of the coating material, a mass ratio (boehmite/PVdF) between boehmite and PVdF was set to 50/50, and a solid content (boehmite and PVdF) became 20% by mass on the basis of the total amount of the coating material.

Next, the coating material was uniformly applied to both surfaces of the base material in a predetermined coating material thickness illustrated in Table 11. At this time, the thickness of a coating material film was measured by a laser thickness meter during application, and in a case where a measured value was different from a predetermined coating material thickness, an ejection amount of the coating material was automatically adjusted so that the measured value approximated to the predetermined coating material thickness.

Then, the base material, on which the coating material was applied, was allowed to pass through a dryer to remove NMP from a particle-containing resin solution layer, thereby preparing a separator including the base material, and the particle-containing resin layer that was formed on both surfaces of the base material and was constituted by PVdF and the boehmite.

[Assembly of Laminated Film Type Battery]

The positive electrode, the negative electrode, and the separator in which the particle-containing resin layer was formed on both surfaces thereof were sequentially laminated in the order of the positive electrode, the separator, the negative electrode, and the separator, and the resultant laminated body was wound a plurality of times in a flat shape along a longitudinal direction thereof. Then, a winding end portion was fixed with an adhesive tape, thereby forming a wound electrode body.

Next, the wound electrode body was interposed between parts of an exterior packaging member, and three sides of the exterior packaging member were thermally fused. Furthermore, as the exterior packaging member, a laminated film including a soft aluminum layer was used.

Then, an electrolytic solution was injected into the exterior packaging member, and the remaining one side was thermally fused under a reduced pressure and was hermetically closed. Furthermore, as the electrolytic solution, an electrolytic solution prepared as follows was used. Lithium hexafluorophosphate ($LiPF_6$) as an electrolyte salt was dissolved in a nonaqueous solvent in which ethylene carbonate (EC) and dimethyl carbonate (DMC) were mixed, thereby preparing the electrolytic solution. At this time, the amount of respective constituent components was adjusted so that a mass ratio (EC/DMC/$LiPF_6$) of the constituent components (EC/DMC/$LiPF_6$) of the electrolytic solution became 35/50/15. In this manner, a laminated film type battery, in which a battery shape had a thickness of 4.5 mm, a width of 30 mm, and a height of 50 mm, was manufactured.

Example 11-2 to Example 11-55, and Comparative Example 11-1 to Comparative Example 11-8

In Example 11-2 to Example 11-55, and Comparative Example 11-1 to Comparative Example 11-8, laminated film type batteries were manufactured in the same manner as in Example 11-1 except that the filler that was used was changed as illustrated in Table 11 to be described below.

(Evaluation of Battery: Determination of Passing or Failing in Laser Measurement)

The respective batteries which were manufactured were disassembled, and the thickness of the particle-containing resin layer that contained the electrolytic solution was confirmed with a contact type thickness meter. Calculation of the thickness was performed from a difference between the thickness of the polyethylene separator (base material) and the thickness of the separator including the particle-containing resin layer that contained the electrolytic solution. In a case where a difference between a measured value of the thickness of the coating material film and a measured value of the thickness of the particle-containing resin layer that contained the electrolytic solution was in a range of ±10% on the basis of the percentage with respect to the measured value of the thickness of the coating material film, this case was regarded as "passing", and the other cases were regarded as "failing".

Evaluation results are illustrated in Table 11.

TABLE 11

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |
| Example 11-1 | Boehmite | 75 | 1.7 | PVdF | Separator | Transparent | 10.0 | 9.8 | Passing |
| Example 11-2 | Talc | | 1.6 | | | Transparent | 9.7 | 9.5 | Passing |
| Example 11-3 | Zinc oxide | | 2.0 | | | Transparent | 10.9 | 11.0 | Passing |
| Example 11-4 | Tin oxide | | 2.0 | | | Transparent | 11.0 | 11.2 | Passing |
| Example 11-5 | Silicon oxide | | 1.5 | | | Transparent | 9.4 | 9.0 | Passing |
| Example 11-6 | Magnesium oxide | | 1.7 | | | Transparent | 10.2 | 10.1 | Passing |
| Example 11-7 | Antimony oxide | | 2.1 | | | Transparent | 11.3 | 11.6 | Passing |

TABLE 11-continued

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte (confirmed with | Determination |
| | Kind of material | Plane rate [%] | Refractive index | Binder polymer | Application target | External appearance | (measured with visible light laser) [μm] | contact type thickness meter) [μm] | of passing or failing in laser measurement |
| Example 11-8 | Aluminum oxide | | 1.8 | | | Transparent | 10.3 | 10.3 | Passing |
| Example 11-9 | Magnesium sulfate | | 1.5 | | | Transparent | 9.6 | 9.3 | Passing |
| Example 11-10 | Calcium sulfate | | 1.6 | | | Transparent | 9.8 | 9.6 | Passing |
| Example 11-11 | Barium sulfate | | 1.6 | | | Transparent | 9.9 | 9.8 | Passing |
| Example 11-12 | Strontium sulfate | | 1.5 | | | Transparent | 9.5 | 9.2 | Passing |
| Example 11-13 | Magnesium carbonate | | 1.5 | | | Transparent | 9.6 | 9.3 | Passing |
| Example 11-14 | Calcium carbonate | | 1.6 | | | Transparent | 9.7 | 9.5 | Passing |
| Example 11-15 | Barium carbonate | | 1.6 | | | Transparent | 9.8 | 9.6 | Passing |
| Example 11-16 | Lithium carbonate | | 1.5 | | | Transparent | 9.5 | 9.2 | Passing |
| Example 11-17 | Magnesium hydroxide | | 1.6 | | | Transparent | 9.7 | 9.5 | Passing |
| Example 11-18 | Aluminum hydroxide | | 1.3 | | | Transparent | 9.0 | 8.5 | Passing |
| Example 11-19 | Zinc hydroxide | | 1.5 | | | Transparent | 9.5 | 9.2 | Passing |
| Example 11-20 | Boron carbide | | 1.5 | | | Transparent | 9.5 | 9.2 | Passing |
| Example 11-21 | Silicon nitride | | 2.0 | | | Transparent | 11.0 | 11.2 | Passing |
| Example 11-22 | Boron nitride | | 2.1 | | | Transparent | 11.4 | 11.7 | Passing |
| Example 11-23 | Aluminum nitride | | 2.1 | | | Transparent | 11.3 | 11.6 | Passing |
| Example 11-24 | Titanium nitride | | 1.3 | | | Transparent | 8.9 | 8.4 | Passing |
| Example 11-25 | Lithium fluoride | | 1.4 | | | Transparent | 9.2 | 8.8 | Passing |
| Example 11-26 | Aluminum fluoride | | 1.3 | | | Transparent | 8.9 | 8.4 | Passing |
| Example 11-27 | Calcium fluoride | | 1.4 | | | Transparent | 9.3 | 8.9 | Passing |
| Example 11-28 | Barium fluoride | | 1.5 | | | Transparent | 9.4 | 9.1 | Passing |
| Example 11-29 | Magnesium fluoride | 75 | 1.4 | PVdF | Separator | Transparent | 9.1 | 8.7 | Passing |
| Example 11-30 | Trilithium phosphate | | 1.5 | | | Transparent | 9.5 | 9.2 | Passing |
| Example 11-31 | Magnesium phosphate | | 1.5 | | | Transparent | 9.5 | 9.2 | Passing |
| Example 11-32 | Magnesium hydrogenphosphate | | 1.5 | | | Transparent | 9.5 | 9.2 | Passing |
| Example 11-33 | Calcium silicate | | 1.6 | | | Transparent | 9.9 | 9.7 | Passing |
| Example 11-34 | Zinc silicate | | 1.6 | | | Transparent | 9.8 | 9.6 | Passing |
| Example 11-35 | Zirconium silicate | | 2.0 | | | Transparent | 11.0 | 11.2 | Passing |
| Example 11-36 | Aluminum silicate | | 1.7 | | | Transparent | 10.0 | 9.8 | Passing |
| Example 11-37 | Magnesium silicate | | 1.6 | | | Transparent | 9.8 | 9.6 | Passing |
| Example 11-38 | Spinel | | 1.7 | | | Transparent | 10.2 | 10.1 | Passing |
| Example 11-39 | Hydrotalcite | | 1.5 | | | Transparent | 9.6 | 9.3 | Passing |
| Example 11-40 | Dolomite | | 1.6 | | | Transparent | 9.8 | 9.6 | Passing |
| Example 11-41 | Kaolinite | | 1.6 | | | Transparent | 9.7 | 9.4 | Passing |
| Example 11-42 | Sepiolite | | 1.5 | | | Transparent | 9.5 | 9.2 | Passing |
| Example 11-43 | Imogolite | | 1.5 | | | Transparent | 9.5 | 9.2 | Passing |
| Example 11-44 | Sericite | | 1.6 | | | Transparent | 9.7 | 9.5 | Passing |
| Example 11-45 | Pyrophyllite | | 1.6 | | | Transparent | 9.7 | 9.5 | Passing |
| Example 11-46 | Mica | | 1.6 | | | Transparent | 9.7 | 9.5 | Passing |
| Example 11-47 | Zeolite | | 1.5 | | | Transparent | 9.4 | 9.1 | Passing |
| Example 11-48 | Mullite | | 1.5 | | | Transparent | 9.5 | 9.2 | Passing |
| Example 11-49 | Saponite | | 1.5 | | | Transparent | 9.5 | 9.2 | Passing |
| Example 11-50 | Attapulgite | | 1.5 | | | Transparent | 9.5 | 9.2 | Passing |
| Example 11-51 | Montmorillonite | | 1.5 | | | Transparent | 9.5 | 9.2 | Passing |
| Example 11-52 | Melamine | 76 | 1.6 | | | Transparent | 9.8 | 9.6 | Passing |
| Example 11-53 | Ammonium polyphosphate | 77 | 1.6 | | | Transparent | 9.8 | 9.6 | Passing |
| Example 11-54 | Melamine cyanurate | 78 | 1.6 | | | Transparent | 9.8 | 9.6 | Passing |
| Example 11-55 | Melamine polyphosphate | 79 | 1.6 | | | Transparent | 9.8 | 9.6 | Passing |
| Comparative Example 11-1 | Zirconium oxide | 75 | 2.4 | PVdF | Separator | Dark white turbidity | 9.8 | 26.0 | Failing |
| Comparative Example 11-2 | Cerium oxide | | 2.2 | | | Dark white turbidity | 9.8 | 16.0 | Failing |
| Comparative Example 11-3 | Barium titanate | | 2.4 | | | Dark white turbidity | 9.8 | 21.0 | Failing |
| Comparative Example 11-4 | Strontium titanate | | 2.4 | | | Dark white turbidity | 9.8 | 36.0 | Failing |
| Comparative Example 11-5 | Titanium oxide | | 2.6 | | | Dark white turbidity | 9.8 | 41.0 | Failing |
| Comparative Example 11-6 | Diamond | | 2.4 | | | Dark white turbidity | 9.8 | 21.0 | Failing |
| Comparative Example 11-7 | Silicon carbide (colored) | | — | | | Opaque | 9.8 | 31.0 | Failing |

TABLE 11-continued

Electrode Structure: Winding Type, Laminated Film Battery

| | Coating material | | | | | Evaluation | | |
| --- | --- | --- | --- | --- | --- | --- | --- | --- |
| | Filler | | | | | Thickness of coating material | Thickness of gel electrolyte (confirmed with | Determination |
| Kind of material | Plane rate [%] | Refractive index | Binder polymer | Application target | External appearance | (measured with visible light laser) [μm] | contact type thickness meter) [μm] | of passing or failing in laser measurement |
| Comparative Example 11-8 | Iron oxide (colored) | — | | | | Opaque | 9.8 | 38.0 | Failing |
| Comparative Example 11-9 | Silicon (colored) | — | | | | Opaque | 9.8 | 19.0 | Failing |

As illustrated in Table 11, in Example 11-1 to Example 11-55, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 11-1 to Comparative Example 11-8, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 12-1

A laminated film type battery was manufactured in the same manner as in Example 11-1.

Example 12-2 to Example 12-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 12-2, boehmite particles having a plane rate of 45% were used as the filler. In Example 12-3, boehmite particles having a plane rate of 50% were used as the filler. In Example 12-4, boehmite particles having a plane rate of 60% were used as the filler. In Example 12-5, boehmite particles having a plane rate of 80% were used as the filler. In Example 12-6, boehmite particles having a plane rate of 90% were used as the filler. In Example 12-7, boehmite particles having a plane rate of 100% were used as the filler. Laminated film type batteries were manufactured in the same manner as in Example 12-1 except for the above-described configurations.

Example 12-8

A laminated film type battery was manufactured in the same manner as in Example 11-2.

Example 12-9 to Example 12-14

As the filler, talc particles having a different plane rate were used. Furthermore, in a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane. Specifically, in Example 12-9, talc particles having a plane rate of 45% were used as the filler. In Example 12-10, talc particles having a plane rate of 50% were used as the filler. In Example 12-11, talc particles having a plane rate of 60% were used as the filler. In Example 12-12, talc particles having a plane rate of 80% were used as the filler. In Example 12-13, talc particles having a plane rate of 90% were used as the filler. In Example 12-14, talc particles having a plane rate of 100% were used as the filler. Laminated film type batteries were manufactured in the same manner as in Example 12-8 except for the above-described configurations.

Comparative Example 12-1 to Comparative Example 12-5

Instead of the boehmite particles, aluminum oxide particles having a different plane rate were used as the filler. Specifically, in Comparative Example 12-1, aluminum oxide particles having a plane rate of 40% were used as the filler. In Comparative Example 12-2, aluminum oxide particles having a plane rate of 30% were used as the filler. In Comparative Example 12-3, aluminum oxide particles having a plane rate of 20% were used as the filler. In Comparative Example 12-4, aluminum oxide particles having a plane rate of 10% were used as the filler. In Comparative Example 12-5, aluminum oxide particles (plane rate: 0%) having a spherical shape were used as the filler. Laminated film type batteries were manufactured in the same manner as in Example 12-1 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 11-1.

Evaluation results are illustrated in Table 12.

TABLE 12

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |
| Example 12-1 | Boehmite | 75 | 1.7 | PVdF | Separator | Transparent | 10.0 | 9.8 | Passing |
| Example 12-2 | | 45 | 1.7 | | | Close to transparent | 10.0 | 10.8 | Passing |
| Example 12-3 | | 50 | 1.7 | | | Almost transparent | 10.0 | 10.5 | Passing |
| Example 12-4 | | 60 | 1.7 | | | Transparent | 10.0 | 10.5 | Passing |
| Example 12-5 | | 80 | 1.7 | | | Transparent | 10.0 | 9.7 | Passing |
| Example 12-6 | | 90 | 1.7 | | | Transparent | 10.0 | 9.7 | Passing |
| Example 12-7 | | 100 | 1.7 | | | Transparent | 10.0 | 9.7 | Passing |
| Example 12-8 | Talc | 75 | 1.6 | PVdF | Separator | Transparent | 9.7 | 9.5 | Passing |
| Example 12-9 | | 45 | 1.6 | | | Close to transparent | 9.7 | 10.5 | Passing |
| Example 12-10 | | 50 | 1.6 | | | Almost transparent | 9.7 | 10.2 | Passing |
| Example 12-11 | | 60 | 1.6 | | | Transparent | 9.7 | 10.2 | Passing |
| Example 12-12 | | 80 | 1.6 | | | Transparent | 9.7 | 9.4 | Passing |
| Example 12-13 | | 90 | 1.6 | | | Transparent | 9.7 | 9.4 | Passing |
| Example 12-14 | | 100 | 1.6 | | | Transparent | 9.7 | 9.4 | Passing |
| Comparative Example 12-1 | Aluminum oxide | 40 | 1.8 | PVdF | Separator | Translucent | 10 | 25 | Failing |
| Comparative Example 12-2 | | 30 | 1.8 | | | Light white turbidity | 10 | 30 | Failing |
| Comparative Example 12-3 | | 20 | 1.8 | | | White turbidity | 10 | 41 | Failing |
| Comparative Example 12-4 | | 10 | 1.8 | | | Dark white turbidity | 10 | 20 | Failing |
| Comparative Example 12-5 | | 0 (Spherical body) | 1.8 | | | Dark white turbidity | 10 | 39 | Failing |

As illustrated in Table 12, in Example 12-1 to Example 12-14, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 12-1 to Comparative Example 12-14, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 13-1 to Example 13-8

In Example 13-1 to Example 13-8, laminated film type batteries were manufactured in the same manner as in Example 11-1 except that the mass ratio between the filler (boehmite particles) and the binder polymer compound (PVdF) was changed. Specifically, in Example 13-1, the mass ratio (particle/PVdF) was set to 15/85. In Example 13-2, the mass ratio (particle/PVdF) was set to 20/80. In Example 13-3, the mass ratio (particle/PVdF) was set to 30/70. In Example 13-4, the mass ratio (particle/PVdF) was set to 50/50 similar to Example 11-1. In Example 13-5, the mass ratio (particle/PVdF) was set to 70/30. In Example 13-6, the mass ratio (particle/PVdF) was set to 80/20. In Example 13-7, the mass ratio (particle/PVdF) was set to 85/15. In Example 13-8, the mass ratio (particle/PVdF) was set to 90/10.

Example 13-9 to Example 13-15

In Example 13-9 to Example 13-15, laminated film type batteries were manufactured in the same manner as in Example 11-2 except that the mass ratio between the filler (talc particles) and the binder polymer compound (PVdF) was changed. Specifically, in Example 13-9, the mass ratio (particle/PVdF) was set to 20/80. In Example 13-10, the mass ratio (particle/PVdF) was set to 40/60. In Example 13-11, the mass ratio (particle/PVdF) was set to 50/50 similar to Example 11-2. In Example 13-12, the mass ratio (particle/PVdF) was set to 60/40. In Example 13-13, the mass ratio (particle/PVdF) was set to 80/20. In Example 13-14, the mass ratio (particle/PVdF) was set to 85/15. In Example 13-15, the mass ratio (particle/PVdF) was set to 90/10.

(Evaluation of Battery: Determination of Passing or Failing in Laser Measurement)
lp;1p With respect to the manufactured laminated film type batteries of respective Examples and Comparative Examples, the determination of passing or failing in the laser measurement was performed in the same manner as in Example 11-1.

Evaluation results are illustrated in Table 13.

was used as the binder polymer compound. Laminated film type batteries were manufactured in the same manner as in Example 14-1 except for the above-described configurations.

Example 14-4

In Example 14-4, a laminated film type battery was manufactured in the same manner as in Example 11-2.

TABLE 13

Electrode Structure: Winding Type, Laminated Film Battery

| | Coating material | | | | | | Evaluation | | |
|---|---|---|---|---|---|---|---|---|---|
| | Filler | | | | | | Thickness of coating material | Thickness of gel electrolyte | |
| | Kind of material | Plane rate [%] | Refractive index | Mass ratio Particle/ PVdF | Application target | External appearance | (measured with visible light laser) [μm] | (confirmed with contact type thickness meter) [μm] | Determination of passing or failing in laser measurement |
| Example 13-1 | Boehmite | 75 | 1.7 | 15/85 | Separator | Transparent | 10.0 | 9.6 | Passing |
| Example 13-2 | | | | 20/80 | | Transparent | 10.0 | 9.6 | Passing |
| Example 13-3 | | | | 30/70 | | Transparent | 10.0 | 9.7 | Passing |
| Example 13-4 | | | | 50/50 | | Transparent | 10.0 | 9.8 | Passing |
| Example 13-5 | | | | 70/30 | | Transparent | 10.0 | 10.2 | Passing |
| Example 13-6 | | | | 80/20 | | Transparent | 10.0 | 10.3 | Passing |
| Example 13-7 | | | | 85/15 | | Almost transparent | 10.0 | 10.5 | Passing |
| Example 13-8 | | | | 90/10 | | Close to transparent | 10.0 | 10.9 | Passing |
| Example 13-9 | Talc | 75 | 1.6 | 20/80 | Separator | Transparent | 9.7 | 9.6 | Passing |
| Example 13-10 | | | | 40/60 | | Transparent | 9.7 | 9.7 | Passing |
| Example 13-11 | | | | 50/50 | | Transparent | 9.7 | 9.7 | Passing |
| Example 13-12 | | | | 60/40 | | Transparent | 9.7 | 9.8 | Passing |
| Example 13-13 | | | | 80/20 | | Transparent | 9.7 | 9.9 | Passing |
| Example 13-14 | | | | 85/15 | | Almost transparent | 9.7 | 10.2 | Passing |
| Example 13-15 | | | | 90/10 | | Close to transparent | 9.7 | 10.2 | Passing |

As illustrated in Table 13, in Example 13-1 to Example 13-15, the coating material contained particles which had a plane rate in a predetermined range, and a refractive index in a predetermined range. Accordingly, the coating material was transparent, and the determination of passing or failing in the laser measurement was regarded as "passing". In addition, it was confirmed that the degree of transparency could be changed by changing the ratio (mixing ratio) between the filler and the binder polymer compound.

Example 14-1

In Example 14-1, a laminated film type battery was manufactured in the same manner as in Example 11-1.

Example 14-2 and Example 14-3

In Example 14-2 and Example 14-3, the kind of the binder polymer compound (resin) was changed. In Example 14-2, polyacrylonitrile (PAN) was used as the binder polymer compound. In Example 14-3, polyethylene glycol (PEG)

Example 14-5 and Example 14-6

In Example 14-5 and Example 14-6, the kind of the binder polymer compound, which constitutes the gel electrolyte layer, was changed. In Example 14-5, polyacrylonitrile (PAN) was used as the binder polymer compound. In Example 14-6, polyethylene glycol (PEG) was used as the binder polymer compound. Laminated film type batteries were manufactured in the same manner as in Example 14-4 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 11-1.

Evaluation results are illustrated in Table 14.

11B were manufactured by using the same laminated film type batteries as in Example 11-1 and Example 11-2 except that the coating material was applied to only one surface of the separator on a negative electrode side.

TABLE 14

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |

| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |
|---|---|---|---|---|---|---|---|---|---|
| Example 14-1 | Boehmite | 75 | 1.7 | PVdF | Separator | Transparent | 10.0 | 9.8 | Passing |
| Example 14-2 | | | | PAN | | Transparent | 10.0 | 9.7 | Passing |
| Example 14-3 | | | | PEG | | Transparent | 10.0 | 9.6 | Passing |
| Example 14-4 | Talc | 75 | 1.6 | PVdF | Separator | Transparent | 9.7 | 9.7 | Passing |
| Example 14-5 | | | | PAN | | Transparent | 9.7 | 9.6 | Passing |
| Example 14-6 | | | | PEG | | Transparent | 9.7 | 9.5 | Passing |

As illustrated in Table 14, in Example 14-1 to Example 14-6, the coating material contained particles which had a plane rate in a predetermined range, and a refractive index in a predetermined range. Accordingly, the coating material was transparent, and the determination of passing or failing in the laser measurement was regarded as "passing".

Example 15-1 and Example 15-2

In Example 15-1 and Example 15-2, simple type battery packs (soft packs) illustrated in FIG. 10, FIG. 11A, and FIG. 11B were manufactured by using the same laminated film type batteries as in Example 11-1 and Example 11-2.

Example 15-3 and Example 15-4

In Example 15-3 and Example 15-4, simple type battery packs (soft packs) illustrated in FIG. 10, FIG. 11A, and FIG. 11B were manufactured by using the same laminated film type batteries as in Example 11-1 and Example 11-2 except that the coating material was applied to only one surface of the separator on a positive electrode side.

Example 15-5 and Example 15-6

In Example 15-5 and Example 15-6, simple type battery packs (soft packs) illustrated in FIG. 10, FIG. 11A, and FIG.

Comparative Example 15-1

A simple type battery pack (soft pack) illustrated in FIG. 10, FIG. 11A, and FIG. 11B was manufactured in the same manner as in Example 15-1 except that the filler was not contained in the coating material.

Comparative Example 15-2

A simple type battery pack (soft pack) illustrated in FIG. 10, FIG. 11A, and FIG. 11B was manufactured in the same manner as in Example 15-5 except that the filler was not contained in the coating material.

(Evaluation of Battery: 100 kg Pressing Test, and Storage Test at 60° C. for One Month)

With respect to the manufactured soft packs of respective Examples and Comparative Examples, the following 100 kg pressing test and storage test at 60° C. for one month were performed in the same manner as in Example 5-1.

Evaluation results are illustrated in Table 15.

TABLE 15

Electrode Structure: Winding Type, Soft Pack

| | Coating material | | | | | | Evaluation | |
|---|---|---|---|---|---|---|---|---|
| | Filler | | | | | | | Storage test |
| | Kind of material | Plane rate [%] | Refractive index | Binder polymer | Application target | External appearance | 100 kg pressing test | at 60° C. for one month |
| Example 15-1 | Boehmite | 75 | 1.7 | PVdF | Both surfaces of separator | Transparent | Short-circuit was not present | Passing |
| Example 15-2 | Talc | 75 | 1.6 | PVdF | Both surfaces of separator | Transparent | Short-circuit was not present | Passing |
| Example 15-3 | Boehmite | 75 | 1.7 | PVdF | One surface of separator | Transparent | Short-circuit was not present | Passing |

TABLE 15-continued

Electrode Structure: Winding Type, Soft Pack

| | Coating material | | | | | Evaluation | | |
|---|---|---|---|---|---|---|---|---|
| | Filler | | | | | | | Storage test |
| | Kind of material | Plane rate [%] | Refractive index | Binder polymer | Application target | External appearance | 100 kg pressing test | at 60° C. for one month |
| Example 15-4 | Talc | 75 | 1.6 | PVdF | One surface of separator on positive electrode side | Transparent | Short-circuit was not present | Passing |
| Example 15-5 | Boehmite | 75 | 1.7 | PVdF | One surface of separator on negative electrode side | Transparent | Short-circuit was not present | Passing |
| Example 15-6 | Talc | 75 | 1.6 | PVdF | One surface of separator on negative electrode side | Transparent | Short-circuit was not present | Passing |
| Comparative Example 15-1 | — | — | — | PVdF | Both surfaces of separator | Transparent | Short-circuit was present | Passing |
| Comparative Example 15-2 | — | — | — | PVdF | Both surfaces of separator | Transparent | Short-circuit was present | Failing |

As illustrated in Table 15, in Example 15-1 to Example 15-6, results of the pressing test and the storage test were satisfactory. Furthermore, in Example 15-5 and Example 15-6, the separator deteriorated, but the filler on the negative electrode functioned, and thus the result of the storage test was regarded as "passing". On the other hand, in Comparative Example 15-1, the result of the pressing test was bad, and in Comparative Example 15-2, the results of the pressing test and the storage test were bad.

Example 16-1

[Manufacturing of Positive Electrode, and Formation of Particle-Containing Resin Layer]

A positive electrode was manufactured in the same manner as in Example 11-1. In addition, a particle-containing resin layer was formed on both surfaces of the positive electrode as follows.

(Formation of Particle-Containing Resin Layer)

First, boehmite particles (refractive index: 1.7) having an average particle size of 0.8 μm as filler, and polyvinyl fluoride (PVdF) as a binder polymer compound were dispersed in N-methyl-2-pyrrolidone (NMP) to prepare a coating material (particle-containing resin solution). At this time, the amount of respective materials was adjusted in such a manner that the amount of boehmite contained was set to 5% by mass on the basis of the total amount of the coating material, a mass ratio (boehmite/PVdF) between boehmite and PVdF was set to 50/50, and a solid content (boehmite and PVdF) became 20% by mass on the basis of the total amount of the coating material.

Next, the coating material was uniformly applied to both surfaces of the positive electrode in a predetermined coating material thickness illustrated in Table 16. Next, the coating material was uniformly applied to both surfaces of the base material in a predetermined coating material thickness illustrated in Table 16. At this time, the thickness of a coating material film was measured by the laser thickness meter during application, and in a case where a measured value was different from a predetermined coating material thickness, an ejection amount of the coating material was automatically adjusted so that the measured value approximated to the predetermined coating material thickness.

Then, the positive electrode, on which the coating material was applied, was allowed to pass through a dryer to remove NMP from a particle-containing resin solution layer, thereby forming a particle-containing resin layer, which was constituted by PVdF and boehmite, on both surfaces of the positive electrode.

[Manufacturing Negative Electrode, and Formation of Particle-Containing Reins Layer]

A negative electrode was manufactured in the same manner as in Example 11-1. In addition, a particle-containing resin layer was formed on both surfaces of the negative electrode by the same method as in the positive electrode.

[Manufacturing of Separator]

As the base material, a microporous polyethylene (PE) film having a thickness of 9 μm was used.

[Assembly of Laminated Film Type Battery]

The positive electrode in which the particle-containing resin layer was formed on both surfaces thereof, the negative electrode in which the particle-containing resin layer was formed on both surfaces thereof, and the separator were laminated in the order of the positive electrode, the separator, the negative electrode, and the separator, and the resultant laminated body was wound a plurality of times in a flat shape along a longitudinal direction thereof. Then, a winding end portion was fixed with an adhesive tape, thereby forming a wound electrode body.

Next, the wound electrode body was interposed between parts of an exterior packaging member, and three sides of the exterior packaging member were thermally fused. Furthermore, as the exterior packaging member, a laminated film including a soft aluminum layer was used.

Then, an electrolytic solution was injected into the exterior packaging member, and the remaining one side was thermally fused under a reduced pressure and was hermetically closed. Furthermore, as the electrolytic solution, an electrolytic solution prepared as follows was used. Lithium hexafluorophosphate (LiPF$_6$) as an electrolyte salt was dissolved in a nonaqueous solvent in which ethylene carbonate (EC) and dimethyl carbonate (DMC) were mixed, thereby preparing the electrolytic solution. At this time, the amount of respective constituent components was adjusted so that a mass ratio (EC/DMC/LiPF$_6$) of the constituent components (EC/DMC/LiPF$_6$) of the electrolytic solution became 35/50/15. In this manner, a laminated film type battery, in which a battery shape had a thickness of 4.5 mm, a width of 30 mm, and a height of 50 mm, was manufactured.

Example 16-2 to Example 16-55, and Comparative Example 16-1 to Comparative Example 16-8

In Example 16-2 to Example 16-55, and Comparative Example 16-1 to Comparative Example 16-8, laminated film type batteries were manufactured in the same manner as in Example 16-1 except that the filler that was used was changed as illustrated in Table 16 to be described below.

(Evaluation of Battery: Determination of Passing or Failing in Laser Measurement)

The respective batteries which were manufactured were disassembled, and the thickness of the particle-containing resin layer, which contained the electrolytic solution, was confirmed with a contact type thickness meter. Calculation of the thickness was performed from a difference between the thickness of an electrode, and the thickness of an electrode including the particle-containing resin layer that contained the electrolytic solution. In a case where the difference between a measured value of the thickness of the coating material film and a measured value of the thickness of the particle-containing resin layer that contained the electrolytic solution was in a range of ±10% on the basis of the percentage with respect to the measured value of the thickness of the coating material film, this case was regarded as "passing", and the other cases were regarded as "failing".

Evaluation results are illustrated in Table 16.

TABLE 16

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |
| Example 16-1 | Boehmite | 75 | 1.7 | PVdF | Positive and negative electrodes | Transparent | 10.0 | 9.8 | Passing |
| Example 16-2 | Talc | | 1.6 | | | Transparent | 9.7 | 9.5 | Passing |
| Example 16-3 | Zinc oxide | | 2.0 | | | Transparent | 10.9 | 11.0 | Passing |
| Example 16-4 | Tin oxide | | 2.0 | | | Transparent | 11.0 | 11.2 | Passing |
| Example 16-5 | Silicon oxide | | 1.5 | | | Transparent | 9.4 | 9.0 | Passing |
| Example 16-6 | Magnesium oxide | | 1.7 | | | Transparent | 10.2 | 10.1 | Passing |
| Example 16-7 | Antimony oxide | | 2.1 | | | Transparent | 11.3 | 11.6 | Passing |
| Example 16-8 | Aluminum oxide | | 1.8 | | | Transparent | 10.3 | 10.3 | Passing |
| Example 16-9 | Magnesium sulfate | | 1.5 | | | Transparent | 9.6 | 9.3 | Passing |
| Example 16-10 | Calcium sulfate | | 1.6 | | | Transparent | 9.8 | 9.6 | Passing |
| Example 16-11 | Barium sulfate | | 1.6 | | | Transparent | 9.9 | 9.8 | Passing |
| Example 16-12 | Strontium sulfate | | 1.5 | | | Transparent | 9.5 | 9.2 | Passing |
| Example 16-13 | Magnesium carbonate | | 1.5 | | | Transparent | 9.6 | 9.3 | Passing |
| Example 16-14 | Calcium carbonate | | 1.6 | | | Transparent | 9.7 | 9.5 | Passing |
| Example 16-15 | Barium carbonate | | 1.6 | | | Transparent | 9.8 | 9.6 | Passing |
| Example 16-16 | Lithium carbonate | | 1.5 | | | Transparent | 9.5 | 9.2 | Passing |
| Example 16-17 | Magnesium hydroxide | | 1.6 | | | Transparent | 9.7 | 9.5 | Passing |
| Example 16-18 | Aluminum hydroxide | | 1.3 | | | Transparent | 9.0 | 8.5 | Passing |
| Example 16-19 | Zinc hydroxide | | 1.5 | | | Transparent | 9.5 | 9.2 | Passing |
| Example 16-20 | Boron carbide | | 1.5 | | | Transparent | 9.5 | 9.2 | Passing |
| Example 16-21 | Silicon nitride | | 2.0 | | | Transparent | 11.0 | 11.2 | Passing |
| Example 16-22 | Boron nitride | | 2.1 | | | Transparent | 11.4 | 11.7 | Passing |
| Example 16-23 | Aluminum nitride | | 2.1 | | | Transparent | 11.3 | 11.6 | Passing |
| Example 16-24 | Titanium nitride | | 1.3 | | | Transparent | 8.9 | 8.4 | Passing |
| Example 16-25 | Lithium fluoride | | 1.4 | | | Transparent | 9.2 | 8.8 | Passing |
| Example 16-26 | Aluminum fluoride | | 1.3 | | | Transparent | 8.9 | 8.4 | Passing |
| Example 16-27 | Calcium fluoride | | 1.4 | | | Transparent | 9.3 | 8.9 | Passing |
| Example 16-28 | Barium fluoride | | 1.5 | | | Transparent | 9.4 | 9.1 | Passing |
| Example 16-29 | Magnesium fluoride | 75 | 1.4 | PVdF | Positive and negative electrodes | Transparent | 9.1 | 8.7 | Passing |
| Example 16-30 | Trilithium phosphate | | 1.5 | | | Transparent | 9.5 | 9.2 | Passing |
| Example 16-31 | Magnesium phosphate | | 1.5 | | | Transparent | 9.5 | 9.2 | Passing |
| Example 16-32 | Magnesium hydrogenphosphate | | 1.5 | | | Transparent | 9.5 | 9.2 | Passing |
| Example 16-33 | Calcium silicate | | 1.6 | | | Transparent | 9.9 | 9.7 | Passing |
| Example 16-34 | Zinc silicate | | 1.6 | | | Transparent | 9.8 | 9.6 | Passing |
| Example 16-35 | Zirconium silicate | | 2.0 | | | Transparent | 11.0 | 11.2 | Passing |
| Example 16-36 | Aluminum silicate | | 1.7 | | | Transparent | 10.0 | 9.8 | Passing |
| Example 16-37 | Magnesium silicate | | 1.6 | | | Transparent | 9.8 | 9.6 | Passing |
| Example 16-38 | Spinel | | 1.7 | | | Transparent | 10.2 | 10.1 | Passing |
| Example 16-39 | Hydrotalcite | | 1.5 | | | Transparent | 9.6 | 9.3 | Passing |
| Example 16-40 | Dolomite | | 1.6 | | | Transparent | 9.8 | 9.6 | Passing |
| Example 16-41 | Kaolinite | | 1.6 | | | Transparent | 9.7 | 9.4 | Passing |
| Example 16-42 | Sepiolite | | 1.5 | | | Transparent | 9.5 | 9.2 | Passing |
| Example 16-43 | Imogolite | | 1.5 | | | Transparent | 9.5 | 9.2 | Passing |
| Example 16-44 | Sericite | | 1.6 | | | Transparent | 9.7 | 9.5 | Passing |

TABLE 16-continued

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte (confirmed with | Determination |
| | Kind of material | Plane rate [%] | Refractive index | Binder polymer | Application target | External appearance | (measured with visible light laser) [μm] | contact type thickness meter) [μm] | of passing or failing in laser measurement |
| Example 16-45 | Pyrophyllite | | 1.6 | | | Transparent | 9.7 | 9.5 | Passing |
| Example 16-46 | Mica | | 1.6 | | | Transparent | 9.7 | 9.5 | Passing |
| Example 16-47 | Zeolite | | 1.5 | | | Transparent | 9.4 | 9.1 | Passing |
| Example 16-48 | Mullite | | 1.5 | | | Transparent | 9.5 | 9.2 | Passing |
| Example 16-49 | Saponite | | 1.5 | | | Transparent | 9.5 | 9.2 | Passing |
| Example 16-50 | Attapulgite | | 1.5 | | | Transparent | 9.5 | 9.2 | Passing |
| Example 16-51 | Montmorillonite | | 1.5 | | | Transparent | 9.5 | 9.2 | Passing |
| Example 16-52 | Melamine | 76 | 1.6 | | | Transparent | 9.8 | 9.6 | Passing |
| Example 16-53 | Ammonium polyphosphate | 77 | 1.6 | | | Transparent | 9.8 | 9.6 | Passing |
| Example 16-54 | Melamine cyanurate | 78 | 1.6 | | | Transparent | 9.8 | 9.6 | Passing |
| Example 16-55 | Melamine polyphosphate | 79 | 1.6 | | | Transparent | 9.8 | 9.6 | Passing |
| Comparative Example 16-1 | Zirconium oxide | 75 | 2.4 | PVdF | Positive and negative electrodes | Dark white turbidity | 9.8 | 26.0 | Failing |
| Comparative Example 16-2 | Cerium oxide | | 2.2 | | | Dark white turbidity | 9.8 | 35.0 | Failing |
| Comparative Example 16-3 | Barium titanate | | 2.4 | | | Dark white turbidity | 9.8 | 21.0 | Failing |
| Comparative Example 16-4 | Strontium titanate | | 2.4 | | | Dark white turbidity | 9.8 | 36.0 | Failing |
| Comparative Example 16-5 | Titanium oxide | | 2.6 | | | Dark white turbidity | 9.8 | 41.0 | Failing |
| Comparative Example 16-6 | Diamond | | 2.4 | | | Dark white turbidity | 9.8 | 21.0 | Failing |
| Comparative Example 16-7 | Silicon carbide (colored) | | — | | | Opaque | 9.8 | 31.0 | Failing |
| Comparative Example 16-8 | Iron oxide (colored) | | — | | | Opaque | 9.8 | 38.0 | Failing |
| Comparative Example 16-9 | Silicon (colored) | | — | | | Opaque | 9.8 | 40.0 | Failing |

As illustrated in Table 16, in Example 16-1 to Example 16-55, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 16-1 to Comparative Example 16-8, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 17-1

A laminated film type battery was manufactured in the same manner as in Example 16-1.

Example 17-2 to Example 17-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 17-2, boehmite particles having a plane rate of 45% were used as the filler. In Example 17-3, boehmite particles having a plane rate of 50% were used as the filler. In Example 17-4, boehmite particles having a plane rate of 60% were used as the filler. In Example 17-5, boehmite particles having a plane rate of 80% were used as the filler. In Example 17-6, boehmite particles having a plane rate of 90% were used as the filler. In Example 17-7, boehmite particles having a plane rate of 100% were used as the filler. Laminated film type batteries were manufactured in the same manner as in Example 17-1 except for the above-described configurations.

Example 17-8

A laminated film type battery was manufactured in the same manner as in Example 16-2.

Example 17-9 to Example 17-14

As the filler, talc particles having a different plane rate were used. In a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane. Specifically, in Example 17-9, talc particles having a plane rate of 45% were used as the filler. In Example 17-10, talc particles having a plane rate of 50% were used as the filler. In Example 17-11, talc particles having a plane rate of 60% were used as the filler. In Example 17-12, talc particles having a plane rate of 80% were used as the filler. In Example 17-13, talc particles having a plane rate of 90% were used as the filler. In Example 17-14, talc particles having a plane rate of 100% were used as the filler. Laminated film type batteries were manufactured in the same manner as in Example 17-8 except for the above-described configurations.

Comparative Example 17-1 to Comparative Example 17-5

Instead of the boehmite particles, aluminum oxide particles having a different plane rate were used as the filler. Specifically, in Comparative Example 17-1, aluminum oxide particles having a plane rate of 40% were used as the filler. In Comparative Example 17-2, aluminum oxide particles having a plane rate of 30% were used as the filler. In Comparative Example 17-3, aluminum oxide particles having a plane rate of 20% were used as the filler. In Comparative Example 17-4, aluminum oxide particles having a plane rate of 10% were used as the filler. In Comparative Example 17-5, aluminum oxide particles (plane rate: 0%) having a spherical shape were used as the filler. Laminated film type batteries were manufactured in the same manner as in Example 17-1 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 16-1.

Evaluation results are illustrated in Table 17.

TABLE 17

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte | |
| | Kind of material | Plane rate [%] | Refractive index | Binder polymer | Application target | External appearance | (measured with visible light laser) [μm] | (confirmed with contact type thickness meter) [μm] | Determination of passing or failing in laser measurement |
| Example 17-1 | Boehmite | 75 | 1.7 | PVdF | Positive and negative electrodes | Transparent | 10.0 | 9.8 | Passing |
| Example 17-2 | | 45 | 1.7 | | | Close to transparent | 10.0 | 10.8 | Passing |
| Example 17-3 | | 50 | 1.7 | | | Almost transparent | 10.0 | 10.5 | Passing |
| Example 17-4 | | 60 | 1.7 | | | Transparent | 10.0 | 10.5 | Passing |
| Example 17-5 | | 80 | 1.7 | | | Transparent | 10.0 | 9.7 | Passing |
| Example 17-6 | | 90 | 1.7 | | | Transparent | 10.0 | 9.7 | Passing |
| Example 17-7 | | 100 | 1.7 | | | Transparent | 10.0 | 9.7 | Passing |
| Example 17-8 | Talc | 75 | 1.6 | PVdF | Positive and negative electrodes | Transparent | 9.7 | 9.5 | Passing |
| Example 17-9 | | 45 | 1.6 | | | Close to transparent | 9.7 | 10.5 | Passing |
| Example 17-10 | | 50 | 1.6 | | | Almost transparent | 9.7 | 10.2 | Passing |
| Example 17-11 | | 60 | 1.6 | | | Transparent | 9.7 | 10.2 | Passing |
| Example 17-12 | | 80 | 1.6 | | | Transparent | 9.7 | 9.4 | Passing |
| Example 17-13 | | 90 | 1.6 | | | Transparent | 9.7 | 9.4 | Passing |
| Example 17-14 | | 100 | 1.6 | | | Transparent | 9.7 | 9.4 | Passing |
| Comparative Example 17-1 | Aluminum oxide | 40 | 1.8 | PVdF | Positive and negative electrodes | Translucent | 10 | 30 | Failing |
| Comparative Example 17-2 | | 30 | 1.8 | | | Light white turbidity | 10 | 25 | Failing |
| Comparative Example 17-3 | | 20 | 1.8 | | | White turbidity | 10 | 32 | Failing |
| Comparative Example 17-4 | | 10 | 1.8 | | | Dark white turbidity | 10 | 19 | Failing |
| Comparative Example 17-5 | | 0 (Spherical body) | 1.8 | | | Dark white turbidity | 10 | 15 | Failing |

As illustrated in Table 17, in Example 17-1 to Example 17-14, the coating material contained particles which had a plane rate in a predetermined range, and a refractive index in a predetermined range. Accordingly, the coating material was transparent, and the determination of passing or failing in the laser measurement was regarded as "passing". On the other hand, in Comparative Example 17-1 to Comparative Example 17-14, the coating material contained particles which did not have at least any one of the plane rate in a predetermined range, and the refractive index in a predetermined range. Therefore, the coating material was not transparent, and thus the determination of passing or failing in the laser measurement was regarded as "failing".

Example 18-1 to Example 18-8

In Example 18-1 to Example 18-8, laminated film type batteries were manufactured in the same manner as in Example 16-1 except that the mass ratio between the filler (boehmite particles) and the binder polymer compound (PVdF) was changed. Specifically, in Example 18-1, the mass ratio (particle/PVdF) was set to 15/85. In Example 18-2, the mass ratio (particle/PVdF) was set to 20/80. In Example 18-3, the mass ratio (particle/PVdF) was set to 30/70. In Example 18-4, the mass ratio (particle/PVdF) was set to 50/50 similar to Example 16-1. In Example 18-5, the mass ratio (particle/PVdF) was set to 70/30. In Example 18-6, the mass ratio (particle/PVdF) was set to 80/20. In Example 18-7, the mass ratio (particle/PVdF) was set to 85/15. In Example 18-8, the mass ratio (particle/PVdF) was set to 90/10.

Example 18-9 to Example 18-15

In Example 18-9 to Example 18-15, laminated film type batteries were manufactured in the same manner as in Example 16-2 except that the mass ratio between the filler (talc particles) and the binder polymer compound (PVdF) was changed. Specifically, in Example 18-9, the mass ratio (particle/PVdF) was set to 20/80. In Example 18-10, the mass ratio (particle/PVdF) was set to 40/60. In Example 18-11, the mass ratio (particle/PVdF) was set to 50/50 similar to Example 16-2. In Example 18-12, the mass ratio (particle/PVdF) was set to 60/40. In Example 18-13, the mass ratio (particle/PVdF) was set to 80/20. In Example 18-14, the mass ratio (particle/PVdF) was set to 85/15. In Example 18-15, the mass ratio (particle/PVdF) was set to 90/10.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 16-1.

Evaluation results are illustrated in Table 18.

TABLE 18

Electrode Structure: Winding Type, Laminated Film Battery

| | Coating material | | | | | Evaluation | | |
| --- | --- | --- | --- | --- | --- | --- | --- | --- |
| | Filler | | | | | Thickness of coating material | Thickness of gel electrolyte | |
| | Kind of material | Plane rate [%] | Refractive index | Mass ratio Particle/PVdF | Application target | External appearance | (measured with visible light laser) [μm] | (confirmed with contact type thickness meter) [μm] | Determination of passing or failing in laser measurement |
| Example 18-1 | Boehmite | 75 | 1.7 | 15/85 | Positive and negative electrodes | Transparent | 10.0 | 9.6 | Passing |
| Example 18-2 | | | | 20/80 | | Transparent | 10.0 | 9.6 | Passing |
| Example 18-3 | | | | 30/70 | | Transparent | 10.0 | 9.7 | Passing |
| Example 18-4 | | | | 50/50 | | Transparent | 10.0 | 9.8 | Passing |
| Example 18-5 | | | | 70/30 | | Transparent | 10.0 | 10.2 | Passing |
| Example 18-6 | | | | 80/20 | | Transparent | 10.0 | 10.3 | Passing |
| Example 18-7 | | | | 85/15 | | Almost transparent | 10.0 | 10.5 | Passing |
| Example 18-8 | | | | 90/10 | | Close to transparent | 10.0 | 10.9 | Passing |
| Example 18-9 | Talc | 75 | 1.6 | 20/80 | Positive and negative electrodes | Transparent | 9.7 | 9.6 | Passing |
| Example 18-10 | | | | 40/60 | | Transparent | 9.7 | 9.7 | Passing |
| Example 18-11 | | | | 50/50 | | Transparent | 9.7 | 9.7 | Passing |
| Example 18-12 | | | | 60/40 | | Transparent | 9.7 | 9.8 | Passing |
| Example 18-13 | | | | 80/20 | | Transparent | 9.7 | 9.9 | Passing |
| Example 18-14 | | | | 85/15 | | Almost transparent | 9.7 | 10.2 | Passing |
| Example 18-15 | | | | 90/10 | | Close to transparent | 9.7 | 10.5 | Passing |

As illustrated in Table 18, in Example 18-1 to Example 18-15, the coating material contained particles which had a plane rate in a predetermined range, and a refractive index in a predetermined range. Accordingly, the coating material was transparent, and the determination of passing or failing in the laser measurement was regarded as "passing". In addition, it was confirmed that the degree of transparency could be changed by changing the ratio (mixing ratio) between the filler and the binder polymer compound.

Example 19-1

In Example 19-1, a laminated film type battery was manufactured in the same manner as in Example 16-1.

Example 19-2 and Example 19-3

In Example 19-2 and Example 19-3, the kind of the binder polymer compound (resin), which constitutes the gel electrolyte layer, was changed. In Example 19-2, polyacrylonitrile (PAN) was used as the binder polymer compound. In Example 19-3, polyethylene glycol (PEG) was used as the binder polymer compound. Laminated film type batteries were manufactured in the same manner as in Example 19-1 except for the above-described configurations.

Example 19-4

In Example 19-4, a laminated film type battery was manufactured in the same manner as in Example 16-2.

Example 19-5 and Example 19-6

In Example 19-5 and Example 19-6, the kind of the binder polymer compound, which constitutes the gel electrolyte layer, was changed. In Example 19-5, polyacrylonitrile (PAN) was used as the binder polymer compound. In Example 19-6, polyethylene glycol (PEG) was used as the binder polymer compound. Laminated film type batteries were manufactured in the same manner as in Example 19-4 except for the above-described configurations.

(Evaluation of Battery: Determination of Passing or Failing in Laser Measurement)

With respect to the manufactured laminated film type batteries of respective Examples and Comparative Examples, the determination of passing or failing in the laser measurement was performed in the same manner as in Example 16-1.

Evaluation results are illustrated in Table 19.

Example 20-1 and Example 20-2

In Example 20-1 and Example 20-2, simple type battery packs (soft packs) illustrated in FIG. 10, FIG. 11A, and FIG. 11B were manufactured by using the same laminated film type batteries as in Example 16-1 and Example 16-2.

Example 20-3 and Example 20-4

In Example 20-3 and Example 20-4, simple type battery packs (soft packs) illustrated in FIG. 10, FIG. 11A, and FIG. 11B were manufactured by using the same laminated film type batteries as in Example 16-1 and Example 16-2 except that the coating material was applied to only both surfaces of the positive electrode.

Example 20-5 and Example 20-6

In Example 20-5 and Example 20-6, simple type battery packs (soft packs) illustrated in FIG. 10, FIG. 11A, and FIG. 11B were manufactured by using the same laminated film type batteries as in Example 16-1 and Example 16-2 except that the coating material was applied to only both surfaces of the negative electrode.

Comparative Example 20-1

A simple type battery pack (soft pack) illustrated in FIG. 10, FIG. 11A, and FIG. 11B was manufactured in the same manner as in Example 20-1 except that the filler was not contained in the coating material.

TABLE 19

Electrode Structure: Winding Type, Laminated Film Battery

| | Coating material | | | | | Evaluation | | |
|---|---|---|---|---|---|---|---|---|
| | Filler | | | | | Thickness of coating material | Thickness of gel electrolyte (confirmed with contact type thickness meter) [μm] | Determination of passing or failing in laser measurement |
| | Kind of material | Plane rate [%] | Refractive index | Binder polymer | Application target | External appearance | (measured with visible light laser) [μm] | | |
| Example 19-1 | Boehmite | 75 | 1.7 | PVdF | Positive and negative electrodes | Transparent | 10.0 | 9.8 | Passing |
| Example 19-2 | | | | PAN | | Transparent | 10.0 | 9.7 | Passing |
| Example 19-3 | | | | PEG | | Transparent | 10.0 | 9.6 | Passing |
| Example 19-4 | Talc | 75 | 1.6 | PVdF | Positive and negative electrodes | Transparent | 9.7 | 9.7 | Passing |
| Example 19-5 | | | | PAN | | Transparent | 9.7 | 9.6 | Passing |
| Example 19-6 | | | | PEG | | Transparent | 9.7 | 9.5 | Passing |

As illustrated in Table 19, in Example 19-1 to Example 19-6, the coating material contained particles which had a plane rate in a predetermined range, and a refractive index in a predetermined range. Accordingly, the coating material was transparent, and the determination of passing or failing in the laser measurement was regarded as "passing".

Example 20-1 and Example 20-2

In Example 20-1 and Example 20-2, simple type battery packs (soft packs) illustrated in FIG. 10, FIG. 11A, and FIG.

Comparative Example 20-2

A simple type battery pack (soft pack) illustrated in FIG. 10, FIG. 11A, and FIG. 11B was manufactured in the same manner as in Example 20-5 except that the filler was not contained in the coating material.

(Evaluation of Battery: 100 kg Pressing Test, and Storage Test at 60° C. for One Month)

With respect to the manufactured soft packs of respective Examples and Comparative Examples, the following 100 kg pressing test and storage test at 60° C. for one month were performed in the same manner as in Example 5-1.

Evaluation results are illustrated in Table 20.

TABLE 20

Electrode Structure: Winding Type, Soft Pack

| | Coating material | | | | | Evaluation | | |
|---|---|---|---|---|---|---|---|---|
| | Filler | | | | | | | Storage test |
| | Kind of material | Plane rate [%] | Refractive index | Binder polymer | Application target | External appearance | 100 kg pressing test | at 60° C. for one month |
| Example 20-1 | Boehmite | 75 | 1.7 | PVdF | Positive and negative electrodes | Transparent | Short-circuit was not present | Passing |
| Example 20-2 | Talc | 75 | 1.6 | PVdF | Positive and negative electrodes | Transparent | Short-circuit was not present | Passing |
| Example 20-3 | Boehmite | 75 | 1.7 | PVdF | Only positive electrode | Transparent | Short-circuit was not present | Passing |
| Example 20-4 | Talc | 75 | 1.6 | PVdF | Only positive electrode | Transparent | Short-circuit was not present | Passing |
| Example 20-5 | Boehmite | 75 | 1.7 | PVdF | Only negative electrode | Transparent | Short-circuit was not present | Passing |
| Example 20-6 | Talc | 75 | 1.6 | PVdF | Only negative electrode | Transparent | Short-circuit was not present | Passing |
| Comparative Example 20-1 | — | — | — | PVdF | Positive and negative electrodes | Transparent | Short-circuit was present | Passing |
| Comparative Example 20-2 | — | — | — | PVdF | Only negative electrode | Transparent | Short-circuit was present | Failing |

As illustrated in Table 20, in Example 20-1 to Example 20-6, results of the pressing test and the storage test were satisfactory. Furthermore, in Example 20-5 and Example 20-6, the separator deteriorated, but the filler on the negative electrode functioned, and thus the result of the storage test was regarded as "passing". On the other hand, in Comparative Example 20-1, the result of the pressing test was bad, and in Comparative Example 20-2, the results of the pressing test and the storage test were bad.

10. Other Embodiments

Hereinbefore, the present disclosure has been described with reference to the respective embodiments and examples. However, the present disclosure is not limited thereto, and various modifications can be made in a range of the gist of the present disclosure.

For example, the dimensions, the structures, the shapes, the materials, the raw materials, the manufacturing processes, and the like, which are exemplified in the above-described embodiments and examples, are illustrative only, and other dimensions, structures, shapes, materials, raw materials, manufacturing processes, and the like, which are different from those which are exemplified, may be used as necessary.

In addition, the configurations, the methods, the processes, the shapes, the materials, the dimensions, and the like of the above-described embodiments and examples may be combined with each other in a range not departing from the gist of the present disclosure. For example, the nonaqueous electrolyte battery may be a primary battery.

In addition, the electrolyte layer of the present disclosure may also be applied to a case with other battery structures such as a coin type, a square type, and a button type.

In addition, in the third embodiment and the fourth embodiment, the separator 55 may be configured as a separator which is the same as in the first embodiment, and in which the binder polymer compound is used as the resin of the particle-containing resin layer. In this case, the gel electrolyte layer 56 may have a configuration in which the filler is omitted. In addition, in the third embodiment, the electrode may be configured as a particle-containing resin layer attached electrode that uses the binder polymer compound. In this case, the gel electrolyte layer 56 may have a configuration in which the filler is omitted.

Furthermore, the present technology may employ the following configurations.

[1]

A battery including:

a positive electrode;

a negative electrode;

a separator;

an electrolytic solution; and a particle-containing resin layer that contains particles and a resin, wherein a shape of the particles includes a plane, a plane rate of the particles is greater than 40% and equal to or less than 100%, and a refractive index of the particles is equal to or greater than 1.3 and less than 2.4.

[2]

The battery according to [1], wherein the plane includes at least any one of a crystal plane, a broken plane, and a cleavage plane.

[3]

The battery according to [1] or [2], wherein the particles are at least one kind of inorganic particles and organic particles.

[4]

The battery according to [3], wherein the inorganic particles are at least one kind of particles selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and the organic particles are at least one kind of particles selected from the group consisting of melamine, melamine cyanurate, melamine polyphosphate, crosslinked polymethyl methacrylate, polyethylene, polypropylene, polystyrene, polytetrafluoroethylene, polyvinylidene fluoride, polyamide, polyimide, a melamine resin, a phenol resin, and an epoxy resin.

[5]

The battery according to [4], wherein the silicate mineral is at least one kind selected from the group consisting of talc, calcium silicate, zinc silicate, zirconium silicate, aluminum silicate, magnesium silicate, kaolinite, sepiolite, imogolite, sericite, pyrophyllite, mica, zeolite, mullite, saponite, attapulgite, and montmorillonite, the carbonate mineral is at least one kind selected from the group consisting of hydrotalcite and dolomite, and the oxide mineral is spinel.

[6]

The battery according to any one of [1] to [5], wherein the resin is at least one kind selected from the group consisting of polyvinylidene fluoride, polytetrafluoroethylene, a vinylidene fluoride-tetrafluoroethylene copolymer, an ethylene-tetrafluoroethylene copolymer, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, a acrylonitrile-acrylic acid ester copolymer, an ethylene propylene rubber, polyvinyl alcohol, polyvinyl acetate, ethyl cellulose, a cellulose derivative, polyphenylene ether, polysulfone, polyether sulfone, polyphenylene sulfide, polyetherimide, polyimide, polyamide, polyamideimide, polyacrylonitrile, polyvinyl alcohol, polyether, an acrylic acid resin, polyester, and polyethylene glycol.

[7]

The battery according to any one of [1] to [6], wherein a mass ratio (particle/resin) between the particles and the resin is 15/85 to 90/10.

[8]

The battery according to any one of [1] to [7], wherein the particle-containing resin layer retains the electrolytic solution by the resin.

[9]

The battery according to any one of [1] to [7], wherein the particle-containing resin layer retains the electrolytic solution in a void that is formed in at least any one of the resin and the particles.

[10]

The battery according to any one of [1] to [9], wherein the particle-containing resin layer is formed on at least one main surface selected from one main surface and the other main surface of the positive electrode, one main surface and the other main surface of the negative electrode, and one main surface and the other main surface of the separator.

[11]

A separator including:

a separator base material; and a particle-containing resin layer which is provided on at least one main surface of the separator base material, and contains particles and a resin, wherein a shape of the particles includes a plane, a plane rate of the particles is greater than 40% and equal to or less than 100%, and a refractive index of the particles is equal to or greater than 1.3 and less than 2.4.

[12]

A particle-containing resin layer attached electrode including:

an electrode; and a particle-containing resin layer which is provided on at least one main surface of the electrode, and contains particles and a resin, wherein a shape of the particles includes a plane, a plane rate of the particles is greater than 40% and equal to or less than 100%, and a refractive index of the particles is equal to or greater than 1.3 and less than 2.4.

[13]

A coating material containing:

particles;

a resin; and a solvent wherein a shape of the particles includes a plane, a plane rate of the particles is greater than 40% and equal to or less than 100%, and a refractive index of the particles is equal to or greater than 1.3 and less than 2.4.

[14]

A battery pack, including:

the battery according to any one of [1] to [10];

a control unit that controls the battery; and an exterior package that accommodates the battery on an inner side.

[15]

An electronic apparatus, including:

the battery according to any one of [1] to [10], wherein electric power is supplied from the battery.

[16]

An electrically driven vehicle, including:

the battery according to any one of [1] to [10];

a conversion device to which electric power is supplied from the battery and which converts the electric power to a driving force of a vehicle; and a control device that performs an information processing related to vehicle control on the basis of information about the battery.

[17]

An electrical storage device, including:

the battery according to any one of [1] to [10], wherein the electrical storage device supplies electric power to an electronic apparatus that is connected to the battery.

[18]

The electrical storage device according to [17], further including:

an electric power information control device that transmits and receives a signal to and from other apparatuses via a network, wherein charge and discharge control of the battery is performed on the basis of information that is received by the electric power information control device.

[19]
An electric power system,
wherein electric power is supplied from the battery according to any one of [1] to [10], or the electric power is supplied to the battery from a power generator or a power network.

REFERENCE SIGNS LIST

11 Separator
11a Separator base material
11b Particle-containing resin layer
21 Particle-containing resin layer attached electrode
21a Electrode
21b Particle-containing resin layer
50 Wound electrode body
51 Positive electrode lead
52 Negative Electrode lead
53 Positive electrode
53A Positive electrode current collector
53B Positive electrode active material layer
54 Negative electrode
54A Negative electrode current collector
54B Negative electrode active material layer
55 Separator
56 Gel electrolyte layer
57 Protective tape
60 Exterior packaging member
61 Adhesion film
70 Laminated electrode body
71 Positive electrode lead
72 Negative electrode lead
73 Positive electrode
74 Negative electrode
75 Separator
76 Fixing member
80 Nonaqueous electrolyte battery
81 Battery casing
82a, 82b Insulating plate
83 Battery lid
84 Safety valve
84a Protrusion
85 Disk holder
86 Shielding disk
86a Opening
87 Positive temperature coefficient element
88 Gasket
89 Sub-disk
90 Wound electrode body
91 Positive electrode
91A Positive electrode current collector
91B Positive electrode active material layer
91C Particle-containing resin layer
92 Negative electrode
92A Negative electrode current collector
92B Negative electrode active material layer
92C Particle-containing resin layer
93 Separator
93a Separator base material
93b Particle-containing resin layer
94 Center pin
95 Positive electrode lead
96 Negative electrode lead
101 Battery cell
101a Terrace portion
102a, 102b Lead
103a to 103c Insulating tape
104 Insulating plate
105 Circuit substrate
106 Connector
301 Assembled battery
301a Secondary battery
302a Charge control switch
302b Diode
303a Discharge control switch
303b Diode
304 Switch unit
307 Current detection resistor
308 Temperature detection element
310 Control unit
311 Voltage detection unit
313 Current measurement unit
314 Switch control unit
317 Memory
318 Temperature detection unit
321 Positive electrode terminal
322 Negative electrode terminal
400 Electrical storage system
401 House
402 Centralized power system
402a Thermal power generation
402b Nuclear power generation
402c Hydraulic power generation
403 Electrical storage device
404 Power generator
405 Power-consuming device
405a Refrigerator
405b Air-conditioner
405c Television receiver
405d Bath
406 Electrically driven vehicle
406a Electric vehicle
406b Hybrid car
406c Electric bike
407 Smart meter
408 Power hub
409 Power network
410 Control device
411 Sensor
412 Information network
413 Server
500 Hybrid vehicle
501 Engine
502 Generator
503 Power-driving force converting device
504a Driving wheel
504b Driving wheel
505a Wheel
505b Wheel
508 Battery
509 Vehicle control device
510 Sensor
511 Charging inlet

The invention claimed is:
1. A battery comprising:
a positive electrode;
a negative electrode;
a separator;
an electrolytic solution; and
a particle-containing resin layer that contains particles and a resin,
wherein
a shape of the particles includes a plane, a plane rate of the particles is greater than 40% and equal to or less than 100%, and a refractive index of the particles is equal to or greater than 1.3 and less than 2.4.

2. The battery according to claim 1,
wherein the plane includes at least any one of a crystal plane, a broken plane, and a cleavage plane.

3. The battery according to claim 1,
wherein the particles are at least one kind of inorganic particles and organic particles.

4. The battery according to claim 3,
wherein the inorganic particles are at least one kind of particles selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and the organic particles are at least one kind of particles selected from the group consisting of melamine, melamine cyanurate, melamine polyphosphate, crosslinked polymethyl methacrylate, polyethylene, polypropylene, polystyrene, polytetrafluoroethylene, polyvinylidene fluoride, polyamide, polyimide, a melamine resin, a phenol resin, and an epoxy resin.

5. The battery according to claim 4,
wherein the silicate mineral is at least one kind selected from the group consisting of talc, calcium silicate, zinc silicate, zirconium silicate, aluminum silicate, magnesium silicate, kaolinite, sepiolite, imogolite, sericite, pyrophyllite, mica, zeolite, mullite, saponite, attapulgite, and montmorillonite, the carbonate mineral is at least one kind selected from the group consisting of hydrotalcite and dolomite, and the oxide mineral is spinel.

6. The battery according to claim 1,
wherein the resin is at least one kind selected from the group consisting of polyvinylidene fluoride, polytetrafluoroethylene, a vinylidene fluoride-tetrafluoroethylene copolymer, an ethylene-tetrafluoroethylene copolymer, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, a acrylonitrile-acrylic acid ester copolymer, an ethylene propylene rubber, polyvinyl alcohol, polyvinyl acetate, ethyl cellulose, a cellulose derivative, polyphenylene ether, polysulfone, polyether sulfone, polyphenylene sulfide, polyetherimide, polyimide, polyamide, polyamideimide, polyacrylonitrile, polyvinyl alcohol, polyether, an acrylic acid resin, polyester, and polyethylene glycol.

7. The battery according to claim 1,
wherein a mass ratio (particle/resin) between the particles and the resin is 15/85 to 90/10.

8. The battery according to claim 1,
wherein the particle-containing resin layer retains the electrolytic solution by the resin.

9. The battery according to claim 1,
wherein the particle-containing resin layer retains the electrolytic solution in a void that is formed in at least any one of the resin and the particles.

10. The battery according to claim 1,
wherein the particle-containing resin layer is formed on at least one main surface selected from one main surface and the other main surface of the positive electrode, one main surface and the other main surface of the negative electrode, and one main surface and the other main surface of the separator.

11. A separator comprising:
a separator base material; and
a particle-containing resin layer which is provided on at least one main surface of the separator base material and contains particles and a resin,
wherein
a shape of the particles includes a plane,
a plane rate of the particles is greater than 40% and equal to or less than 100%, and
a refractive index of the particles is equal to or greater than 1.3 and less than 2.4.

12. A particle-containing resin layer attached electrode comprising:
an electrode; and
a particle-containing resin layer which is provided on at least one main surface of the electrode, and contains particles and a resin,
wherein
a shape of the particles includes a plane,
a plane rate of the particles is greater than 40% and equal to or less than 100%, and
a refractive index of the particles is equal to or greater than 1.3 and less than 2.4.

13. A coating material, comprising:
particles;
a resin; and
a solvent,
wherein
a shape of the particles includes a plane,
a plane rate of the particles is greater than 40% and equal to or less than 100%, and
a refractive index of the particles is equal to or greater than 1.3 and less than 2.4.

14. A battery pack, comprising:
the battery according to claim 1;
a control unit that controls the battery; and
an exterior package that accommodates the battery on an inner side.

15. An electronic apparatus, comprising:
the battery according to claim 1,
wherein electric power is supplied from the battery.

16. An electrically driven vehicle, comprising:
the battery according to claim 1;
a conversion device to which electric power is supplied from the battery and which converts the electric power to a driving force of a vehicle; and
a control device that performs an information processing related to vehicle control based on information about the battery.

17. An electrical storage device, comprising:
the battery according to claim 1,
wherein the electrical storage device supplies electric power to an electronic apparatus that is connected to the battery.

18. The electrical storage device according to claim 17, further comprising:
an electric power information control device that transmits and receives a signal to and from other apparatuses via a network,
wherein charge and discharge control of the battery is performed based on information that is received by the electric power information control device.

19. An electric power system, comprising:
the battery according to claim 1,
a power generator or a power network to supply electric power to the battery.

20. The battery according to claim 1, wherein the particle-containing resin layer is in gel-state.

* * * * *